US009573418B2

(12) United States Patent
Ozawa et al.

(10) Patent No.: US 9,573,418 B2
(45) Date of Patent: *Feb. 21, 2017

(54) BEARING DEVICE FOR WHEEL, AND AXLE MODULE

(71) Applicant: NTN Corporation, Osaka (JP)

(72) Inventors: Masahiro Ozawa, Shizuoka (JP); Yuichi Asano, Shizuoka (JP); Masayuki Kuroda, Hyogo (JP); Tohru Nakagawa, Shizuoka (JP); Kiyoshige Yamauchi, Shizuoka (JP); Mitsuru Umekida, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,093

(22) Filed: Aug. 21, 2013

(65) Prior Publication Data

US 2013/0334870 A1  Dec. 19, 2013

Related U.S. Application Data

(62) Division of application No. 12/676,955, filed as application No. PCT/JP2008/066283 on Sep. 10, 2008, now Pat. No. 8,540,582.

(30) Foreign Application Priority Data

Sep. 12, 2007 (JP) .................................. 2007-236807
Sep. 12, 2007 (JP) .................................. 2007-236826

(Continued)

(51) Int. Cl.
*F16C 19/18* (2006.01)
*B60B 27/00* (2006.01)
(Continued)

(52) U.S. Cl.
CPC ........... *B60B 27/0005* (2013.01); *B60B 27/00* (2013.01); *F16C 19/186* (2013.01); *F16C 33/64* (2013.01);
(Continued)

(58) Field of Classification Search
CPC .... B60B 27/00; B60B 27/0005; F16C 19/186; F16C 33/64; F16C 35/0635; F16C 2326/02; F16D 1/072; F16D 3/2237; F16D 2003/22326; F16D 2300/10
(Continued)

(56) References Cited

U.S. PATENT DOCUMENTS 1,779,805 A   10/1930   Dunwoodie
4,376,333 A    3/1983   Kanamaru et al.
(Continued)

FOREIGN PATENT DOCUMENTS

JP           55-1924        1/1980
JP         62-251522       11/1987
(Continued)

OTHER PUBLICATIONS

International Search Report issued Nov. 4, 2008 in International (PCT) Application No. PCT/JP2008/066283.
(Continued)

*Primary Examiner* — Matthieu Setliff
(74) *Attorney, Agent, or Firm* — Wenderoth, Lind & Ponack, L.L.P.

(57) ABSTRACT

A bearing device for a wheel has a hub wheel and a constant velocity universal joint with an outer joint member. Projecting portions extending in an axial direction are provided on one of an outer surface of a shaft section of the outer joint member and an inner surface of a hole portion of the hub wheel. The projecting portions are press-fitted into the other along the axial direction, and recessed portions are formed (Continued)

in the other through press-fitting of the projecting portions. Thus, a recess-projection fitting structure is formed, in which the projecting portions and the recessed portions are held in close contact with each other through an entire region of fitting contact regions therebetween.

15 Claims, 35 Drawing Sheets

(30) Foreign Application Priority Data

Oct. 22, 2007 (JP) ................................. 2007-274065
Feb. 29, 2008 (JP) ................................. 2008-049726

(51) Int. Cl.
*F16C 33/64* (2006.01)
*F16D 1/072* (2006.01)
*F16D 3/2237* (2011.01)
*F16C 35/063* (2006.01)
*F16D 3/223* (2011.01)

(52) U.S. Cl.
CPC ........... *F16C 35/0635* (2013.01); *F16D 1/072* (2013.01); *F16D 3/2237* (2013.01); *F16C 2326/02* (2013.01); *F16D 2003/22326* (2013.01); *F16D 2300/10* (2013.01)

(58) Field of Classification Search
USPC ........... 464/178, 182, 906; 403/359.1, 359.2, 403/359.3, 359.4, 359.5, 359.6; 384/489, 544; 384/589
See application file for complete search history.

(56) References Cited

U.S. PATENT DOCUMENTS

| | | | |
|---|---|---|---|
| 5,309,620 A * | 5/1994 | Shinohara et al. | .... 403/359.6 X |
| 5,527,126 A | 6/1996 | Digel et al. | |
| 5,806,936 A * | 9/1998 | Guimbretiere | ............ 384/544 X |
| 5,974,665 A | 11/1999 | Frielingsdorf et al. | |
| 6,135,571 A | 10/2000 | Mizukoshi et al. | |
| 6,524,012 B1 | 2/2003 | Uchman | |
| 6,682,225 B2 | 1/2004 | Sahashi et al. | |
| 6,715,926 B2 | 4/2004 | Tajima et al. | |
| 7,025,685 B2 * | 4/2006 | Yoshida | ................. B60B 27/00 464/145 |
| 8,128,504 B2 | 3/2012 | Fukumura et al. | |
| 8,540,582 B2 * | 9/2013 | Ozawa et al. | ................ 464/178 |
| 2002/0025093 A1 | 2/2002 | Sahashi et al. | |
| 2002/0072421 A1 | 6/2002 | Ouchi | |
| 2004/0252927 A1 | 12/2004 | Hirai et al. | |
| 2006/0019758 A1 | 1/2006 | Loustanau et al. | |

FOREIGN PATENT DOCUMENTS

| | | | | |
|---|---|---|---|---|
| JP | 2-29262 | 8/1990 | | |
| JP | 7-167116 | 7/1995 | | |
| JP | 11-062951 | 3/1999 | | |
| JP | 11-078408 | 3/1999 | | |
| JP | 2002-087011 | 3/2002 | | |
| JP | 2002-205504 | 7/2002 | | |
| JP | 2003-130062 | 5/2003 | | |
| JP | 2003-159907 | 6/2003 | | |
| JP | 2004-090839 | 3/2004 | | |
| JP | 2004-340311 | 12/2004 | | |
| JP | 2004-352051 | 12/2004 | | |
| JP | 2005-3061 | 1/2005 | | |
| JP | 2005-193757 | 7/2005 | | |
| JP | 2005193757 A | * | 7/2005 | ............. B60B 35/14 |
| JP | 2007-196936 | 8/2007 | | |
| JP | 2007-331556 | 12/2007 | | |
| WO | 2007/145019 | 12/2007 | | |

OTHER PUBLICATIONS

International Preliminary Report on Patentability and Written Opinion of the International Searching Authority issued Apr. 8, 2010 in International (PCT) Application No. PCT/JP2008/066283.
Japanese Office Action issued Jan. 22, 2013 in corresponding Japanese Patent Application No. 2007-236807 with partial English translation.
Japanese Office Action issued Jan. 22, 2013 in corresponding Japanese Patent Application No. 2007-236826 with partial English translation.
Japanese Office Action issued Jan. 22, 2013 in corresponding Japanese Patent Application No. 2007-274065 with partial English translation.
Japanese Office Action issued Jan. 23, 2013 in corresponding Japanese Patent Application No. 2008-049726 with partial English translation.
Japanese Office Action issued Jan. 10, 2014 in corresponding Japanese Patent Application No. 2013-062532 with partial English translation.

* cited by examiner

FIG. 33

BEARING DEVICE FOR WHEEL, AND AXLE MODULE

The present application is a divisional of U.S. application Ser. No. 12/676,955, now U.S. Pat. No. 8,540,582, which is a U.S. national stage application of International (PCT) Application No. PCT/JP2008/066283 filed Sep. 10, 2008.

TECHNICAL FIELD

The present invention relates to a bearing device for a wheel for supporting wheels to freely rotate relative to a vehicle body in a vehicle such as an automobile, and relates to an axle module using such bearing device for a wheel.

BACKGROUND ART

The bearing device for a wheel has evolved from a structure called first generation in which double-row roller bearings are independently used to second generation in which a vehicle body attachment flange is integrally provided in an outer member. Further, third generation in which one inner rolling surface of the double-row roller bearings is integrally formed with an outer circumference of a hub wheel integrally having a wheel attachment flange has been developed. Further, fourth generation in which a constant velocity universal joint is integrated with the hub wheel and another inner rolling surface of the double-row roller bearings is integrally formed with an outer circumference of an outer joint member constituting the constant velocity universal joint has been developed.

For example, the bearing device for a wheel called third generation is described in Patent Document 1. The bearing device for a wheel called third generation includes, as illustrated in FIG. 37, a hub wheel 152 having a flange 151 extending in a radially outer direction, a constant velocity universal joint 154 having an outer joint member 153 fixed to the hub wheel 152, and an outer member 155 arranged on an outer circumferential side of the hub wheel 152.

The constant velocity universal joint 154 includes the outer joint member 153, an inner joint member 158 arranged in a cup-shaped section 157 of the outer joint member 153, a ball 159 arranged between the inner joint member 158 and the outer joint member 153, and a cage 160 that retains the ball 159. A spline portion 161 is formed on an inner peripheral surface of a center hole of the inner joint member 158. An end spline portion of a shaft (not shown) is inserted into this center hole, whereby the spline portion 161 on the inner joint member 158 side and the spline portion on the shaft side are engaged.

Further, the hub wheel 152 includes a cylindrical section 163 and the flange 151. A short-cylindrical pilot section 165, on which a wheel and a brake rotor (not shown) are mounted, is protrudingly provided on an outer end surface 164 (end surface on an outboard side) of the flange 151. Note that, the pilot section 165 includes a large-diameter first portion 165a and a small-diameter second portion 165b. The wheel is externally fitted onto the first portion 165a, and the brake rotor is externally fitted onto the second portion 165b.

Then, a notch section 166 is provided in an outer peripheral surface at an end portion on the cup-shaped section 157 side of the cylindrical section 163. An inner race 167 is fitted in the notch section 166. A first inner raceway surface 168 is provided near a flange on an outer peripheral surface of the cylindrical section 163 of the hub wheel 152. A second inner raceway surface 169 is provided on an outer peripheral surface of the inner race 167. Further, a bolt inserting hole 162 is provided in the flange 151 of the hub wheel 152. A hub bolt for fixing the wheel and the brake rotor to the flange 151 is inserted into the bolt inserting hole 162.

In the outer member 155, double-row outer raceway surfaces 170 and 121 are provided on an inner circumference thereof, and a flange (vehicle body attachment flange) 182 is provided on an outer circumference thereof. A first outer raceway surface 170 of the outer member 155 and the first inner raceway surface 168 of the hub wheel 152 are opposed to each other. A second outer raceway surface 171 of the outer member 155 and the raceway surface 169 of the inner race 167 are opposed to each other. Rolling elements 172 are interposed between those inner and outer raceway surfaces. In other words, an inner member of the roller bearing is constituted by the inner race 167 and a part of an outer surface of the hub wheel 152.

A shaft section 173 of the outer joint member 153 is inserted into the cylindrical section 163 of the hub wheel 152. In the shaft section 173, a screw section 174 is formed at an end portion of a reverse cup-shaped section thereof. A spline portion 175 is formed between the screw section 174 and the cup-shaped section 157. Further, a spline portion 176 is formed in an inner peripheral surface (inner surface) of the cylindrical section 163 of the hub wheel 152. When the shaft section 173 is inserted into the cylindrical section 163 of the hub wheel 152, the spline portion 175 on the shaft section 173 side and the spline portion 176 on the hub wheel 152 side are engaged.

A nut member 177 is screwed into the screw section 174 of the shaft section 173 projecting from the cylindrical section 163. The hub wheel 152 and the outer joint member 153 are connected. In this case, an inner end surface (back surface) 178 of the nut member 177 and an outer end surface 179 of the cylindrical section 163 are brought into contact with each other and an end surface 180 on the shaft section side of the cup-shaped section 157 and an outer end surface 181 of the inner race 167 are brought into contact with each other. In other words, when the nut member 177 is tightened, the hub wheel 152 is sandwiched by the nut member 177 and the cup-shaped section 157 through the inner race 167.

Patent Document 1: JP 2004-340311 A

SUMMARY OF THE INVENTION

Problems to be Solved by the Invention

Conventionally, as described above, the spline portion 175 on the shaft section 173 side and the spline portion 176 on the hub wheel 152 side are engaged. Therefore, it is necessary to perform spline machining on both the shaft section 173 side and the hub wheel 152 side, and hence cost increases. When the shaft section 173 is press-fitted into the hub wheel 152, recesses and projections of the spline portion 175 on the shaft section 173 side and the spline portion 176 on the hub wheel 152 side need to be aligned. In this case, if the shaft section 173 is press-fitted into the hub wheel 152 by aligning tooth surfaces thereof, recessed and projected teeth are likely to be damaged (torn). Further, if the shaft section 173 is press-fitted into the hub wheel 152 by aligning the spline portions to a large diameter of the recessed and projected teeth rather than aligning the tooth surfaces, a backlash in a circumferential direction tends to occur. As described above, if there is the backlash in the circumferential direction in this way, transmissibility of rotation torque is low and abnormal noise tends to occur. Therefore, when the shaft section 173 is press-fitted into the hub wheel 152 by the spline fitting as in the prior art, it is difficult to solve the damages both to the recessed and projected teeth and the backlash in the circumferential direction.

Further, it is necessary for the nut member 177 to be screwed into the screw section 174 of the shaft section 173 projecting from the cylindrical section 163. Thus, the assembly work involves screw fastening operation, resulting in a rather poor workability. Further, the number of components is large, resulting in a rather poor component controllability.

In view of the above-mentioned problems, the present invention provides a bearing device for a wheel capable of suppressing the backlash in the circumferential direction, excellent in coupling workability of the hub wheel and the outer joint member of the constant velocity universal joint, and excellent in strength owing to stable fitting between the hub wheel and the outer joint member of the constant velocity universal joint. The present invention also provides an axle module using such bearing device for a wheel.

Means for Solving the Problems

A first bearing device for a wheel of the present invention includes: a bearing including double-row rolling elements arranged between outer raceways and inner raceways opposed to each other; a hub wheel attached to a wheel; a constant velocity universal joint; and a recess-projection fitting structure through which a shaft section of an outer joint member of the constant velocity universal joint is integrated with the hub wheel, the shaft section being inserted in a fitting manner into a hole portion of the hub wheel, in which the recess-projection fitting structure includes: projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and recessed portions formed through press-fitting of the projecting portions in the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween, and in which hardness of at least press-fitting start end portions of the projecting portions is set to be higher than hardness of a recessed-portion forming region into which the projecting portions are press-fitted, and a hardness difference therebetween is set to be equal to or larger than 20 points in HRC.

According to the first bearing device for a wheel of the present invention, in the recess-projection fitting structure, the entire fitting contact regions between the projecting portions and the recessed portions are held in close contact with each other. Therefore, in this fitting structure, a gap in which a backlash occurs is not formed in a radial direction and a circumferential direction. In addition, the hardness difference between the press-fitting start end portions of the projecting portions and the recessed-portion forming region is set to be equal to or larger than 20 points in HRC (Rockwell C hardness). Thus, when the projecting portions are press-fitted into the another side (counterpart side), a press-fitting force (press-fitting load) applied upon press-fitting is relatively small. That is, it is unnecessary to apply large press-fitting load, and hence it is possible to prevent the projecting portions and the recessed portions from being abraded and damaged (torn off).

It is preferred that the hardness of the press-fitting start end portions of the projecting portions be set to 50 to 65 points in HRC. Further, it is preferred that hardness of the recessed-portion forming region be set to 10 to 30 points in HRC.

The projecting portions can be subjected to heat-treatment hardening by induction heat treatment. Thus, the hardness difference between a projecting-portion side (press-fitting start end portions of the projecting portions) and a recessed-portion forming side (recessed-portion forming region) can be stably set to be equal to or larger than 20 points in HRC. Here, induction heat treatment is a quenching method employing the principle of inserting a portion necessary for quenching into a coil through which a high-frequency current flows, generating Joule heat with an electromagnetic induction action, and heating a conductive substance.

A second bearing device for a wheel of the present invention includes: a bearing including double-row rolling elements arranged between outer raceways and inner raceways opposed to each other; a hub wheel attached to a wheel; a constant velocity universal joint; and a recess-projection fitting structure through which a shaft section of an outer joint member of the constant velocity universal joint is integrated with the hub wheel, the shaft section being inserted in a fitting manner into a hole portion of the hub wheel, in which the recess-projection fitting structure includes: projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and recessed portions formed through press-fitting of the projecting portions on the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween, and in which a foreign-matter intrusion prevention means which prevents a foreign matter from intruding into the recess-projection fitting structure is provided.

According to the second bearing device for a wheel of the present invention, similarly to the first bearing device for a wheel, in the recess-projection fitting structure, the entire fitting contact regions between the projecting portions and the recessed portions are held in close contact with each other. Therefore, in this fitting structure, a gap in which a backlash occurs is not formed in the radial direction and the circumferential direction. In addition, by providing the foreign-matter intrusion prevention means, foreign matters can be prevented from intruding into the recess-projection fitting structure.

The outer joint member includes a mouth section in which an inner joint member is mounted, and the shaft section provided to protrude from a bottom portion of the mouth section. The foreign-matter intrusion prevention means can be constituted by a seal member arranged between an end portion of the hub wheel and the bottom portion of the mouth section.

The foreign-matter intrusion prevention means can be constituted by a seal material interposed between the fitting contact regions located between the projecting portions and the recessed portions in the recess-projection fitting structure. By the seal material, it is possible to improve closeness of the fitting contact regions and to prevent the foreign matters from intruding into the fitting contact regions.

A slip-off prevention engaging portion that engages on the inner surface of the hole portion of the hub wheel may be provided on an outboard side of the shaft section of the outer joint member, and a seal material constituting the foreign-matter intrusion prevention means may be interposed between the inner surface of the hole portion of the hub wheel and the slip-off prevention engaging portion.

The foreign-matter intrusion prevention means may be provided on the outboard side and the inboard side with respect to the recess-projection fitting structure, respectively.

A third bearing device for a wheel of the present invention includes: a bearing including double-row rolling elements arranged between outer raceways and inner raceways opposed to each other; a hub wheel attached to a wheel; a constant velocity universal joint; and a recess-projection fitting structure through which a shaft section of an outer joint member of the constant velocity universal joint is integrated with the hub wheel, the shaft section being inserted in a fitting manner into a hole portion of the hub wheel, in which the bearing includes an outer member having the double-row outer raceways formed therein and an inner member having the double-row inner raceways formed therein, and an opening portion of an annular space formed between the outer member and the inner member is sealed with a seal member, one of the inner raceways on an outboard side of the inner member is formed in an outer surface of the hub wheel, another of the inner raceways on an inboard side of the inner member is formed in an outer surface of an inner race fitted onto a smaller-diameter step section provided on the inboard side of the hub wheel, in which the hub wheel is subjected to thermal refining treatment, and a hardened layer is provided in a region ranging from a seal land on the outboard side with respect to the one of the inner raceways on the outboard side via the one of the inner raceways on the outboard side to a surface corresponding to the smaller-diameter step section on which the inner race is externally fitted, and in which the recess-projection fitting structure includes: projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and recessed portions formed through press-fitting of the projecting portions in the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween.

According to the third bearing device for a wheel of the present invention, similarly to the first or second bearing device for a wheel, in the recess-projection fitting structure, the entire fitting contact regions between the projecting portions and the recessed portions are held in close contact with each other. Therefore, in this fitting structure, a gap in which a backlash occurs is not formed in the radial direction and the circumferential direction.

According to the third bearing device for a wheel of the present invention, the hub wheel is subjected to thermal refining treatment, and a hardened layer is provided in a region ranging from a seal land of the hub wheel via the inner raceway on the outboard side to a surface corresponding to the smaller-diameter step section on which the inner race is fitted. Thus, it is possible to increase fatigue strength of a material. Here, the thermal refining treatment is a method of making crystal grains fine to adjust quality of the material to thereby improve ductility and the like, and includes thermal operations such as quenching and annealing.

Surface hardness of the hardened layer can be set to 54 to 64 points in HRC. Thus, in the outer surface of the hub wheel, it is possible not only to improve abrasion resistance in a region ranging from a base portion on the inboard side of the wheel attachment flange to the inner raceway surfaces on the inboard side and the outboard side, but also to increase mechanical strength sufficiently.

The hub wheel integrally includes a wheel attachment flange to which a wheel is attached, and surface hardness of a base portion on the outboard side of the wheel attachment flange can be set to be equal to or smaller than 35 points in HRC. In this manner, when the surface hardness of the base portion on the outboard side of the wheel attachment flange is set to be equal to or smaller than 35 points in HRC, processability in cutting or the like is improved, and deformation caused by heat treatment can be suppressed. Further, in the hub wheel, surface hardness of a bolt hole, into which a hub bolt is press-fitted, can be approximated to surface hardness of the hub bolt.

It is preferred that the outer joint member include the mouth section in which the inner joint member is mounted, and the shaft section provided to protrude from the bottom portion of the mouth section, and that the mouth section be out of contact with the hub wheel. Further, it is preferred that an end portion of the hub wheel be forged so as to apply precompression to the bearing of the bearing device for a wheel.

In the hub wheel in which the end portion on the inboard side of the hub wheel is subjected to plastic deformation outwardly in the radial direction to thereby form a forged portion, and in which the inner race is fixed by the forged portion in the axial direction, surface hardness of the end portion on the inboard side of the hub wheel can be set to be equal to or smaller than 25 points in HRC. Thus, it is unnecessary to control an amount of precompression through firm fastening with a nut or the like unlike the conventional case.

The hub wheel can be made of medium carbon steel containing carbon of 0.40 wt % to 0.80 wt %.

The projecting portions in the recess-projection fitting structure can be provided on the shaft section of the outer joint member. In this case, by press-fitting the shaft section into the hole portion of the hub wheel from an axial end portion side of the projecting portions, the projecting portions form the recessed portions, which are held in close contact with the projecting portions in a fitting manner, in the inner surface of the hole portion of the hub wheel. Thus, it is possible to configure the recess-projection fitting structure. In this case, the projecting portions bite in a recessed-portion forming surface on the counterpart side (inner surface of the hole portion of the hub wheel), and thus the hole portion is slightly expanded in diameter and allows movement in the axial direction of the projecting portions. If the movement in the axial direction stops, the hole portion decreases in diameter to return to the original diameter. In this manner, the entire fitting contact regions between the projecting portions and the recessed portions are stably held in close contact with each other.

When the projecting portions are provided on the shaft section of the outer joint member, it is preferred that an inner diameter dimension of the inner surface of the hole portion of the hub wheel be set to be smaller than a diameter dimension of a circle connecting vertexes of the projecting portions of the shaft section of the outer joint member and be set to be larger than a diameter dimension of a circle connecting bottoms between the projecting portions.

Further, the projecting portions in the recess-projection fitting structure can be provided on the inner surface of the hole portion of the hub wheel. In this case, by press-fitting the shaft section into the hole portion of the hub wheel from the axial end portion side of the projecting portions, the projecting portions form the recessed portions, which are held in close contact with the projecting portions in a fitting manner, in the outer surface of the shaft section of the outer joint member. Thus, it is possible to configure the recess-projection fitting structure. In this case, the projecting portions bite in the outer surface of the shaft section, and thus the hole portion of the hub wheel is slightly expanded in diameter and allows movement in the axial direction of the projecting portions. If the movement in the axial direction stops, the hole portion decreases in diameter to return to the original diameter. In this manner, the entire fitting contact regions between the projecting portions and the recessed portions serving as a counterpart member fitting to the projecting portions (outer surface of the shaft) are held in close contact with each other.

When the projecting portions are provided on the inner surface of the hole portion of the hub wheel, it is preferred that an outer diameter dimension of the shaft section of the outer joint member be set to be larger than a diameter dimension of a circular arc connecting vertexes of the plurality of projecting portions of the hole portion of the hub wheel and be set to be smaller than a diameter dimension of a circle connecting bottoms between the projecting portions.

It is preferred that, of the projecting portions, at least portions ranging from the vertexes to middle portions in a projecting direction be press-fitted to the another of the outer surface of the shaft section of the outer joint member and the inner surface of the hole portion of the hub wheel, and that circumferential thicknesses of the middle portions in the projecting direction be set to be smaller than circumferential dimensions in positions corresponding to the middle portions in between the projecting portions adjacent to one another in a circumferential direction. By this setting, a sum of the circumferential thicknesses of the middle portions in the projecting direction of the projecting portions is smaller than a sum of circumferential thicknesses in the positions corresponding to the middle portions in the projecting portions on the counterpart side which fit in between the projecting portions adjacent thereto in the circumferential direction.

A shaft slip-off preventing structure may be provided between the shaft section of the outer joint member and the inner surface of the hole portion of the hub wheel. By providing the shaft slip-off preventing structure, it is possible to prevent the outer joint member of the constant velocity universal joint from slipping off from the hub wheel in the axial direction. It is preferred that the shaft slip-off preventing structure be maintained in an unhardened state.

In a bolt fixation state of the hub wheel and the shaft section of the outer joint member, an inner wall on which the end surface of the shaft section of the outer joint member and a bearing surface of the bolt member are borne can be provided on the hole portion of the hub wheel. With this configuration, bolt fixation is stabilized.

A seal material may be interposed between the bearing surface of the bolt member and the inner wall, the bolt member performing the bolt fixation of the hub wheel and the shaft section of the outer joint member.

It is preferred that a pocket portion for housing an extruded portion caused by formation of the recessed portions by the press-fitting be provided. In this case, the extruded portion includes a part of material having a volume equal to that of the recessed portions into (to) which recessed-portion fitting regions of the projecting portions are fitted, the part thereof being subjected to the following: forcing-out corresponding to the amount of the recessed portions to be formed; trimming for forming the recessed portions; forcing-out and trimming simultaneously performed; or the like. Therefore, when the projecting portions are provided on the shaft section of the outer joint member, the pocket portion is provided on the shaft section on the outboard side with respect to the recess-projection fitting structure. When the projecting portions are provided on the inner surface of the hole portion of the hub wheel, the pocket portion is provided on the inner surface of the hole portion of the hub wheel on the inboard side with respect to the recess-projection fitting structure.

It is also preferred that, in the shaft section of the outer joint member, the pocket portion be provided on the outboard side with respect to the projecting portions and a shaft extending portion for centering with the hole portion of the hub wheel be provided on the outboard side with respect to the pocket portion.

It is preferred that the recess-projection fitting structure be arranged at an immediate-underside avoiding position with respect to raceway surfaces of the roller bearing. This is because, when the shaft section is press-fitted into the hole portion of the hub wheel, the hub wheel expands. As a result of the expansion, hoop stress is generated on the raceway surfaces of the roller bearing. Incidentally, the hoop stress represents a force of expanding a diameter in the radially outer direction. Thus, when hoop stress is generated on the bearing raceway surfaces, reduction of rolling fatigue life and occurrence of cracks may be caused. In this context, by arranging the recess-projection fitting structure at the immediate-underside avoiding position with respect to the raceway surfaces of the roller bearing, hoop stress on the bearing raceway surfaces can be suppressed at minimum.

An axle module of the present invention includes: a bearing device for a wheel including an outboard side constant velocity universal joint; a drive shaft having one end connected to the outboard side constant velocity universal joint of the bearing device for a wheel; and an inboard side constant velocity universal joint connected to another end of the drive shaft, the bearing device for a wheel including: a bearing including double-row rolling elements arranged between outer raceways and inner raceways opposed to each other; a hub wheel attached to a wheel; and the outboard side constant velocity universal joint, in which the recess-projection fitting structure is formed, in which: projecting portions extending in an axial direction are provided on one of an outer surface of a shaft section of an outer joint member of the outboard side constant velocity universal joint and an inner surface of a hole portion of the hub wheel; the projecting portions are press-fitted along the axial direction into another of the outer surface of the shaft section of the outer joint member of the outboard side constant velocity universal joint and the inner surface of the hole portion of the hub wheel; recessed portions are formed through press-fitting of the projecting portions in the another of the outer surface of the shaft section of the outer joint member of the outboard side constant velocity universal joint and the inner surface of the hole portion of the hub wheel so as to be held in close contact with the projecting portions in a fitting manner; and the projecting portions and the recessed portions are held in close contact with each other through an entire region of fitting contact regions therebetween, in which an outer member including the outer raceways of the bearing is fitted to a knuckle on a vehicle body side, and in which a maximum outer diameter dimension of the outboard side constant velocity universal joint and a maximum outer diameter dimension of the inboard side constant velocity universal joint are set to be smaller than an outer diameter of a knuckle fitting surface of the outer member.

According to the axle module of the present invention, on a side of the bearing device for a wheel, in the recess-projection fitting structure, the entire fitting contact regions between the projecting portions and the recessed portions are held in close contact with each other. Therefore, in this fitting structure, a gap in which a backlash occurs is not formed in a radial direction and a circumferential direction.

The maximum outer diameter dimension of the outboard side constant velocity universal joint and the maximum outer diameter dimension of the inboard side constant velocity universal joint are set to be smaller than the outer diameter of the knuckle fitting surface of the outer member. Therefore, the axle module is allowed to easily pass through the knuckle.

It is preferred that, in an axle module of the present invention, any one of the above-mentioned bearing devices for a wheel be used.

Effects of the Invention

According to the present invention, in the recess-projection fitting structure, there are formed no gaps in which a backlash occur in the radial direction or the circumferential direction. Thus, the entire fitting regions contribute to rotation torque transmission, and hence stable torque transmission is achieved. In addition, abnormal noise is not generated. Moreover, close contact with no gaps is achieved in the recess-projection fitting structure, and hence strength of torque transmission regions is increased. Therefore, the bearing device for a wheel can be reduced in weight and size.

The projecting portions provided on the one of the outer surface of the shaft section of the outer joint member and the inner surface of the hole portion of the hub wheel are press-fitted along the axial direction into the another of the outer surface of the shaft section of the outer joint member and the inner surface of the hole portion of the hub wheel. With this, it is possible to form recessed portions to be held in close contact with the projecting portions in a fitting manner, and hence possible to reliably form the recess-projection fitting structure. In addition, it is unnecessary to form the spline and the like in advance on the member in which the recessed portions are formed. The bearing device for a wheel is excellent in productivity. Further, phase alignment of the splines is unnecessary. It is possible to achieve improvement of an assembly property, to thereby prevent damages to the tooth surfaces during press-fitting, and hence possible to maintain a stable fitting state.

The hardness difference between the press-fitting start end portions of the projecting portions and the recessed-portion forming region is set to be equal to or larger than 20 points in HRC. Thus, when the projecting portions are press-fitted into the counterpart side, it is possible to perform press-fitting only by applying a relatively small press-fitting force (press-fitting load), and to improve a press-fitting property. Further, it is unnecessary to apply large press-fitting load, and hence it is possible to prevent the projecting portions and the recessed portions from being abraded and damaged (torn off), and to stably configure the recess-projection fitting structure in which a backlash does not occur in the radial direction and the circumferential direction.

If the hardness of the press-fitting start end portions of the projecting portions is set to 50 to 65 points in HRC, more stable recess-projection fitting structure can be configured. Further, if the hardness of the recessed-portion forming region is set to 10 to 30 points in HRC, the recessed-portion forming side is soft, and the press-fitting property can be improved.

The projecting portions can be subjected to heat-treatment hardening by induction heat treatment. When the projecting portions are hardened by the induction heat treatment, there are the following advantages: (a) partial heating is possible and quenching conditions can be easily adjusted; (b) the heating can be performed in a short period of time, and hence a degree of oxidization is low; (c) quenching distortion is smaller in comparison with cases of other quenching methods; (d) the surface hardness is high and excellent abrasion resistance can be obtained; (e) selection of a depth of the hardened layer is also relatively easy; and (f) automation is easy and introduction into a machining line is also possible.

Owing to provision of the foreign-matter intrusion prevention means, it is possible to prevent foreign matters from intruding into the recess-projection fitting structure. That is, the foreign-matter intrusion prevention means prevents intrusion of rainwater and foreign matters, and it is possible to avoid deterioration of adhesiveness caused by the rainwater, foreign matters, etc. intruding into the recess-projection fitting structure.

In the bearing device for a wheel in which the seal member is arranged between the end portion of the hub wheel and the bottom portion of the mouth section, the seal member closes the gap between the end portion of the hub wheel and the bottom portion of the mouth section. Thus, rainwater and foreign matters are prevented from intruding into the recess-projection fitting structure through the gap. Any member can be used as the seal member as long as the member can be interposed between the end portion of the hub wheel and the bottom portion of the mouth section, and hence it is possible to use, for example, an existing (commercial) O-ring, and to configure the foreign-matter intrusion prevention means at low cost. Moreover, the commercial O-ring and the like can be selected from ones that have various sizes and are made of various materials. Without separately manufacturing a special member, it is possible to configure the foreign-matter intrusion prevention means reliably exerting a sealing function.

In the bearing device for a wheel in which a seal material is interposed between the fitting contact regions between the projecting portions and the recessed portions, it is possible to prevent intrusion of the foreign matters in between the fitting contact regions, and reliability to prevent intrusion of the foreign matters is improved. Note that, when the seal material is interposed, the seal material may be applied onto the surfaces of the projecting portions before press-fitting.

The slip-off prevention engaging portion engaging on the inner surface of the hole portion of the hub wheel is provided on the outboard side of the shaft section of the outer joint member, and the seal material is interposed between the inner surface of the hub wheel and the engaging portion.

With this structure, it is possible to avoid intrusion of the foreign matters from the outboard side.

The foreign-matter intrusion prevention means are respectively provided on the outboard side with respect to the recess-projection fitting structure and the inboard side with respect to the recess-projection fitting structure. With this structure, the foreign matters are prevented from intruding into the recess-projection fitting structure from the outboard side and the inboard side. Thus, it is possible to avoid deterioration of the adhesiveness more stably over a long period of time.

In the bearing device for a wheel in which the thermal refining of the hub wheel is performed and the hardened layer is provided in a region ranging from a seal land to a surface corresponding to the smaller-diameter step section, improvement of fatigue strength of a material can be realized. Therefore, it is possible to increase strength and durability of the hub wheel while realizing a reduction in size and weight. Further, it is possible to secure fixation strength of the hub bolt without deteriorating the surface deflection causing brake judder.

When the surface hardness of the hardened layer is set to 54 to 64 points in HRC, it is possible to increase mechanical strength sufficiently. Accordingly, the strength and durability of the hub wheel are further increased.

When the surface hardness of the base portion on the outboard side of the wheel attachment flange is set to be equal to or smaller than 35 points in HRC, it is possible to prevent deterioration of accuracy in surface deflection of a brake rotor attachment surface of the wheel attachment flange due to the deformation caused by heat treatment. Further, the surface hardness of the bolt hole can be approximated to the surface hardness of the hub bolt, and hence it is possible to prevent a reduction in fixation force caused by crush of serrations of the hub bolt.

When the surface hardness of the end portion on the inboard side of the hub wheel is set to be equal to or smaller than 25 points in HRC, the forged portion can be formed by the end portion of the hub wheel. Thus, it is unnecessary to control an amount of precompression through firm fastening with a nut or the like. Consequently, it is possible to easily incorporate the bearing device for a wheel into the vehicle, and to maintain the amount of precompression for a long period of time. In addition, processability is not reduced, and there is no fear that micro cracks occur in the surface by the plastic working. As a result, its reliability is further improved in terms of quality.

In the bearing device for a wheel in which the mouth section of the outer joint member is out of contact with the hub wheel, it is possible to prevent occurrence of abnormal noise due to contact between the mouth section and the hub wheel. Further, in the bearing device for a wheel in which the end portion of the hub wheel is forged and precompression is applied on the bearing, it is possible to press-fit the shaft section of the outer joint member without taking into account precompression applied by the outer joint member, and to realize improvement of connectability (assemblability) of the hub wheel and the outer joint member. In addition, it is unnecessary to control an amount of precompression through firm fastening with a nut or the like. Consequently, it is possible to easily incorporate the bearing device for a wheel into the vehicle, and to maintain the amount of precompression for a long period of time.

When the surface hardness of the end portion on the inboard side of the hub wheel is set to be equal to or smaller than 25 points in HRC, processability is not reduced, and there is no fear that micro cracks occur in the surface by the plastic working. As a result, its reliability is further improved in terms of quality.

When the hub wheel is made of medium carbon steel containing carbon of 0.40 wt % to 0.80 wt %, such hub wheel has advantages in terms of easiness of forging, a cutting property, a heat treatment property, or economy. In particular, induction quenching or the like is preferably adopted.

Further, when the projecting portions of the recess-projection fitting structure are provided on the shaft section of the outer joint member, it is possible to increase the hardness on the shaft section side and to improve the rigidity of the shaft section. In contrast, when the projecting portions of the recess-projection fitting structure are provided on the inner surface of the hole portion of the hub wheel, it is unnecessary to perform hardness treatment (heat treatment) on the shaft section side. Therefore, the outer joint member of the constant velocity universal joint is excellent in productivity.

By setting the circumferential thicknesses of the middle portions in the projecting direction of the projecting portions to be smaller than dimensions in positions corresponding to the middle portions in between the projecting portions adjacent to one another in the circumferential direction, it is possible to increase circumferential thicknesses between the recessed portions adjacent to one another in the circumferential direction. Therefore, it is possible to increase shearing areas between the recessed portions adjacent to one another in the circumferential direction and to secure torsion strength. Moreover, tooth thicknesses (circumferential thicknesses) of the projecting portions on the high hardness side are small, and hence it is possible to reduce press-fitting load and to realize improvement of a press-fitting property.

With the shaft slip-off preventing structure, it is possible to effectively prevent the shaft section of the outer joint member from slipping off in the axial direction from the hole portion of the hub wheel. Consequently, it is possible to maintain a stable connected state and to realize improvement of quality of the bearing device for a wheel. In particular, if the shaft slip-off preventing structure is left in an unhardened state, the shaft slip-off preventing structure is relatively soft, and improvement of processability can be realized.

In the bearing device for a wheel in which the recess-projection fitting structure allows separation, the outer joint member can be detached from the hole portion of the hub wheel by application of the pulling-out force in the axial direction to the shaft section of the outer joint member. Thus, it is possible to improve workability (maintenance property) in repair and inspection of the components.

As a result of bolt fixation, the shaft section is regulated from slipping off from the hub wheel in the axial direction, and hence stable torque transmission is possible over a long period of time. In particular, by providing the inner wall, which bears the head portion of the bolt member, on the hole portion of the hub wheel, it is possible to achieve the following: stabilization of bolt fixation and exertion of a positioning function; stabilization of dimensional accuracy of the bearing device for a wheel; and stable securement of the axial length of the recess-projection fitting structure arranged in the axial direction. As a result, a torque transmission property can be increased.

By interposing the seal material between the bearing surface of the bolt member and the inner wall, rainwater and foreign matters are prevented from intruding from the bolt member side. Thus, it is possible to avoid deterioration of adhesiveness caused by intrusion of the rainwater, foreign matters, etc. into the recess-projection fitting structure.

By providing the housing portion (pocket portion) for housing the extruded portion formed by formation of the recessed portions in accordance with the press-fitting, it is possible to retain (keep) the extruded portion in the housing portion. Therefore, the extruded portion does not intrude into the vehicle and the like on the outside of the device. That is, the extruded portion can be left housed in the pocket portion, and it is unnecessary to perform the removing work for the extruded portion. Accordingly, it is possible to realize a reduction in man-hours for assembly and realize improvement of assembly workability and cost reduction.

Further, by providing the shaft extending portion for centering, ejection of the extruded portion in the pocket portion to the shaft extending portion side is eliminated. Therefore, the extruded portion is more stably housed. Moreover, the shaft extending portion is used for centering, and hence it is possible to press-fit the shaft section into the hub wheel while preventing decentering. Therefore, it is possible to highly accurately connect the outer joint member and the hub wheel and to perform stable torque transmission.

By arranging the recess-projection fitting structure at the immediate-underside avoiding position with respect to the raceway surfaces of the roller bearing, hoop stress on the bearing raceway surfaces is suppressed at minimum. With this, it is possible to prevent occurrence of failures with a bearing, such as reduction of rolling fatigue life, occurrence of cracks, and stress corrosion crack, and hence possible to provide a bearing of high quality.

According to the axle module of the present invention, in the recess-projection fitting structure, there are formed no gaps in which a backlash occur in the radial direction or the circumferential direction. Thus, the entire fitting regions contribute to rotation torque transmission, and hence stable torque transmission is achieved. In addition, abnormal noise is not generated. Moreover, close contact with no gaps is achieved in the recess-projection fitting structure, and hence strength of torque transmission regions is increased. Therefore, the bearing device for a wheel can be reduced in weight and size.

The axle module of the present invention is allowed to easily pass through the knuckle. Thus, it is possible to achieve a reduction in man-hours on the assembly site and to enhance workability. In this case, it is unnecessary to turn the knuckle unlike in a conventional process, and hence a working space can be minimized. In addition, damages of components during disassembly, assembly, etc. is prevented, and thus quality of the bearing device for a wheel can be stabilized.

BRIEF DESCRIPTION OF THE DRAWINGS

FIG. 33 A view illustrating the step of incorporating the axle module into a vehicle.

DETAILED DESCRIPTION OF THE INVENTION

Figure 1:
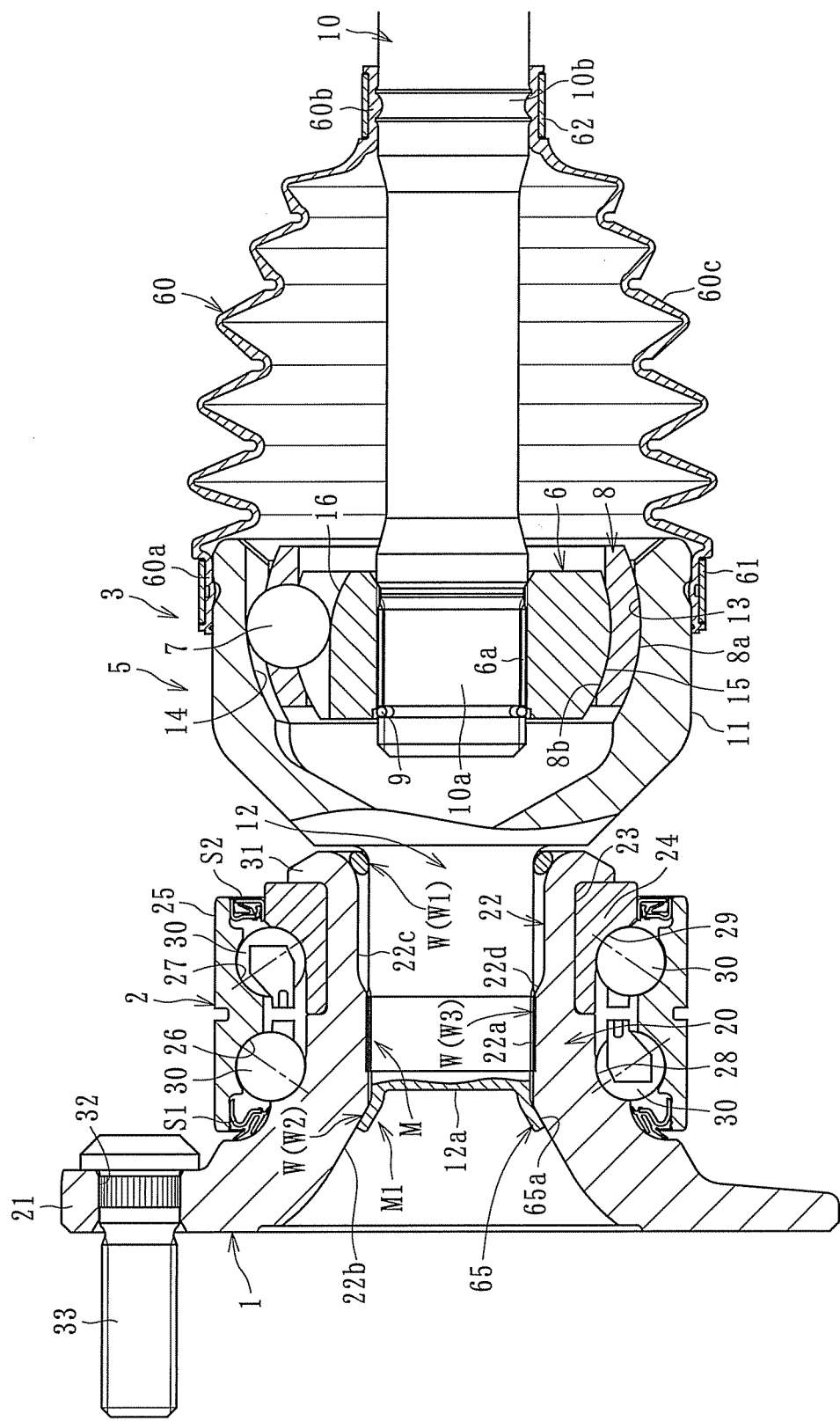
FIG. 1 A longitudinal sectional view of a bearing device for a wheel according to a first embodiment of the present invention.

Embodiments of the present invention are described below with reference to FIGS. 1 to 35. A bearing device for a wheel according to a first embodiment is illustrated in FIG. 1. In the bearing device for a wheel, a hub wheel 1, a double-row roller bearing 2, and a constant velocity universal joint 3 are united together.

The constant velocity universal joint 3 mainly includes an outer race 5 as an outer joint member, an inner race 6 as an inner joint member arranged on an inner side of the outer race 5, a plurality of balls 7 provided between the outer race 5 and the inner race 6 to transmit torque, and a cage 8 provided between the outer race 5 and the inner race 6 to retain the balls 7. An end portion 10a of a shaft 10 is press-fitted into a hole inner diameter 6a of the inner race 6 to effect spline fitting, whereby connection with the shaft 10 is effected so as to allow torque transmission. Note that, a lock ring 9 for preventing shaft slipping-off is mounted to the end portion 10a of the shaft 10.

The outer race 5 includes a mouth section 11 and a stem section (shaft section) 12, and the mouth section 11 is formed into a cup-like shape open at its one end. In an inner spherical surface 13 thereof, there are formed a plurality of axially extending track grooves 14 at equal circumferential intervals. The track grooves 14 extend to an opening end of the mouth section 11. The inner race 6 has in an outer spherical surface 15 thereof a plurality of axially extending track grooves 16 formed at equal circumferential intervals.

The track grooves 14 of the outer race 5 and the track grooves 16 of the inner race 6 are paired with each other, and one ball 7 as a torque transmission element is incorporated into a ball track formed by each pair of track grooves 14 and 16 so as to be capable of rolling. The balls 7 are provided between the track grooves 14 of the outer race 5 and the track grooves 16 of the inner race 6 to transmit torque. The cage 8 is slidably provided between the outer race 5 and the inner race 6, with an outer spherical surface 8a thereof coming into contact with the inner spherical surface 13 of the outer race 5 and an inner spherical surface 8b thereof coming into contact with the outer spherical surface 15 of the inner race 6. Note that, the constant velocity universal joint in this case is of the undercut free type in which each of the track grooves has a linear straight portion provided to a groove bottom. However, it is also possible to adopt a constant velocity universal joint of some other type such as the Rzeppa type.

Further, the opening portion of the mouth section 11 is closed by a boot 60. The boot 60 includes a larger diameter portion 60a, a smaller diameter portion 60b, and a bellows portion 60c for coupling the larger diameter portion 60a and the smaller diameter portion 60b. The larger diameter portion 60a is externally fitted to the opening portion of the mouth section 11, and fastened with a boot band 61 in this state. The smaller diameter portion 60b is externally fitted to a boot mount portion 10b of the shaft 10, and fastened with a boot band 62 in this state.

The hub wheel 1 includes a cylindrical section 20, and a flange 21 provided to an end portion on an outboard side of the cylindrical section 20. A hole portion 22 of the cylindrical section 20 includes a shaft section fitting hole 22a as an axial middle portion, a tapered hole 22b on the outboard side, and a larger diameter hole 22c on an inboard side. That is, in the shaft section fitting hole 22a, through a recess-projection fitting structure M described later, the shaft section 12 of the outer race 5 of the constant velocity universal joint 3 and the hub wheel 1 are coupled with each other. Further, a tapered portion (tapered hole) 22d is provided between the shaft section fitting hole 22a and the larger diameter hole 22c. The tapered portion 22d is reduced in diameter along a press-fitting direction at the time of coupling the hub wheel 1 and the shaft section 12 of the outer race 5. A taper angle θ (see FIG. 3) of the tapered portion 22d is set to 15° to 75°, for example.

The roller bearing 2 includes an inner member having an inner race 24 fitted to a smaller-diameter step section 23 provided on a joint side of the cylindrical section 20 of the hub wheel 1, and an outer member 25 externally fitted to both of the cylindrical section 20 and the inner race 24 of the hub wheel 1. In the outer member 25, outer raceway surfaces (outer raceways) 26 and 27 in two rows are provided on an inner circumference thereof. The first outer raceway surface 26 and a first inner raceway surface (inner raceways) 28 provided on an outer circumference of the shaft section of the hub wheel 1 are opposed to each other. The second outer raceway surface 27 and a second inner raceway surface (inner raceways) 29 provided on an outer peripheral surface of the inner race 24 are opposed to each other. Balls as rolling elements 30 are interposed between the first outer raceway surface 26 and the first inner raceway surface 28 and between the second outer raceway surface 27 and the second inner raceway surface 29. That is, a part (outer surface of the cylindrical section 20) of the hub wheel 1 and the inner race 24 press-fitted to the outer circumference of the end portion on the inboard side of the hub wheel 1 constitute the inner member including the inner raceways 28 and 29. Note that, seal members S1 and S2 are mounted to both opening portions of the outer member 25, respectively.

In this case, the end portion on the inboard side of the hub wheel 1 is forged, whereby precompression is applied to the roller bearing 2 by a forged portion 31. Consequently, the inner race 24 can be fastened to the hub wheel 1. Further, a bolt inserting hole 32 is provided in the flange 21 of the hub wheel 1, and a hub bolt 33 for fixing a wheel and a brake rotor to the flange 21 is inserted into the bolt inserting hole 32.

Normally, the hub wheel 1 is made of medium carbon steel such as S53C (for example, steel containing carbon of 0.40 to 0.80 wt %). After being subjected to hot forging, the hub wheel 1 is formed to have a desired shape and dimension by turning. Then, a hardened layer is formed on a required portion of the hub wheel by induction quenching, etc. Meanwhile, in order to increase strength and durability of the hub wheel under a rotating bending condition while realizing a reduction in weight of the hub wheel 1, a thermal refining treatment is sometimes performed on the hub wheel which has been subjected to hot forging.

In the thermal refining treatment for the hub wheel 1, quenching is performed after the forging, and tempering is performed at a relatively high temperature of 400° C. or more, with the result that troostite or sorbite structure is obtained. Owing to the thermal refining treatment, the structure is granulated, and its mechanical properties such as tensile strength, bending strength, and an impact value are increased, thereby enhancing its ductility and tenacity. By increasing the surface hardness, mechanical strength is improved. However, in this case, the surface hardness after performing the thermal refining treatment is set to be equal to or smaller than 35 points in HRC. When the surface hardness is set to exceed 35 points in HRC, processability in cutting or the like is reduced, and a degree of deformation caused by heat treatment is increased. Accordingly, accuracy in surface deflection of a brake rotor attachment surface (end surface on the outboard side) of the wheel attachment flange 21 is deteriorated, and a press-fitting property of the hub bolt 33 is reduced due to the increase in hardness.

Figure 3:
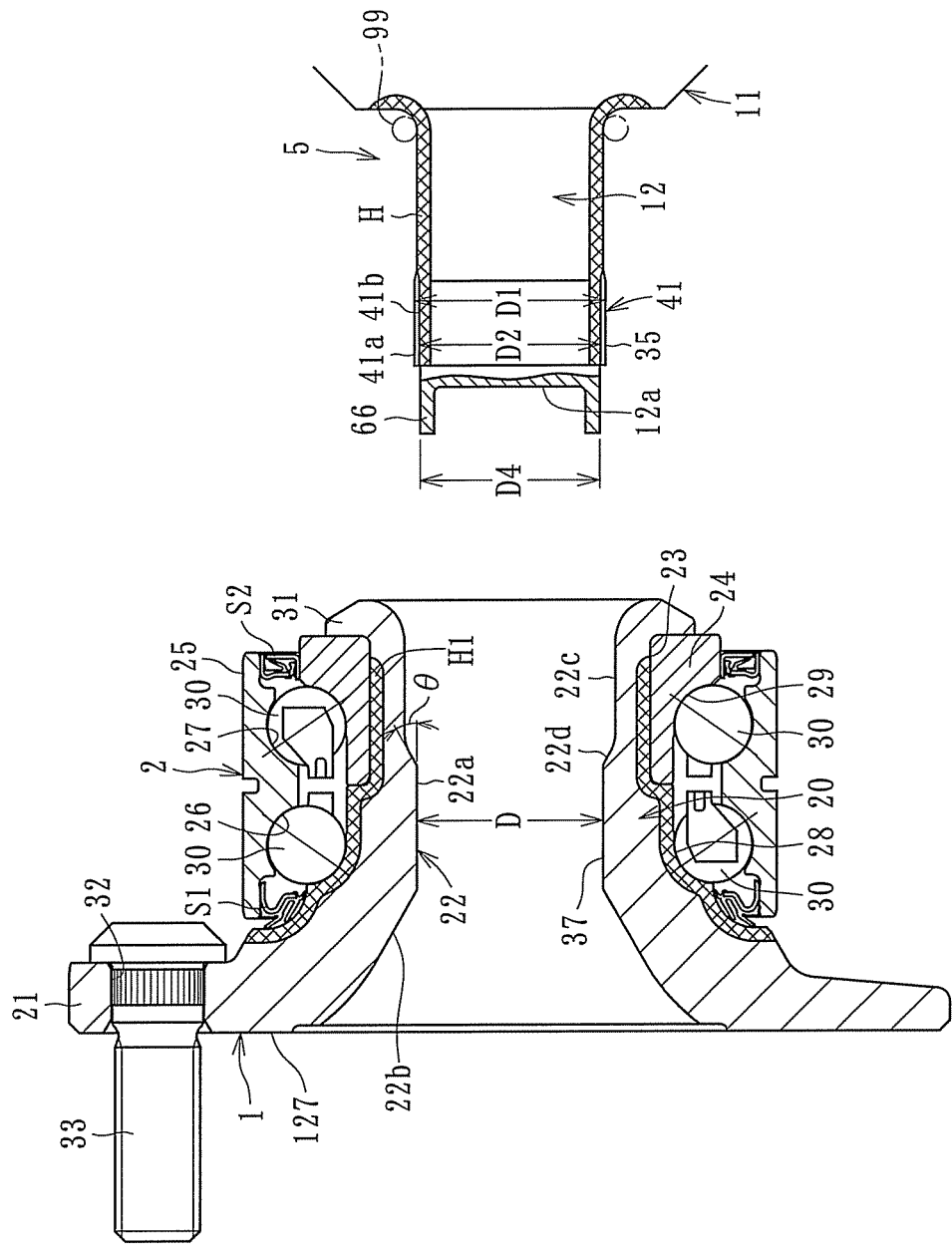
FIG. 3 A sectional view of the bearing device for a wheel prior to assembly.

Further, as illustrated in FIG. 3, on an outer surface of the hub wheel 1, a hardened layer H1 is provided in a region (indicated by a cross-hatched region in the drawing) which contains the inner raceway surface 28 on the outboard side and ranges from a seal land to a surface corresponding to the smaller-diameter step section 23 to which the inner race 24 is externally fitted. That is, the hardened layer H1 is provided in a region ranging from the outer surface of the hub wheel 1, with which a seal lip of the seal member S1 mounted to the end portion on the outboard side of the roller bearing 2 is brought into slide-contact, via the raceway surface 28 to an inner race fitting surface of the hub wheel 1. The surface hardness of the hardened layer H1 is set within a range of from 54 to 64 HRC.

When the surface hardness of the end portion on the inboard side of the hub wheel 1 exceeds 35 points in HRC upon formation of the forged portion 31, there is a fear that not only the processability is reduced but also micro cracks occur in the surface thereof by plastic working, and its reliability is deteriorated in terms of quality. In view of the plastic working, it is preferred that the surface hardness be low. Induction tempering is performed on the end portion on the inboard side of the hub wheel 1, and the surface hardness of the end portion is set to be equal to or smaller than 25 points in HRC, thereby the reliability is improved. In addition, in comparison with a conventional unhardened section not subjected to the heat treatment to keep a state after the forging, there is no fear that micro cracks occur in the surface by the plastic working, and the reliability is further improved in terms of quality.

Figure 2A:
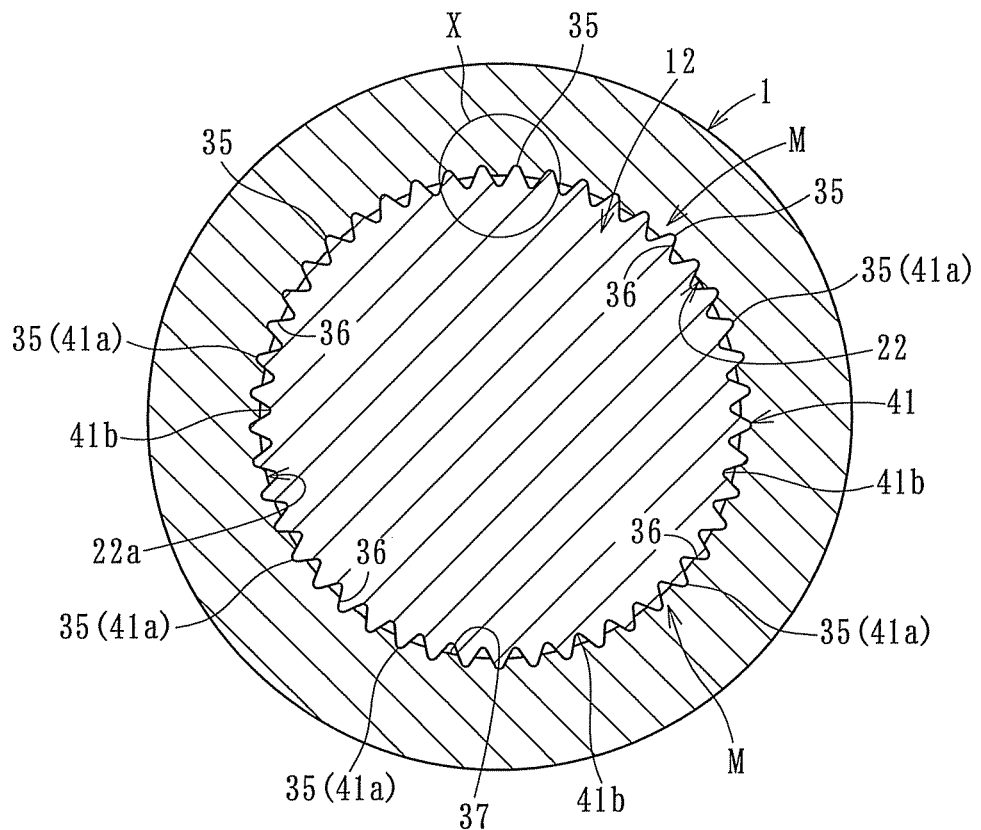
FIG. 2A An enlarged sectional view of a recess-projection fitting structure of the bearing device for a wheel.

As illustrated in FIG. 2, the recess-projection fitting structure M includes projecting portions 35 provided on the end portion of the shaft section 12 to extend in the axial direction and recessed portions 36 formed in an inner surface of the hole portion 22 of the hub wheel 1 (inner surface 37 of the shaft section fitting hole 22*a*, in this case). The projecting portions 35 and the recessed portions 36 of the hub wheel 1 are held in close contact with each other through the entire region of fitting contact regions 38 therebetween, the recessed portions 36 fitting to the projecting portions 35. That is, the plurality of projecting portions 35 are arranged at predetermined pitches along a circumferential direction on an outer peripheral surface on the opposite mouth-portion-side of the shaft section 12, and the plurality of recessed portions 36 are formed along a circumferential direction, which allow the projecting portions 35 to fit to an inner surface 37 of the shaft section fitting hole 22*a* of the hole portion 22 of the hub wheel 1. That is, over the entire circumferential direction, the projecting portions 35 and the recessed portions 36 fitting thereto tightly fit to each other.

In this case, as illustrated in FIG. 2(*a*), each of the projecting portions 35 is formed into a triangular shape (ridge shape) having a vertex of a convex round shape in cross-section, and each of the fitting contact regions 38 is illustrated as a range A in FIG. 2(*b*), the range extending from a middle-slope portion to a summit of the ridge shape in cross-section. Further, between the projecting portions 35 adjacent to each other in the circumferential direction, gaps 40 are formed on the radially inner side with respect to the inner surface 37 of the hub wheel 1.

As described above, the hub wheel 1 and the shaft section 12 of the outer race 5 of the constant velocity universal joint 3 can be coupled with each other through the recess-projection fitting structure M. In this case, as described above, the end portion on the inboard side of the hub wheel 1 is forged, and the forged portion 31 thus formed applies precompression to the roller bearing 2. Thus, it is unnecessary to apply precompression to the inner race 24 at the mouth section 11 of the outer race 5, and the mouth section 11 is kept out of contact with an end portion of the hub wheel 1 (forged portion 31, in this case).

Further, a shaft slip-off preventing structure M1 is provided between the end portion of the shaft section 12 of the outer race 5 and the inner surface 37 of the hub wheel 1. The shaft slip-off preventing structure M1 includes an engaging portion (tapered locking piece) 65 that extends from the end portion of the shaft section 12 of the outer race 5 to the outboard side (outer side of the vehicle in the state in which the bearing device is attached to the vehicle) and locks (engages) to a tapered hole 22*b*. In other words, the tapered locking piece 65 is formed of a ring-like member that increases in diameter from the inboard side (inner side of the vehicle in the state in which the bearing device is attached to the vehicle) to the outboard side. At least a part of an outer peripheral surface 65*a* thereof comes into press-contact or contact with the tapered hole 22*b*.

Figure 7A:
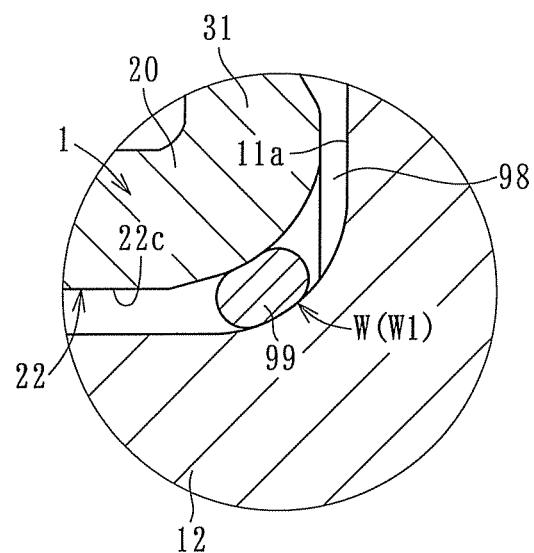
FIG. 7A An enlarged sectional view of a seal member for sealing a gap between a mouth section of an outer race and a forged portion of a hub wheel in the bearing device for a wheel, the seal member being an O-ring.
Figure 7B:
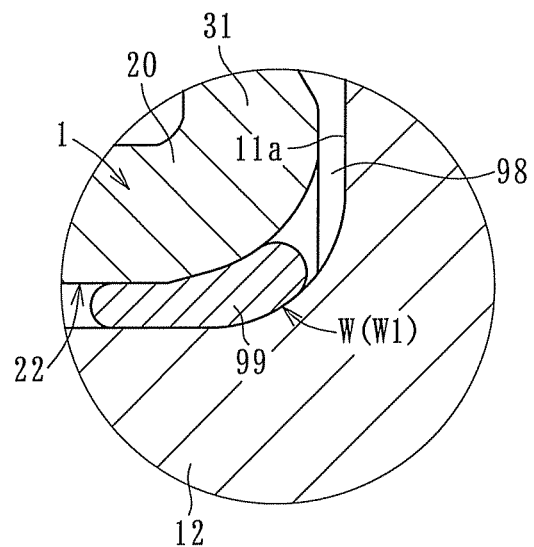
FIG. 7B An enlarged sectional view of the seal member for sealing the gap between the mouth section of the outer race and the forged portion of the hub wheel in the bearing device for a wheel, the seal member being a gasket.

Incidentally, in the bearing device for a wheel, there are provided foreign-matter intrusion prevention means W for preventing a foreign-matter from intruding into the recess-projection fitting structure M. In this case, the foreign-matter intrusion prevention means W are respectively provided on the inboard side with respect to the recess-projection fitting structure M and the outboard side with respect to the recess-projection fitting structure M. That is, as illustrated in FIGS. 7A and 7B, a gap 98 is formed between the forged portion 31 of the hub wheel 1 and a back surface 11*a* of the mouth section 11, and an inboard side foreign-matter intrusion prevention means W1 can be formed of a seal member 99 fitted and attached in the gap 98. In this case, the gap 98 is formed from between the forged portion 31 of the hub wheel 1 and the back surface 11*a* of the mouth section 11 to between the larger diameter hole 22*c* and the shaft section 12. In this embodiment, the seal member 99 is arranged at a corner portion located between the forged portion 31 of the hub wheel 1 and the larger diameter hole 22c. Note that, as the seal member 99, there may be used an O-ring or the like as illustrated in FIG. 7A, or a gasket or the like as illustrated in FIG. 7B. Further, the forged portion 31 may be brought into (held in) contact with the back surface 11a of the mouth section 11, and in this case, surface pressure of the contact portion is set to 100 Mpa or less.

An outboard side foreign-matter intrusion prevention means W2 can be formed of a seal material (not shown) provided between the tapered locking piece 65 serving as the engaging portion and the inner surface of the tapered hole 22b. In this case, a seal material is applied to the tapered locking piece 65. That is, there may be applied a seal material (seal agent) selected from among various resins curable after the application and capable of exerting sealing property between the tapered locking piece 65 and the inner surface of the tapered hole 22b. Note that, as the seal material, there is selected one that does not deteriorate in the atmosphere in which the bearing device for a wheel is used.

It is also possible to provide a seal material between the fitting contact regions 38 between the projecting portions 35 and the recessed portions 36, thereby forming a foreign-matter intrusion prevention means W (W3). In this case, there is applied to the surfaces of the projecting portions 35 a seal material (seal agent) selected from among various resins curable after the application and capable of exerting a sealing property between the fitting contact regions 38.

Figure 38:
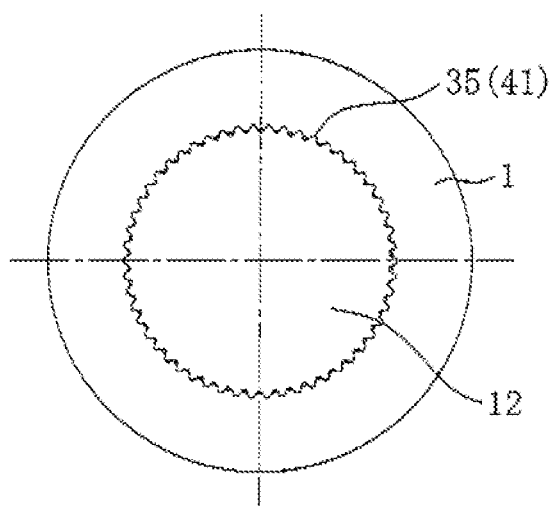
FIG. 38 A sectional view of a recess-projection fitting structure of a bearing device for a wheel.

Next, a method of fitting the recess-projection fitting structure M is described. In this case, as illustrated in FIG. 3, thermosetting treatment is performed on a radially outer portion of the shaft section 12. A spline 41 including projecting portions 41a and recessed portions 41b along the axial direction is formed in the hardened layer H. Therefore, the projecting portions 41a of the spline 41 are hardened and changes to the projecting portions 35 of the recess-projection fitting structure M. Note that, a range of the hardened layer H in this embodiment is, as indicated by the cross-hatched region, from an outer edge of the spline 41 to a part of a bottom wall of the mouth section 11 of the outer race 5. As this thermosetting treatment, various kinds of heat treatment such as induction quenching and carburizing and quenching can be adopted. The induction quenching is a quenching method employing the principle of inserting a portion necessary for quenching into a coil through which a high-frequency current flows, generating Joule heat with an electromagnetic induction action, and heating a conductive substance. Further, the carburizing and quenching is a method of causing carbon to intrude/spread from the surface of a low carbon material and performing quenching after that. Teeth with a module equal to or smaller than 0.5, as illustrated in FIG. 38, are used in the spline 41 of the shaft section 12, the module being a value of the pitch diameter (mm) of the spline 41 divided by the number of teeth.

Further, the hardened layer H1 by the induction quenching is formed on the radially outer side of the hub wheel 1 and the radially inner side of the hub wheel is left in an unhardened state. A range of the hardened layer H1 in this embodiment is, as indicated by the cross-hatched region, from a base portion of the flange 21 to near the forged portion of the smaller-diameter step section 23 to which the inner race 24 is fitted. If the induction quenching is performed, the surface can be hard, hardness of a material in the inside can be kept, and the radially inner side of the hub wheel 1 can be left in an unhardened state. Therefore, the inner surface 37 side of the hole portion 22 of the hub wheel 1 is an unhardened section not subjected to the thermosetting treatment (in an unhardened state).

A hardness difference between the hardened layer H of the shaft section 12 of the outer race 5 and the unhardened section of the hub wheel 1 is set to be equal to or larger than 20 points in HRC. Specifically, it is preferred to set the hardness of the hardened layer H to about 50 to 65 points in HRC and to set the hardness of a recessed-portion forming side (inner surface 37 of the shaft section fitting hole 22a of the hole portion 22 of the hub wheel 1) to about 10 to 30 points in HRC. Note that, as described below, such hardness difference is set in order to facilitate press-fitting the projecting portions 35 of the shaft section 12 to the inner surface of the hole portion 22 of the hub wheel 1 serving as a recessed-portion forming region when the stem section 12 of the outer race 5 is fitted into the hole portion 22 of the hub wheel 1. Therefore, only press-fitting start end portions (end portions on the outboard side) of the projecting portions 35 may be hardened. That is, the hardness difference between the press-fitting start end portions of the projecting portions 35 and the recessed-portion forming region may be at least equal to or larger than 20 points in HRC. Therefore, the hardness of the press-fitting start end portions of the projecting portions 35 may be set to about 50 to 65 points in HRC, and the hardness of the inner surface of the hole portion 22 of the hub wheel 1 serving as the recessed-portion forming region may be set to about 10 to 30 points in HRC.

Figure 6:
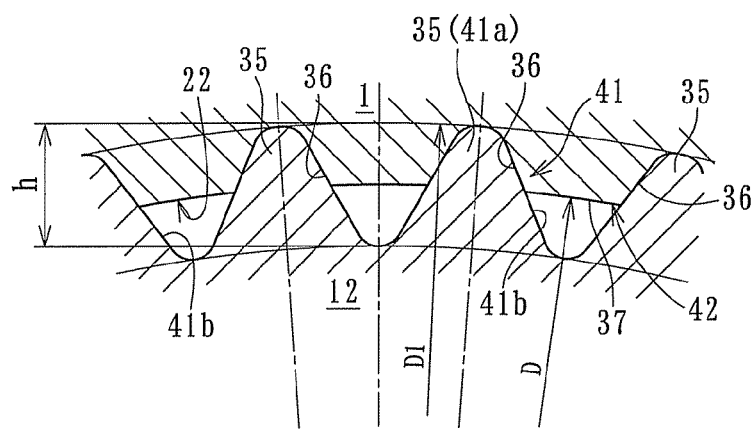
FIG. 6 An enlarged sectional view of a main part of the recess-projection fitting structure of the bearing device for a wheel.

In this case, middle portions in a projecting direction of the projecting portions 35 correspond to a position of a recessed-portion forming surface before recess formation (in this case, inner surface 37 of the shaft section fitting hole 22a of the hole portion 22 of the hub wheel 1). That is, as illustrated in FIG. 6, an inner diameter dimension D of the inner surface 37 of the shaft section fitting hole 22a is set to be smaller than a maximum outer diameter of the projecting portions 35, i.e., a maximum diameter dimension (circumscribed circle diameter) D1 of a circle connecting vertexes of the projecting portions 35 as the projecting portions 41a of the spline 41 and is set to be larger than a maximum diameter dimension D2 of a circle connecting valley bottoms between the projecting portions (bottoms of the recessed portions 41b of the spline 41). In other words, the dimensions are set in a relation of D2<D<D1. Therefore, of the projecting portions 35 of the shaft section 12, at least portions ranging from the vertexes to the middle portions in the projecting direction are press-fitted to the inner surface 37 of the shaft section fitting hole 22a of the hub wheel 1.

The spline 41 can be formed by various machining methods such as component rolling, cutting, pressing, and drawing, which are publicly known and used as conventional means. As the thermosetting treatment, various kinds of heat treatment such as induction quenching and carburizing and quenching can be adopted.

Further, as illustrated in FIG. 3, a short cylindrical section 66 for forming the tapered locking piece 65 is caused to project from an outer peripheral edge portion of an end surface 12a of the shaft section 12 along the axial direction. An outer diameter D4 of the short cylindrical section 66 is set to be smaller than the inner diameter dimension D of the shaft section fitting hole 22a of the hole portion 22. That is, as described below, the short cylindrical section 66 serves as a centering member when the shaft section 12 is press-fitted into the hole portion 22 of the hub wheel 1.

Then, as illustrated in FIG. 3, the seal member 99 such as an O-ring is externally fitted to the base portion (mouth section side) of the shaft section 12 of the outer race 5, and a shaft center of the hub wheel 1 and a shaft center of the outer race 5 of the constant velocity universal joint 3 are in an aligned state. In this state, the shaft section 12 of the outer race 5 is inserted (press-fitted) into the hub wheel 1. Further, a seal material is applied onto the surfaces of the projecting portions 35. In this case, the tapered portion 22d which reduces in diameter along the press-fitting direction is formed on the hole portion 22 of the hub wheel 1, and hence the tapered portion 22d can constitute a guide at the start of press-fitting. Further, the diameter dimension D of the inner surface 37 of the shaft section fitting hole 22a, the diameter dimension D1 of the projecting portions 35, and the diameter dimension D2 of the recessed portions of the spline 41 are in the relation described above. Moreover, the hardness of the projecting portions 35 is larger than the hardness of the inner surface 37 of the shaft section fitting hole 22a by 20 points or more. Therefore, if the shaft 10 is press-fitted into the hole portion 22 of the inner race 6, the projecting portions 35 bite in the inner surface 37, and the projecting portions 35 form the recessed portions 36, in which the projecting portions 35 fit, along the axial direction.

By press-fitting in this way, as illustrated in FIG. 2, the entire fitting contact regions 38 of the projecting portions 35 at the end portion of the shaft section 12 and the recessed portions 36 fit therein are held in close contact with each other. In other words, a shape of the projecting portions 35 is transferred onto the recessed-portion forming surface on the counterpart side (in this case, the inner surface 37 of the shaft section fitting hole 22a of the hole portion 22). When the shape is transferred, because the projecting portions 35 bite in the inner surface 37 of the shaft section fitting hole 22a, the shaft section fitting hole 22a is slightly expanded in diameter and allows movement in the axial direction of the projecting portions 35. If the movement in the axial direction stops, the hole portion 22 decreases in diameter to return to the original diameter. In other words, the hub wheel 1 is elastically deformed in the radial direction when the projecting portions 35 are press-fitted, and precompression equivalent to this elastic deformation is applied to a tooth surface of the projecting portions 35 (surface of the recessed-portion fitting region). Therefore, it is possible to reliably form the recess-projection fitting structure M in which the entire recessed-portion fitting regions of the projecting portions 35 are held in close contact with the recessed portions 36 corresponding thereto.

Further, the seal member 99 such as an O-ring is externally fitted to the base portion (mouth section side) of the shaft section 12 of the outer race 5, and hence, on completion of press-fitting, the gap 98 between the forged portion 31 of the hub wheel 1 and the back surface 11a of the mouth section 11 is closed (sealed) by the seal member 99. In addition, a seal material applied onto the surfaces of the projecting portions 35 seals between the fitting contact regions 38 between the projecting portions 35 and the recessed portions 36.

Figure 15:
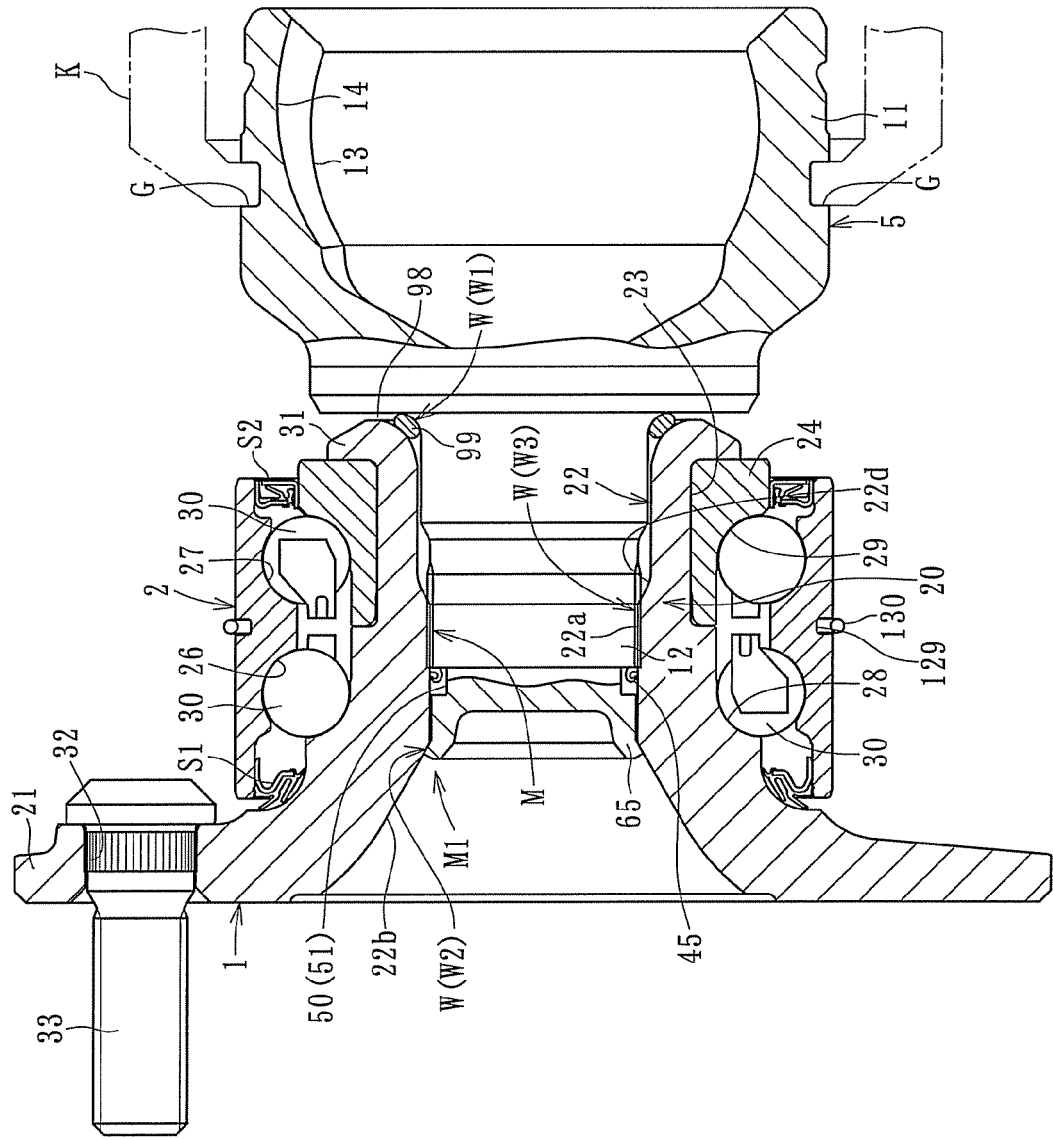
FIG. 15 A longitudinal sectional view of a bearing device for a wheel according to a fourth embodiment of the present invention.

Incidentally, when the shaft section 12 of the outer race 5 is press-fitted into the hole portion 22 of the hub wheel 1, as illustrated in FIG. 15, etc., a stepped surface G may be provided in the outer surface of the mouth section 11 of the outer race 5, and a press-fitting jig K may be engaged on the stepped surface G, whereby press-fitting load (axial load) is applied from the press-fitting jig K onto the stepped surface G. Note that, the stepped surface G may be provided in the entire circumference in the circumferential direction, or the stepped surfaces G may be provided at predetermined pitches along the circumferential direction. Therefore, as the press-fitting jig K, any jig may be used as long as the jig applies the axial load correspondingly to the stepped surfaces G.

Figure 4:
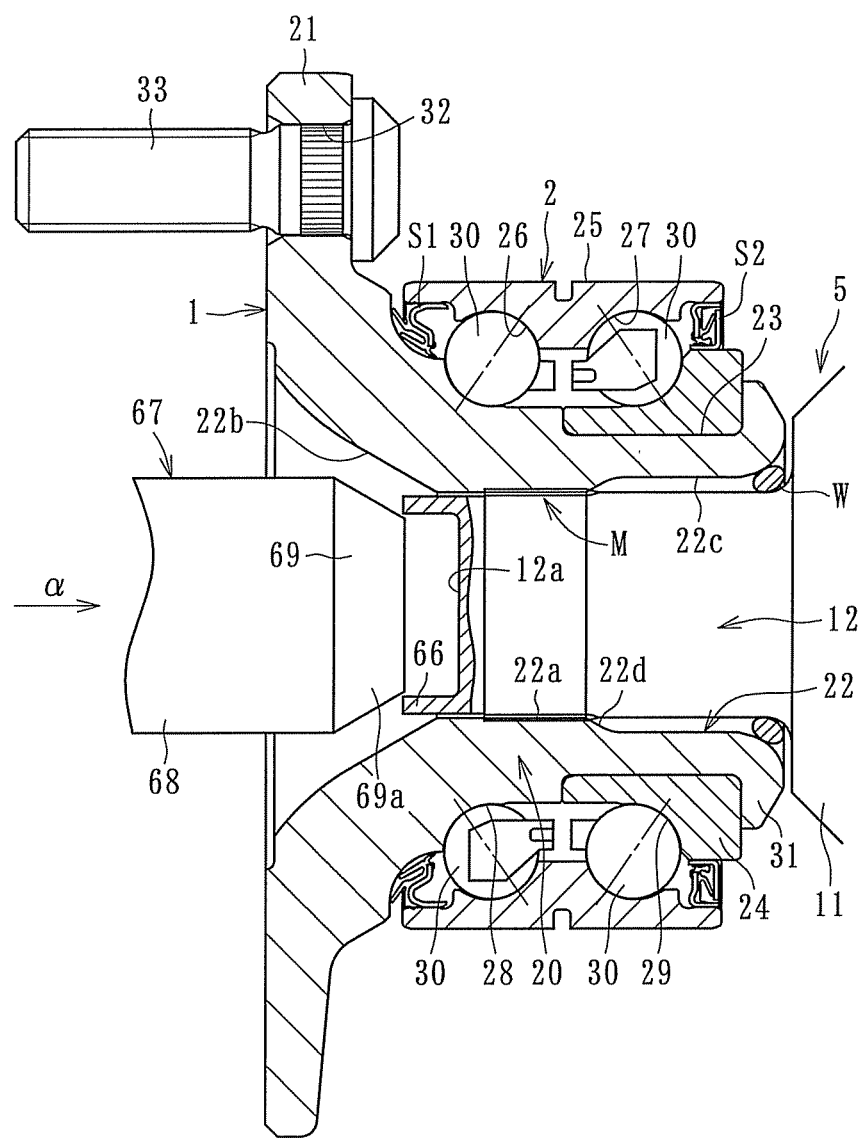
FIG. 4 A sectional view illustrating an assembly method for the bearing device for a wheel.
Figure 5:
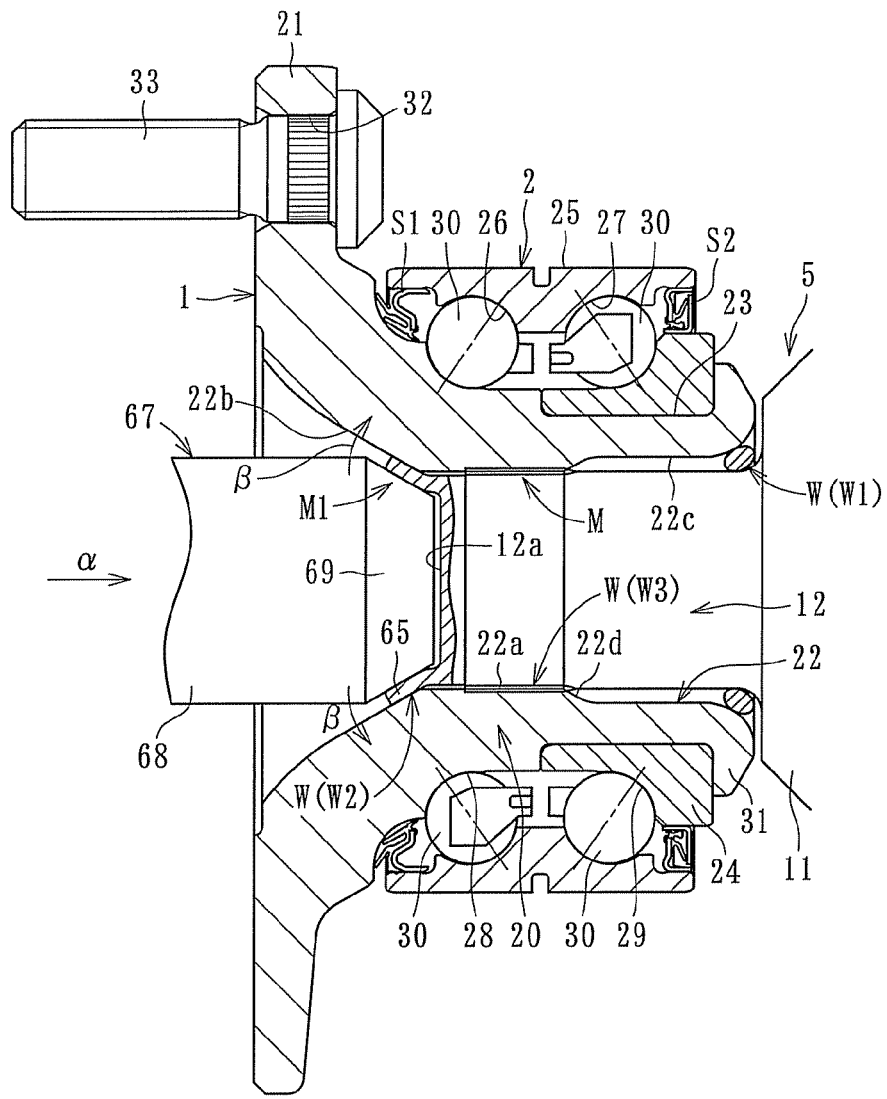
FIG. 5 A sectional view illustrating the assembly method for the bearing device for a wheel.

As described above, in a state in which the shaft section 12 of the outer race 5 is press-fitted into the hole portion 22 of the hub wheel 1 and the shaft section 12 of the outer race 5 and the hub wheel 1 are integrated together through the recess-projection fitting structure M, as illustrated in FIG. 4, the short cylindrical section 66 projects from the shaft section fitting hole 22a toward the tapered hole 22b.

Then, the short cylindrical section 66 is expanded in diameter with use of a jig 67. In this case, a seal material forming the outboard side foreign-matter intrusion prevention means W2 is applied in advance onto the outer surface of the short cylindrical section 66. The jig 67 includes a columnar main body section 68 and a truncated cone section 69 connected to a distal end portion of this main body section 68. In the truncated cone section 69 of the jig 67, a tilt angle of a tilting surface 69a thereof is set substantially the same as a tilt angle of the tapered hole 22b and an outer diameter of a distal end portion of the truncated cone section 69 is set to a dimension equal to or slightly smaller than the inner diameter of the short cylindrical section 66. As illustrated in FIG. 4, the truncated cone section 69 of the jig 67 is fitted in through the tapered hole 22b to apply load in an arrow α direction, whereby a diameter expanding force in an arrow β direction in which the short cylindrical section 66 increases in diameter is applied to the radially inner side of the short cylindrical section 66 illustrated in FIG. 5. When the truncated cone 69 of the jig 67 is fitted in, at least a part of the short cylindrical section 66 is pressed to the inner surface side of the tapered hole 22b and is in press-contact or contact with the inner surface of the tapered hole 22b through the seal material configuring the foreign-matter intrusion prevention means W2. Therefore, the shaft slip-off preventing structure M1 can be configured. Note that, when load in the arrow α direction of the jig 67 is applied, the bearing device for a wheel needs to be fixed not to move in the arrow α direction. However, a part of the hub wheel 1, the constant velocity universal joint 3, or the like only has to be received by a fixed member. The inner surface of the short cylindrical section 66 may be formed into a tapered shape increasing in diameter to the shaft end side. If the inner surface of the short cylindrical section 66 is formed into such shape, it is possible to mold the inner surface by forging. This leads to a reduction in cost.

Further, in order to reduce load in the arrow α direction of the jig 67, a notch may be cut in the short cylindrical section 66 or a conical surface of the truncated cone section 69 of the jig 67 may be partially arranged in the circumferential direction. When the notch is cut in the short cylindrical section 66, it is easy to expand the short cylindrical section 66 in diameter. When the conical surface of the truncated cone section 69 of the jig 67 is partially arranged in the circumferential direction, a region where the short cylindrical section 66 is expanded in diameter is a part on the circumference. Therefore, it is possible to reduce push-in load of the jig 67.

In the recess-projection fitting structure M, as illustrated in FIG. 6, when a diameter difference (D1-D) between the outer diameter dimension (diameter dimension of a circle connecting vertexes of the projecting portions 35) D1 of the shaft section 12 and the inner diameter dimension D of the shaft section fitting hole 22a of the hole portion 22 of the hub wheel 1 is represented as Δd, the height of the projecting portions 35 provided on the outer surface of the shaft section 12 is represented as h, and a ratio of the diameter difference and the height is represented as Δd/2h, a relation among the diameter difference, the height, and the ratio is 0.3<Δd/2h<0.86. Consequently, the middle portions in the projecting direction (middle portions in a height direction) of the projecting portions 35 are reliably arranged on the recessed-portion forming surface before recess formation. Therefore, the projecting portions 35 bite in the recessed-portion forming surface during press-fitting and the recessed portions 36 can be reliably formed.

The recess-projection fitting structure M is formed in this manner. It is preferred that the recess-projection fitting structure M in this case be arranged at an immediate-underside avoiding position with respect to the raceway surfaces 26, 27, 28, and 29 of the roller bearing 2. Incidentally, the immediate-underside avoiding position represents a position of not radially corresponding to a position of a ball contact portion of each of the raceway surfaces 26, 27, 28, and 29.

In the present invention, in the recess-projection fitting structure M, the entire regions of the fitting contact regions 38 between the projecting portions 35 and the recessed portions 36 are held in close contact with each other, and hence a gap in which a backlash occurs is not formed in a radial direction and a circumferential direction in the recess-projection fitting structure M. Thus, the entire fitting regions contribute to rotation torque transmission, and stable torque transmission is possible. In addition, abnormal noise is not generated.

A hardness difference between the press-fitting start end portions of the projecting portions 35 and the recessed-portion forming region is set to be equal to or larger than 20 points in HRC. Thus, when the projecting portions 35 are press-fitted into the counterpart side, it is possible to perform press-fitting only by applying a relatively small press-fitting force (press-fitting load), and to improve a press-fitting property. Further, it is unnecessary to apply large press-fitting load, and hence it is possible to prevent the projecting portions 35 and the recessed portions 36 from being abraded and damaged (torn off), and to stably configure the recess-projection fitting structure M without the gap in which a backlash occurs in the radial direction and the circumferential direction.

If the hardness of the projecting portions is set to 50 to 65 points in HRC, the projecting portions are hard, and more stable recess-projection fitting structure can be configured. Further, if the hardness of the recessed-portion forming region is set to 10 to 30 points in HRC, the recessed-portion forming side is soft, and the press-fitting property can be improved.

The projecting portions can be subjected to heat-treatment hardening by induction heat treatment. When the projecting portions are hardened by the induction heat treatment, there are the following advantages: (a) partial heating is possible and quenching conditions can be easily adjusted; (b) the heating can be performed in a short period of time, and hence a degree of oxidization is low; (c) quenching distortion is smaller in comparison with cases of other quenching methods; (d) the surface hardness is high and excellent abrasion resistance can be obtained; (e) selection of a depth of the hardened layer is relatively easy; and (f) automation is easy and introduction into a machining line is possible.

Owing to provision of the foreign-matter intrusion prevention means W, it is possible to prevent foreign matters from intruding into the recess-projection fitting structure M. That is, the foreign-matter intrusion prevention means W prevents intrusion of rainwater and foreign matters, and it is possible to avoid deterioration of adhesiveness caused by the rainwater, foreign matters, etc. intruding into the recess-projection fitting structure M.

In the bearing device for a wheel in which the seal member 99 is arranged between the end portion of the hub wheel 1 and the bottom portion of the mouth section 11, the seal member 99 closes the gap 98 between the end portion of the hub wheel 1 and the bottom portion of the mouth section 11. Thus, rainwater and foreign matters are prevented from intruding into the recess-projection fitting structure M through the gap 98. Any member can be used as the seal member 99 as long as the member can be interposed between the end portion of the hub wheel 1 and the bottom portion of the mouth section 11, and hence it is possible to use, for example, an existing (commercial) O-ring, and to configure the foreign-matter intrusion prevention means at low cost. Moreover, the commercial O-ring and the like can be selected from ones that have various sizes and are made of various materials. Without separately manufacturing a special member, it is possible to configure the foreign-matter intrusion prevention means reliably exerting a sealing function.

A seal material is interposed between the fitting contact regions 38 between the projecting portions 35 and the recessed portions 36 in the recess-projection fitting structure M. Thus, it is possible to prevent intrusion of the foreign matters in between the fitting contact regions 38, and reliability to prevent intrusion of the foreign matters is improved.

On the outboard side with respect to the recess-projection fitting structure M, there is provided the engaging portion (tapered locking piece 65) engaging on the inner surface of the hub wheel 1 (in this case, inner surface of the tapered hole 22b) through the seal material (seal material configuring the foreign-matter intrusion prevention means W2). Therefore, it is possible to avoid intrusion of the foreign matters from the outboard side.

As described above, in a case where the foreign-matter intrusion prevention means W1 and W2 are respectively provided on the inboard side with respect to the recess-projection fitting structure M and the outboard side with respect to the recess-projection fitting structure M as in the above-mentioned embodiments, the foreign matters are prevented from intruding from both end sides in the axial direction of the recess-projection fitting structure M. Thus, it is possible to avoid deterioration of the adhesiveness more stably over a long period of time.

It is unnecessary to form a spline and the like in advance on the member (in this case, hub wheel 1) in which the recessed portions 36 are formed. The bearing device for a wheel is excellent in productivity. Further, phase alignment of the splines is unnecessary. It is possible to achieve improvement of an assembly property, to thereby prevent damages to the tooth surfaces during press-fitting, and hence possible to maintain a stable fitting state.

The tapered portion 22d can constitute the guide at the start of press-fitting, and hence it is possible to press-fit the shaft section 12 of the outer race 5 into the hole portion 22 of the hub wheel 1 without misalignment, and to perform stable torque transmission. In addition, the outer diameter D4 of the short cylindrical section 66 is set to be smaller than the inner diameter dimension D of the shaft section fitting hole 22a of the hole portion 22, and hence the short cylindrical section 66 serves as a centering member. Therefore, it is possible to press-fit the shaft section into the hub wheel while preventing decentering and tilting axis, and to perform more stable press-fitting.

With the shaft slip-off preventing structure M1, it is possible to effectively prevent the shaft section 12 of the outer race 5 from slipping off from the hole portion 22 of the hub wheel 1 (in particular, slipping off in the axial direction to the shaft side). Consequently, it is possible to maintain a stable coupled state, and to realize improvement of a quality of the bearing device for a wheel. Further, the shaft slip-off preventing structure M1 is the tapered locking piece 65, and hence conventional screw fastening can be omitted. Therefore, it is unnecessary to form in the shaft section 12 a screw section projecting from the hole portion 22 of the hub wheel 1. It is possible to realize a reduction in weight, to omit screw fastening work, and to improve assembly workability. Moreover, in the tapered locking piece 65, only apart of the shaft section 12 of the outer race 5 has to be expanded in diameter, and hence it is possible to easily perform formation of the shaft slip-off preventing structure M1. Note that, in the movement of the shaft section 12 of the outer race 5 in the reverse joint direction, a pressing force in a direction for further press-fitting the shaft section 12 is necessary. Therefore, positional shift in the reverse joint direction of the shaft section 12 of the outer race 5 extremely hardly occurs. Even if the shaft section 12 shifts in this direction, because the bottom portion of the mouth section 11 of the outer race 5 comes into contact with the forged portion 31 of the hub wheel 1, the shaft section 12 of the outer race 5 does not slip off from the hub wheel 1.

The hardness of axial end portions of the projecting portions of the shaft section 12 of the outer race 5 of the constant velocity universal joint 3 is set to be higher than the hardness of the radially inner portion of the hole portion of the hub wheel 1, and the shaft section 12 is press-fitted into the hole portion 22 of the hub wheel 1 from the axial end portion side of the projecting portions 35. Thus, the recessed portions are easily formed in the radially inner portion of the hole portion of the hub wheel 1. Further, the hardness on the shaft section side can be set to be high, and torsion strength of the shaft section 12 can be increased.

Further, the end portion of the hub wheel 1 is forged and precompression is applied on the roller bearing 2, and hence it is unnecessary to apply precompression with the mouth section 11 of the outer race 5. Therefore, it is possible to press-fit the shaft section 12 of the outer race 5 without taking into account precompression, and to realize improvement of connectability (assemblability) of the hub wheel 1 and the outer race 5.

Note that, in a case where the forged portion 31 of the hub wheel 1 and the back surface 11a of the mouth section 11 are brought into (held in) contact with each other, positioning of the shaft section 12 of the outer race 5 can be realized. Owing to the positioning in this manner, dimension accuracy of the bearing device for a wheel is stabilized, and it is possible to secure stable length as axial length of the recess-projection fitting structure M disposed along the axial direction, and to realize improvement of torque transmission performance. However, when the contact surface pressure between the forged portion 31 of the hub wheel 1 and the back surface 11a of the mouth section 11 exceeds 100 MPa, abnormal noise is likely to be caused. That is, when torque load is large, a difference occurs between a torsion amount of the outer race 5 of the constant velocity universal joint 3 and a torsion amount of the hub wheel 1. Sudden slip occurs in the contact portion between the outer race 5 of the constant velocity universal joint 3 and the hub wheel 1 because of this difference and abnormal noise occurs. On the other hand, when the forged portion 31 and the back surface 11a of the mouth section 11 are held in contact with each other, the contact surface pressure is equal to or lower than 100 MPa, and hence it is possible to prevent sudden slip from occurring and to suppress occurrence of abnormal noise. Consequently, it is possible to configure a silent bearing device for a wheel.

Generation of hoop stress on the raceway surfaces of the bearing is suppressed at minimum by arranging the recess-projection fitting structure M at an immediate-underside avoiding position with respect to the raceway surfaces of the roller bearing 2. Consequently, it is possible to prevent occurrence of deficiencies of the bearing such as a reduction in rolling fatigue life, occurrence of a crack, and stress corrosion crack, and it is possible to provide a bearing with high quality.

As in this embodiment, teeth with a module equal to or smaller than 0.5 are used in the spline 41 formed in the shaft section 12. Therefore, it is possible to realize improvement of moldability of the spline 41, and to realize a reduction in press-fitting load. Note that, the projecting portions 35 can be configured by a spline normally formed in the shaft of this kind, and hence it is easy to form the projecting portions 35 at low cost.

Further, when the recessed portions 36 are formed by press-fitting the shaft section 12 into the hub wheel 1, work hardening occurs on the recessed portion 36 side. The work hardening means that, when an object is subjected to plastic deformation (plastic working), resistance against deformation increases as a degree of deformation increases and the object becomes harder than a material not subjected to deformation. Therefore, according to plastic deformation during press-fitting, the inner surface 37 of the hub wheel 1 on the recessed portion 36 side hardens, and it is possible to realize improvement of rotation torque transmission performance.

The radially inner side of the hub wheel 1 is relatively soft. Therefore, it is possible to realize improvement of fittability (adhesiveness) in fitting the projecting portions 35 of the outer surface of the shaft section 12 of the outer race 5 in the recessed portions 36 of the inner surface of the hole portion of the hub wheel 1. It is possible to accurately suppress a backlash from occurring in the radial direction and the circumferential direction.

In the present invention, the thermal refining of the hub wheel 1 is performed, and hence improvement of fatigue strength of a material can be realized. Therefore, it is possible to increase strength and durability of the hub wheel 1 while realizing a reduction in size and weight. Further, it is possible to secure fixation strength of the hub bolt without deteriorating the surface deflection causing brake judder.

The surface hardness of the hardened layer H1 can be set to 54 to 64 points in HRC. Thus, in the outer surface of the hub wheel 1, it is possible not only to improve abrasion resistance in a region ranging from a base portion 127 on the inboard side of the wheel attachment flange 21 to the inner raceway surfaces 28 and 29 on the inboard side and the outboard side, but also to increase mechanical strength sufficiently. Accordingly, the strength and durability of the hub wheel 1 are further increased.

In the hub wheel 1 in which the end portion on the inboard side thereof is subjected to plastic deformation outwardly in the radial direction to thereby form the forged portion 31, and in which the inner race 24 is fixed by the forged portion 31 in the axial direction, the surface hardness of the end portion on the inboard side of the hub wheel 1 is set to be equal to or smaller than 25 points in HRC. Thus, the forged portion 31 can be formed by the end portion of the hub wheel 1, and it is unnecessary to control an amount of precompression through firm fastening with a nut or the like unlike the conventional case. Consequently, it is possible to easily incorporate the bearing device for a wheel into the vehicle, and to maintain the amount of precompression for a long period of time. Further, in comparison with a conventional unhardened section not subjected to the heat treatment to keep a state after the forging, processability of the forged portion is not reduced, and there is no fear that micro cracks occur in the surface by the plastic working. As a result, the reliability is further improved in terms of quality.

When the hub wheel 1 is made of medium carbon steel containing carbon of 0.40 wt % to 0.80 wt %, such hub wheel has advantages in terms of easiness of forging, a cutting property, a heat treatment property, or economy. In particular, induction quenching or the like is preferably adopted.

Figure 8:
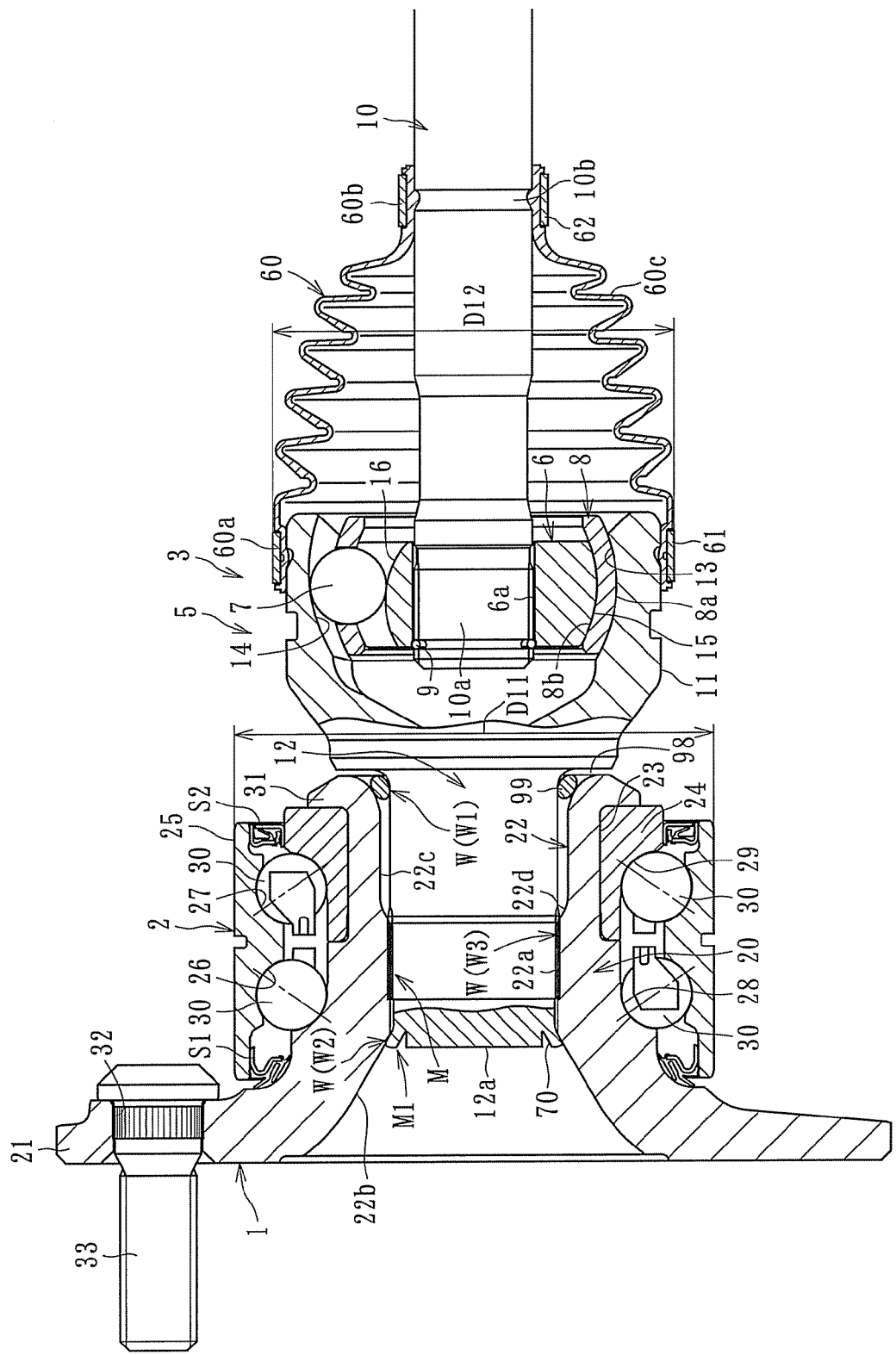
FIG. 8 A longitudinal sectional view of a bearing device for a wheel according to a second embodiment of the present invention.

FIG. 8 illustrates a second embodiment. The shaft slip-off preventing structure M1 of the bearing device for a wheel is configured by providing a tapered locking piece 70 as an engaging portion that projects in the radially outer direction in a part of the shaft section 12 rather than forming the short cylindrical section 66 illustrated in FIG. 4 in advance.

Figure 9:
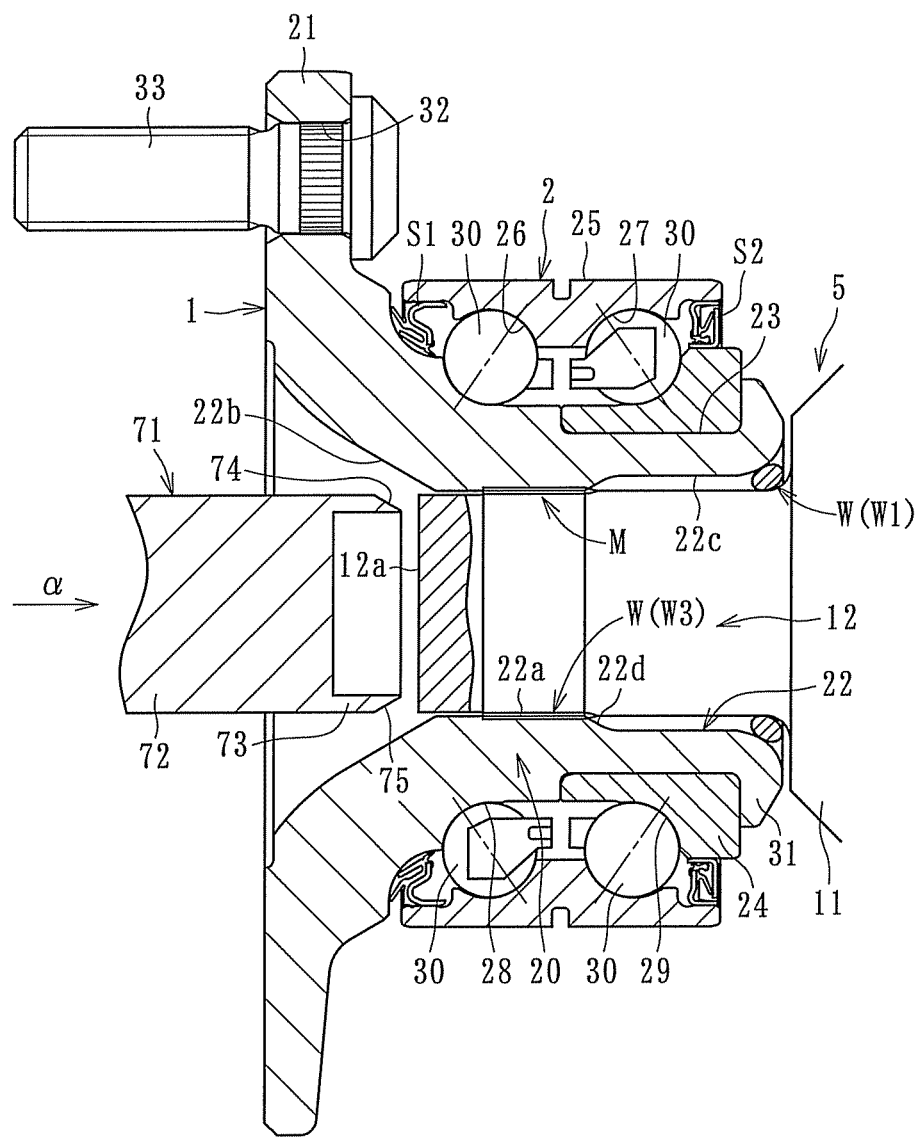
FIG. 9 A sectional view illustrating an assembly method for the bearing device for a wheel illustrated in FIG. 8.
Figure 10:
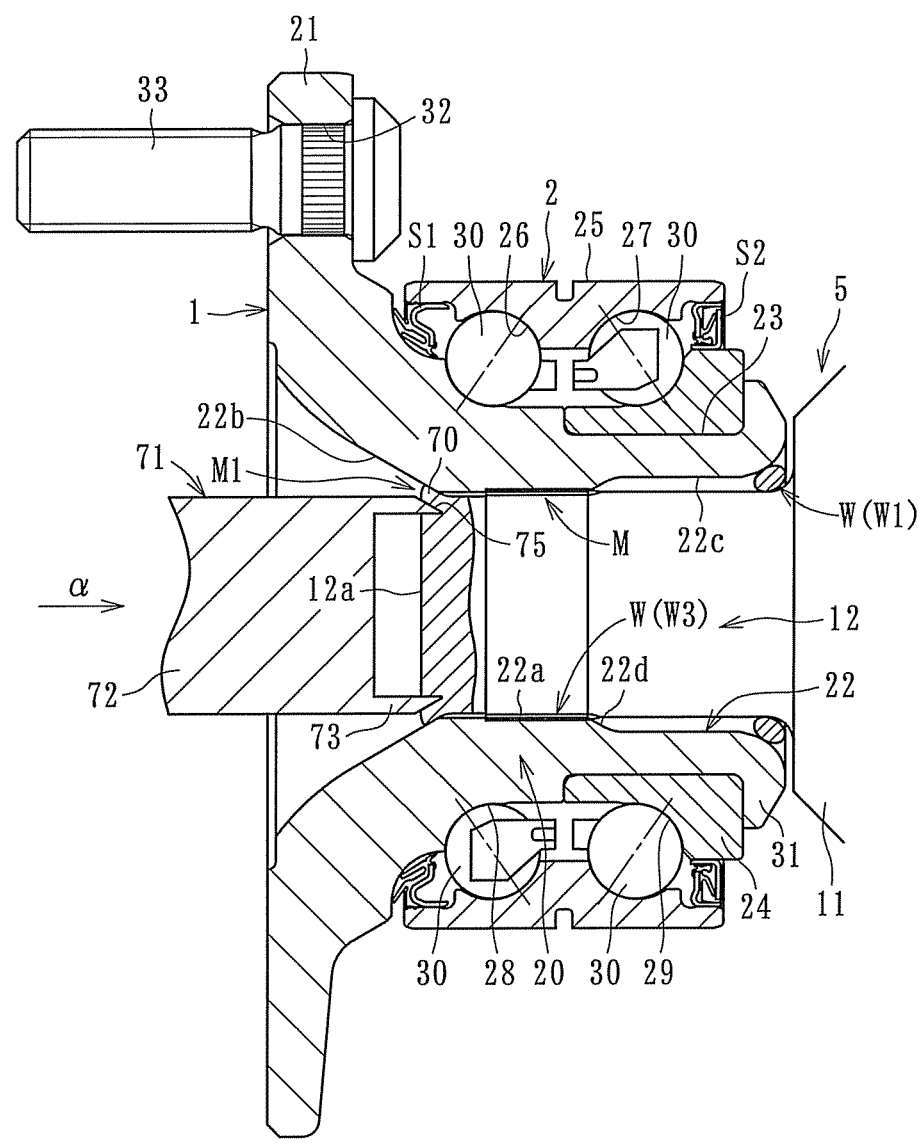
FIG. 10 A sectional view illustrating the assembly method for the bearing device for a wheel illustrated in FIG. 8.

In this case, a jig 71 illustrated in FIGS. 9 and 10 is used. The jig 71 includes a columnar main body section 72 and a short cylindrical section 73 connected to a distal end of the main body section 72. A notch 74 is provided at a distal end of an outer peripheral surface of the short cylindrical section 73. Therefore, a distal end wedge section 75 is formed in the jig 71. If the distal end wedge section 75 is driven (load in the arrow a direction is applied), a sectional shape of the distal end wedge section 75 exhibits a tilting surface on the radially outer side, and, as illustrated in FIG. 10, the radially outer side of the end portion of the shaft section 12 is expanded in diameter by the notch 74 forming the tilting surface.

Consequently, at least a part of the tapered locking piece 70 comes into press-contact or contact with the inner surface of the tapered hole 22b. Therefore, like the tapered locking piece 65 illustrated in FIG. 1 and the like, such tapered locking piece 70 can effectively prevent the shaft section 12 of the outer race 5 from slipping off in the axial direction from the hole portion 22 of the hub wheel 1. Consequently, it is possible to maintain a stable coupled state and to realize improvement of a quality of the bearing device for a wheel. Note that, an inner surface of the distal end wedge section 75 may be formed into a tapered shape.

Figure 11:
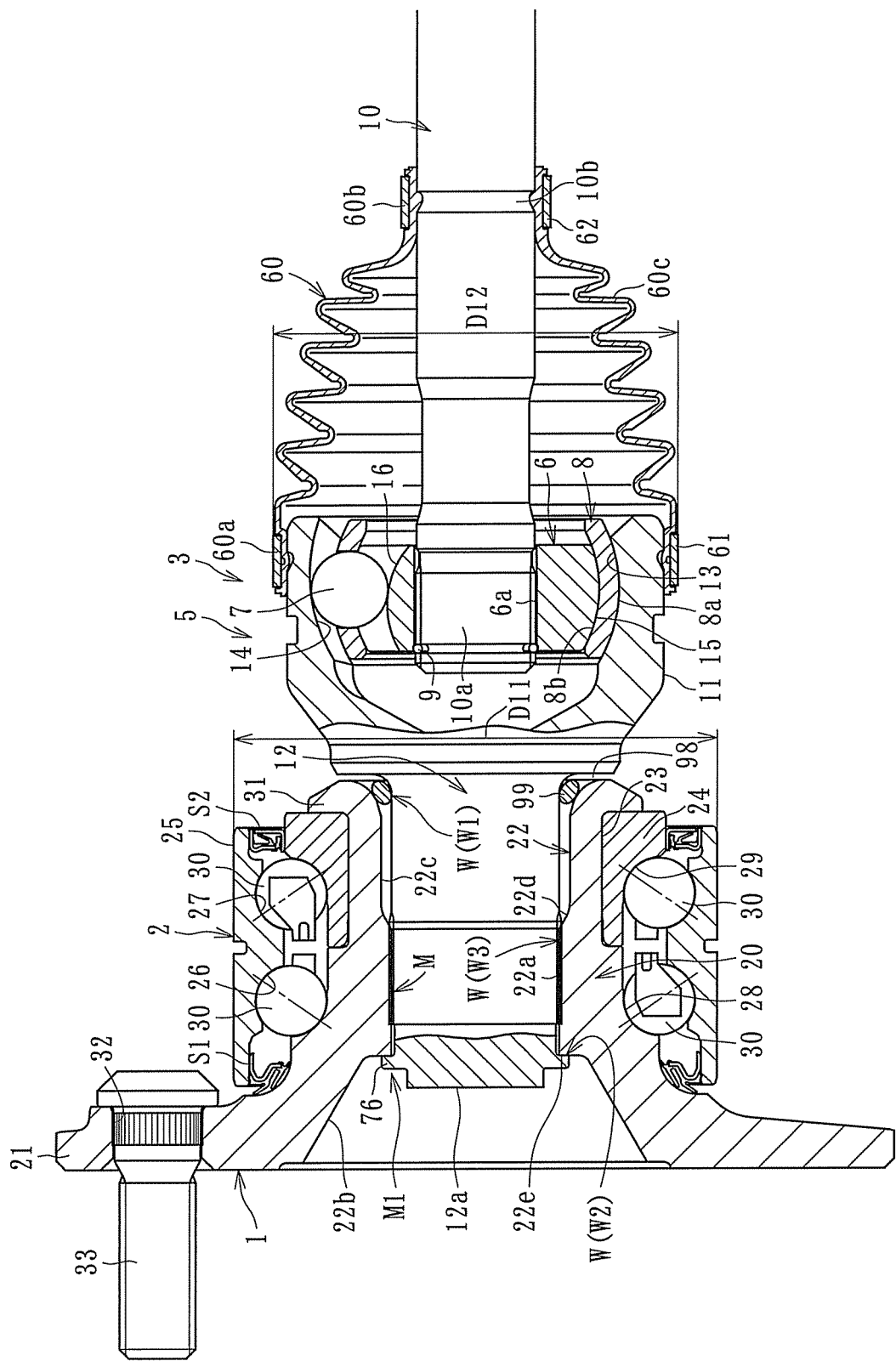
FIG. 11 A longitudinal sectional view of a bearing device for a wheel according to a third embodiment of the present invention.

FIG. 11 illustrates a third embodiment. The shaft slip-off preventing structure M1 of the bearing device for a wheel is configured by an outer collar-like locking piece 76 formed by forging a part of the shaft section 12 to project the same in the radially outer direction. In this case, in the hole portion 22 of the hub wheel 1, a stepped surface 22e is provided between the shaft section fitting hole 22a and the tapered hole 22b. The outer collar-like locking piece 76 serving as the engaging portion locks to the stepped surface 22e.

Figure 12:
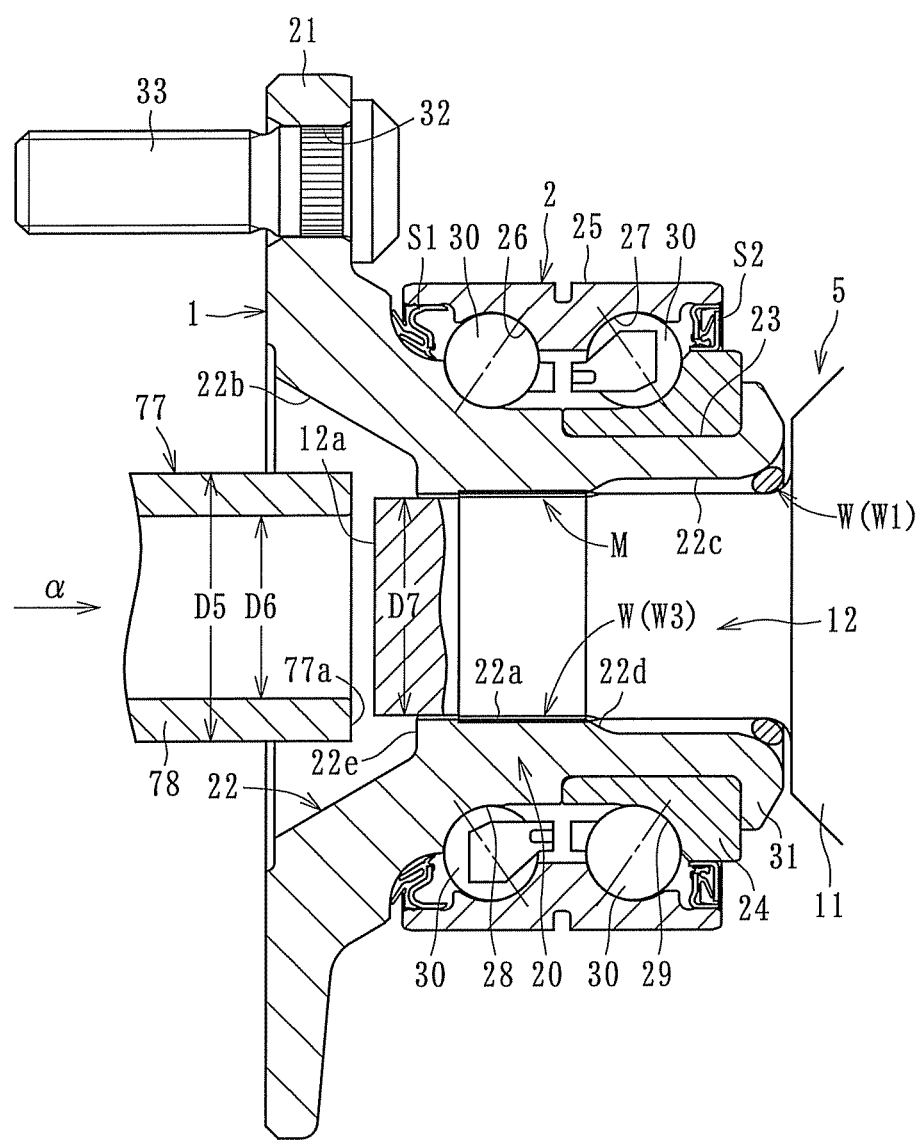
FIG. 12 A longitudinal sectional view of the bearing device for a wheel illustrated in FIG. 11.

In the shaft slip-off preventing structure M1, a jig 77 illustrated in FIG. 12 is used. The jig 77 includes a cylindrical member 78. An outer diameter D5 of the cylindrical member 78 is set to be larger than an outer diameter D7 of the end portion of the shaft section 12 and an inner diameter D6 of the cylindrical member 78 is set to be smaller than the outer diameter D7 of the end portion of the shaft section 12.

Figure 13:
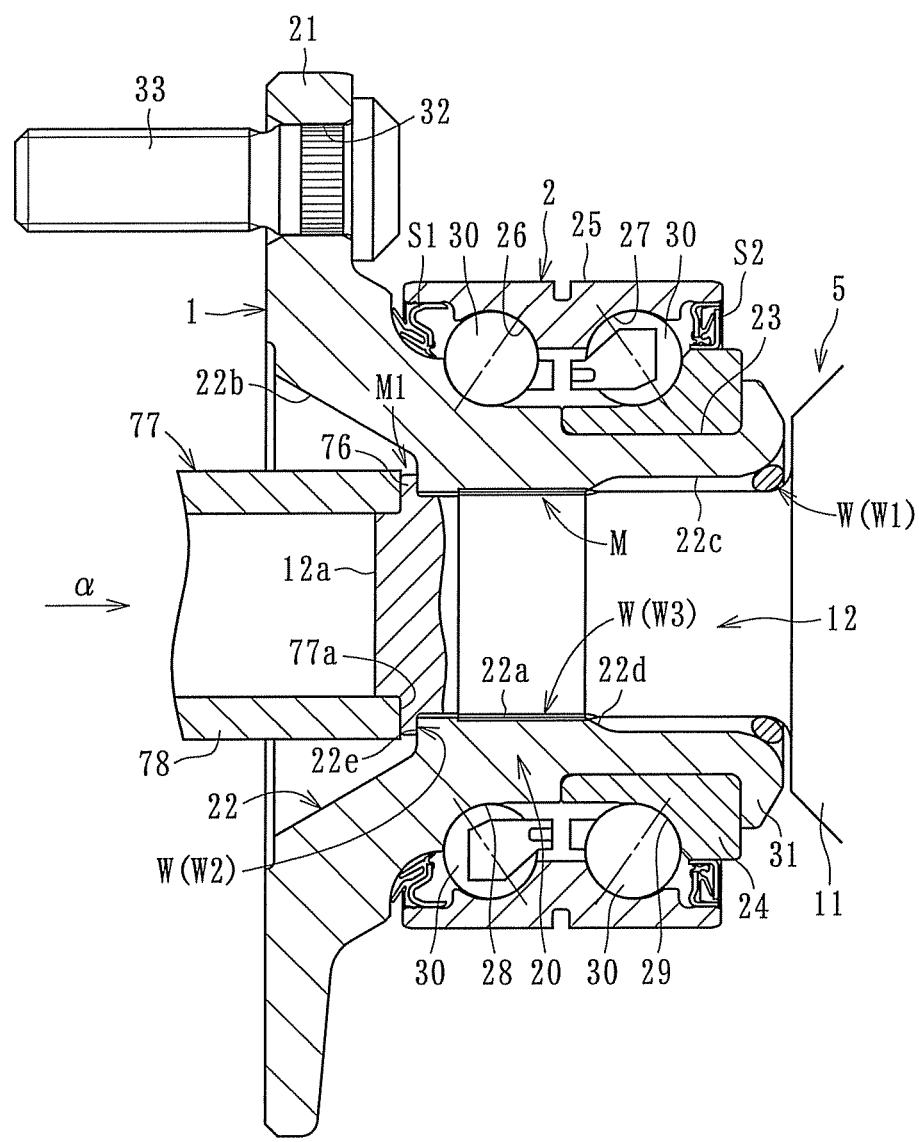
FIG. 13 A longitudinal sectional view of the bearing device for a wheel illustrated in FIG. 11.

Therefore, if axes of the jig 77 and the shaft section 12 of the outer race 5 are aligned and load is applied in the arrow α direction on the end surface 12a of the shaft section 12 by an end surface 77a of the jig 77 in this state in which the axes are aligned, as illustrated in FIG. 13, an outer peripheral side of the end surface 12a of the shaft section 12 is crushed and the outer collar-like locking piece 76 can be formed.

Because the above-mentioned outer collar-like locking piece 76 locks to the stepped surface 22e, like the tapered locking piece 65 illustrated in FIG. 1 and the like, the outer collar-like locking piece 76 can effectively prevent the shaft section 12 of the outer race 5 from slipping off in the axial direction from the hole portion 22 of the hub wheel 1. Consequently, it is possible to maintain a stable coupled state and to realize improvement of a quality of the bearing device for a wheel.

Figure 14A:
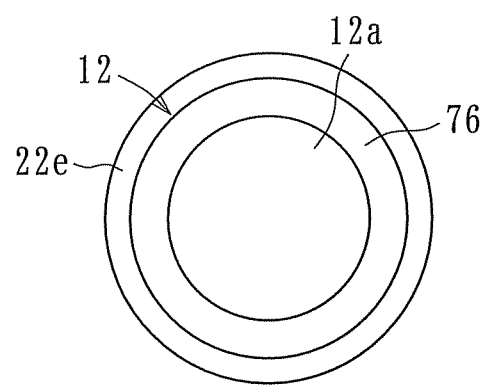
FIG. 14A An end view of an outer collar-like locking section over an entire circumference, illustrating an end surface of a shaft section of an outer race of the bearing device for a wheel illustrated in FIG. 11.
Figure 14B:
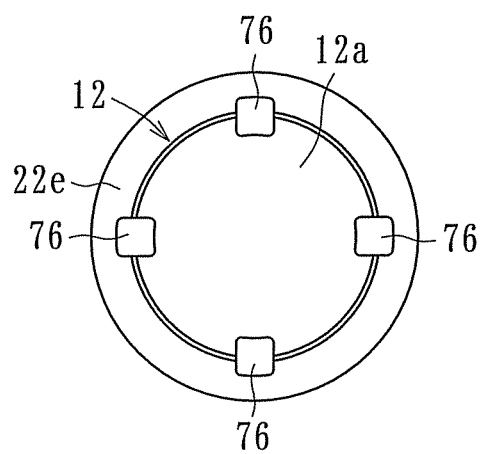
FIG. 14B An end view of outer collar-like locking sections disposed at a predetermined pitch along a circumferential direction, illustrating the end surface of the shaft section of the outer race of the bearing device for a wheel illustrated in FIG. 11.

If the jig 77 illustrated in FIGS. 12 and 13 is used, as illustrated in FIG. 14A, the outer collar-like locking piece 76 is formed along the circumferential direction. Therefore, if pressing sections are disposed at predetermined pitches (e.g., 90° pitch) along the circumferential direction as a jig, as illustrated in FIG. 14B, a plurality of outer collar-like locking pieces 76 are arranged at the predetermined pitches along the circumferential direction. Even if the plurality of outer collar-like locking piece 76 are arranged at the predetermined pitch along the circumferential direction as illustrated in FIG. 14B, because the outer collar-like locking pieces 76 lock to the stepped surface 22e, it is possible to effectively prevent the shaft section 12 of the outer race 5 from slipping off in the axial direction from the hole portion 22 of the hub wheel 1.

Figure 16:
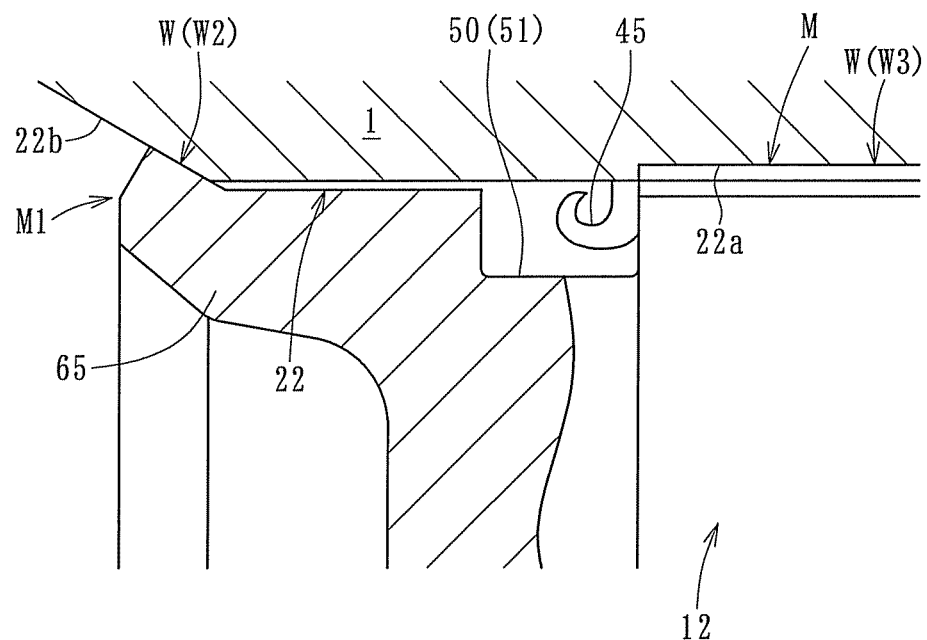
FIG. 16 An enlarged sectional view of a main part of the bearing device for a wheel illustrated in FIG. 15.
Figure 17:
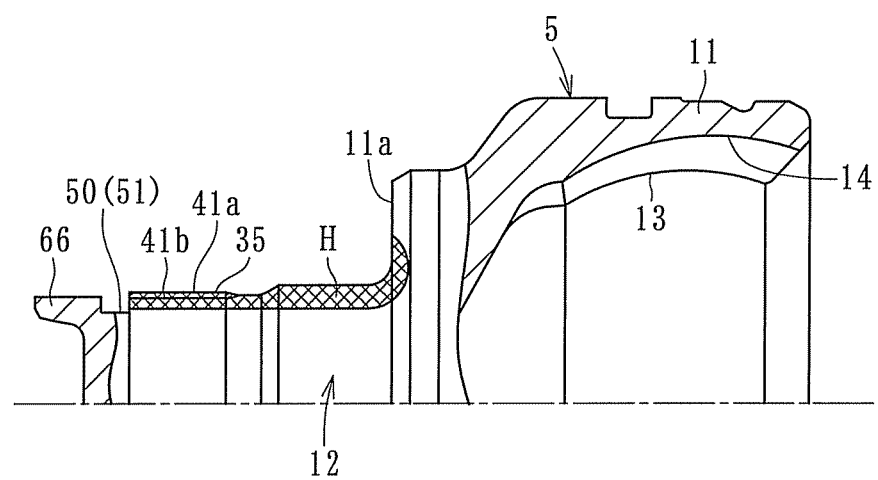
FIG. 17 A sectional view of an outer joint member of the bearing device for a wheel illustrated in FIG. 15 prior to assembly.

When the shaft section 12 of the outer race 5 is press-fitted into the hub wheel 1, a material is extruded from the recessed portions 36 formed by the projecting portions 35, whereby an extruded portion 45 as illustrated in FIG. 16 is formed. The extruded portion 45 includes a part of material having a volume equal to that of the recessed portions 36 into (to) which the projecting portions 35 are fitted, the part thereof being subjected to the following: forcing-out corresponding to the amount of the recessed portions 36 to be formed; trimming for forming the recessed portions 36; forcing-out and trimming simultaneously performed; or the like.

Therefore, in the bearing device for a wheel illustrated in FIG. 1 and the like, after the constant velocity universal joint is assembled to the hub wheel 1, removing work for the extruded portion 45 is required. In this context, in a fourth embodiment illustrated in FIG. 15, as described above, a pocket portion 50 that houses the extruded portion 45 is provided in the shaft section 12.

By providing a circumferential groove 51 at a shaft edge of the spline 41 of the shaft section 12, the pocket portion 50 is formed. Also in this case, as indicated by the cross-hatched region of FIG. 17, the hardened layer H is formed in a region ranging from the outer edge of the spline 41 to a part of the bottom wall of the mouth section 11 of the outer race 5.

When the shaft section 12 is press-fitted into the hole portion 22 of the hub wheel 1 in a state in which the axis of the hub wheel 1 and the axis of the outer race 5 of the constant velocity universal joint 3 are aligned, as illustrated in FIG. 16, the extruded portion 45 to be formed is housed into the pocket portion 50 while curling. That is, the part of material trimmed or forced out from the inner surface of the hole portion 22 enters the pocket portion 50.

As described above, there is provided the pocket portion 50 that houses the extruded portion 45 caused by the recessed-portion formation through the press-fitting. Consequently, the extruded portion 45 can be retained (kept) in the pocket portion 50, and the extruded portion 45 does not intrude into the vehicle, etc. on the outside of the bearing device. That is, the extruded portion 45 can be left housed in the pocket portion 50, and it is unnecessary to perform the removing work for the extruded portion 45. Accordingly, it is possible to realize a reduction in man-hours for assembly and realize improvement of assembly workability and cost reduction.

Further, after completion of the press-fitting, the short cylindrical section 66 is inserted into the tapered hole 22b, and hence it is necessary to expand the short cylindrical section 66 in diameter. Accordingly, with use of the jig 67 illustrated in FIG. 4, the short cylindrical section 66 can be expanded in diameter. If the short cylindrical section 66 is expanded in diameter, the shaft slip-off preventing structure M1 is formed.

Even in the bearing device for a wheel illustrated in FIGS. 8, 11, 15, and the like, the inboard side foreign-matter intrusion prevention means W1, the outboard side foreign-matter intrusion prevention means W2, and the foreign-matter intrusion prevention means W3 located between the fitting contact regions 38 are provided. Note that, the foreign-matter intrusion prevention means W2 illustrated in FIG. 8 is configured by applying a seal material onto the outer surface of the tapered locking piece 70. Further, the foreign-matter intrusion prevention means W2 illustrated in FIG. 11 is configured by applying a seal material onto a surface of the outer collar-like locking piece 76 corresponding to the stepped surface 22e.

Figure 18:
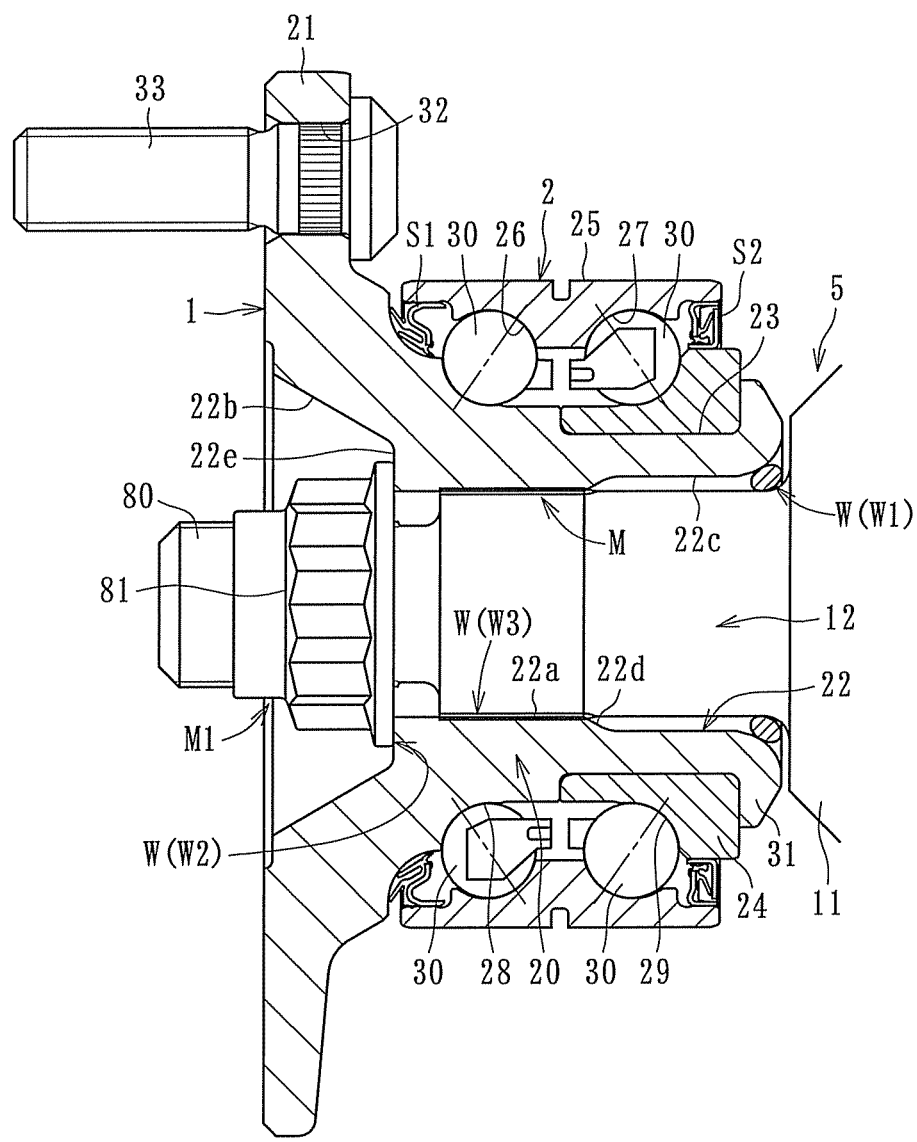
FIG. 18 A sectional view of a main part of a bearing device for a wheel according to a fifth embodiment of the present invention.
Figure 19:
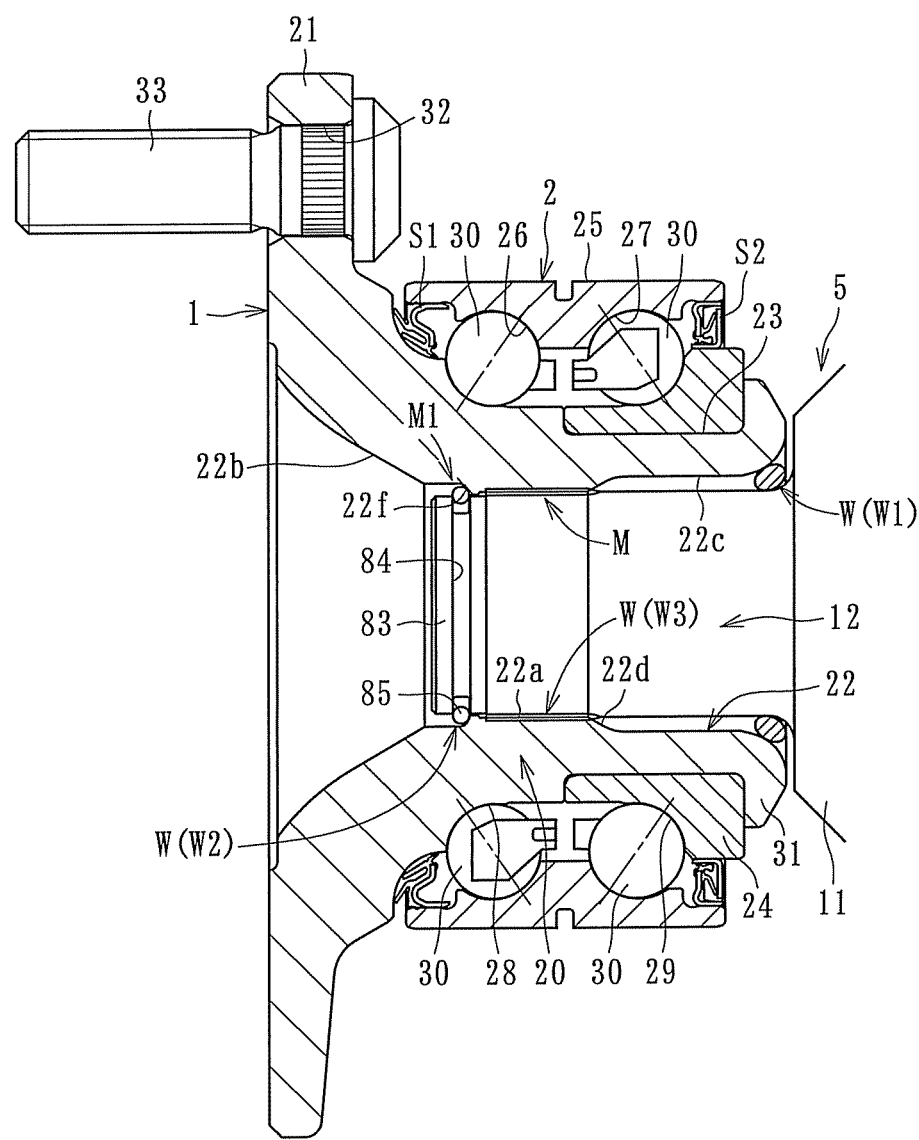
FIG. 19 A sectional view of a main part of a bearing device for a wheel according to a sixth embodiment of the present invention.
Figure 20:
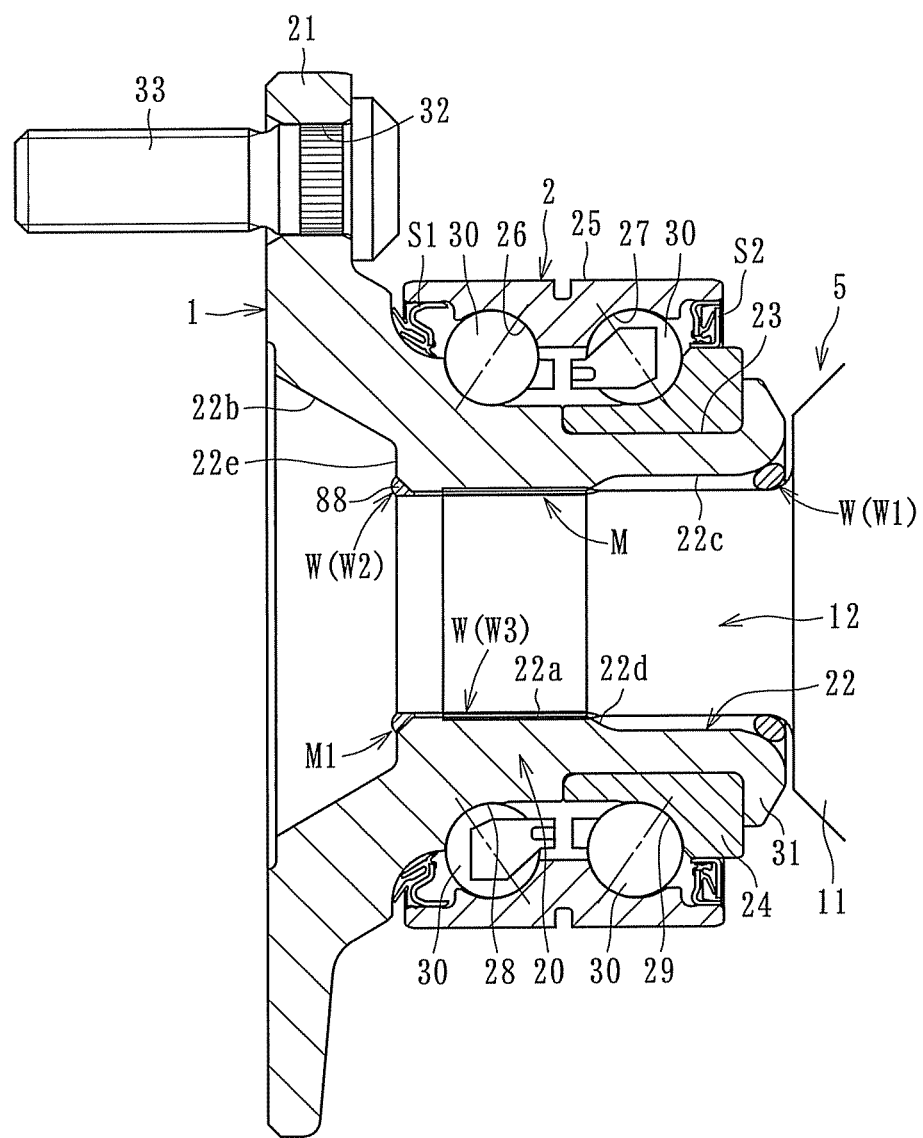
FIG. 20 A sectional view of a main part of a bearing device for a wheel according to a seventh embodiment of the present invention.

As the shaft slip-off preventing structure M1, bolt and nut coupling may be used as illustrated in FIG. 18 of a fifth embodiment, a lock ring may be used as illustrated in FIG. 19 of a sixth embodiment, or coupling means such as welding may be used as illustrated in FIG. 20 of a seventh embodiment.

In FIG. 18, a screw shaft portion 80 is continuously provided to the shaft section 12, and a nut member 81 is screwed on the screw shaft portion 80. The nut member 81 is brought into contact with the stepped surface 22e of the hole portion 22. Consequently, the shaft section 12 is regulated from slipping off from the hole portion 22 of the hub wheel 1 to the shaft side. That is, the nut member 81 constitutes the engaging portion of the shaft slip-off preventing structure M1. Also in the bearing device for a wheel illustrated in FIG. 18, the inboard side foreign-matter intrusion prevention means W1 and the foreign-matter intrusion prevention means W3 located between the fitting contact regions 38 are provided. In addition, by applying a seal material onto the surface of the nut member 81 corresponding to the stepped surface 22e, the foreign-matter intrusion prevention means W2 is configured.

In FIG. 19, a shaft extending portion 83 is provided on the outboard side with respect to the spline 41. A circumferential groove 84 is provided in the shaft extending portion 83 and a lock ring 85 is fitted in the circumferential groove 84. In the shaft section 12, there is provided a stepped portion 22f to which the lock ring 85 locks between the shaft section fitting hole 22a and the tapered hole 22b in the hole portion 22 of the hub wheel 1. Consequently, the lock ring 85 locks to the stepped portion 22f to regulate the shaft section 12 from slipping off from the hole portion 22 of the hub wheel 1 to the shaft side. That is, the lock ring 85 constitutes the engaging portion of the shaft slip-off preventing structure M1. Also in the bearing device for a wheel illustrated in FIG. 19, the inboard side foreign-matter intrusion prevention means W1 and the foreign-matter intrusion prevention means W3 located between the fitting contact regions 38 are provided. In addition, the foreign-matter intrusion prevention means W2 is constituted by the lock ring 85.

In FIG. 20, an outer peripheral surface of the end portion the shaft section 12 and an opening edge portion on the stepped surface 22e side of the shaft section fitting hole 22a are joined by welding. Consequently, the shaft section 12 is regulated from slipping off from the hole portion 22 of the hub wheel 1 to the shaft side. That is, such welding region 88 constitutes the engaging portion of the shaft slip-off preventing structure M1. In this case, the welding region 88 may be disposed over the entire circumference or may be disposed at a predetermined pitch along the circumferential direction. Also in the bearing device for a wheel illustrated in FIG. 20, the inboard side foreign-matter intrusion prevention means W1 and the foreign-matter intrusion prevention means W3 located between the fitting contact regions 38 are provided. In addition, the foreign-matter intrusion prevention means W2 is constituted by the welding region 88.

Figure 21:
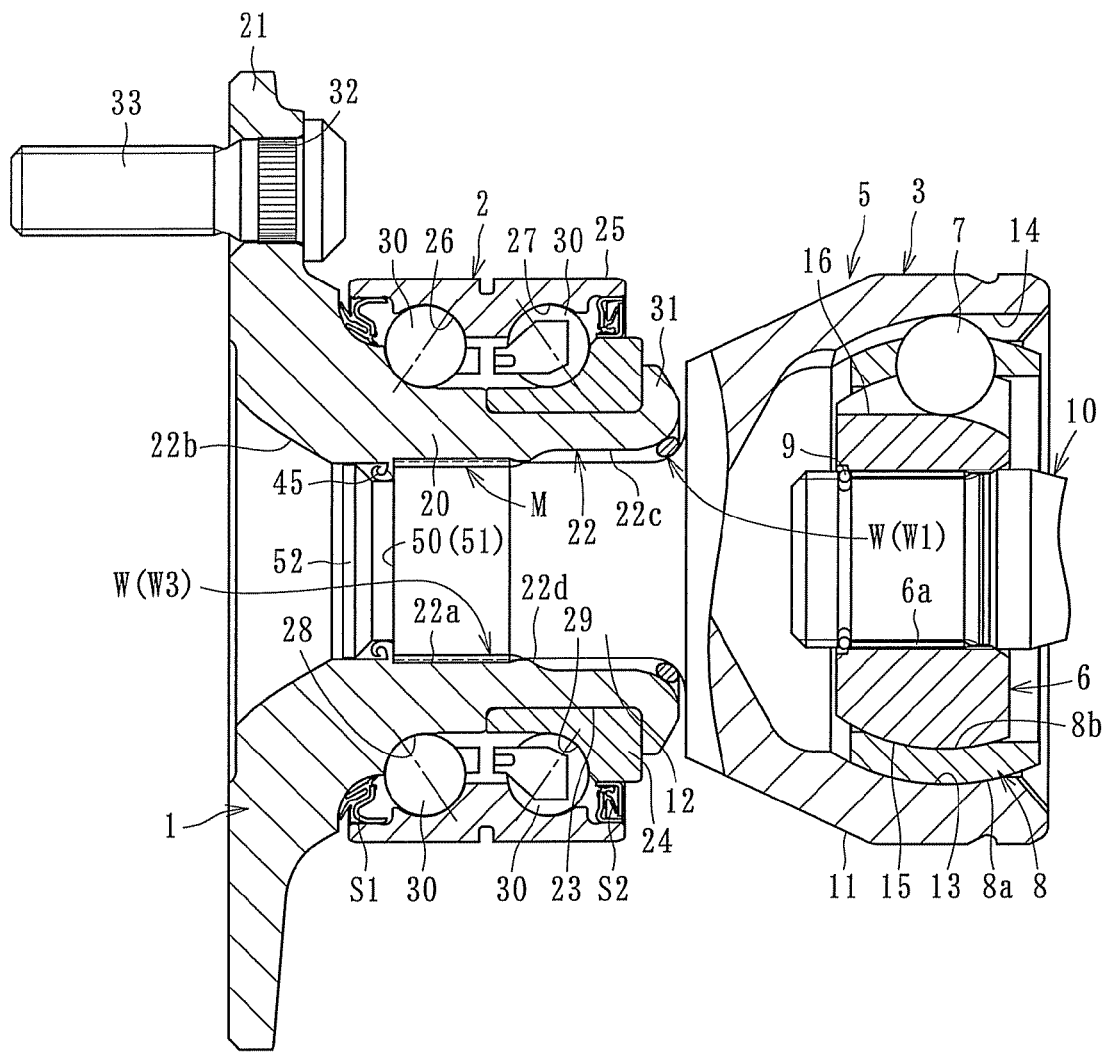
FIG. 21 A sectional view of a bearing device for a wheel according to an eighth embodiment of the present invention.
Figure 22:
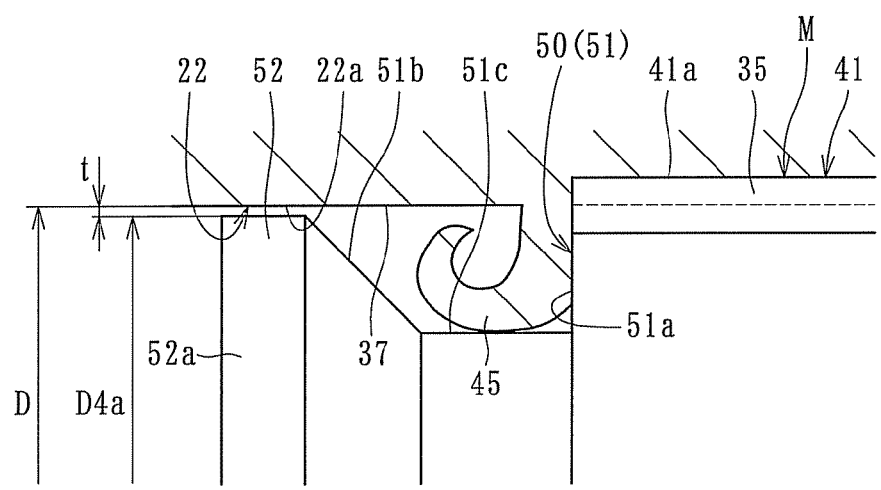
FIG. 22 An enlarged sectional view of a main part of the bearing device for a wheel illustrated in FIG. 21.

In the bearing device for a wheel according to the present invention, as illustrated in FIG. 21, the shaft slip-off preventing structure M1 does not have to be provided. In this case, as illustrated in FIG. 22, in the circumferential groove 51, a side surface 51a on the spline 41 side is a flat surface orthogonal to the axial direction and a side surface 51b on an opposite spline side is a tapered surface that increases in diameter from a groove bottom 51c to the opposite spline side. A disk-like shaft extending portion 52 for centering is provided on the opposite spline side with respect to the side surface 51b of the circumferential groove 51. An outer diameter dimension D4a (see FIG. 22) of the shaft extending portion 52 is set to be equal or slightly smaller than the hole diameter of the shaft section fitting hole 22a of the hole portion 22. In this case, a very small gap t is provided between an outer surface 52a of the shaft extending portion 52 and the inner surface of the shaft section fitting hole 22a of the hole portion 22.

By providing, in the axial direction of the pocket portion 50, the shaft extending portion 52 for centering with the hole portion 22 of the hub wheel 1 on the opposite projection side, ejection of the extruded portion 45 in the pocket portion 50 to the shaft extending portion 52 side is eliminated. Therefore, the extruded portion 45 is more stably housed. Moreover, the shaft extending portion 52 is used for centering, and hence it is possible to press-fit the shaft section 12 into the hub wheel 1 while preventing decentering. Therefore, it is possible to highly accurately connect the outer joint member 5 and the hub wheel 1 and to perform stable torque transmission.

Because the shaft extending portion 52 is used for centering during press-fitting, it is preferred to set an outer diameter dimension thereof to a degree slightly smaller than a hole diameter of the shaft section fitting hole 22a of the hole portion 22 of the hub wheel 1. That is, if the outer diameter dimension of the shaft extending portion 52 is equal to or larger than the hole diameter of the shaft section fitting hole 22a, the shaft extending portion 52 itself is press-fitted into the shaft section fitting hole 22a. When the shaft extending portion 52 is press-fitted into the shaft section fitting hole 22a, if the shaft extending portion 52 and the shaft section fitting hole 22a are decentered, the projecting portions 35 of the recess-projection fitting structure M are press-fitted in this state, and the shaft section 12 and the hub wheel 1 are connected in a state in which the axis of the shaft section 12 and the axis of the hub wheel 1 are not aligned. If the outer diameter dimension of the shaft extending portion 52 is smaller than the hole diameter of the shaft section fitting hole 22a, the shaft extending portion 52 does not function as a portion for centering. Therefore, it is preferred that the very small gap t between the outer surface 52a of the shaft extending portion 52 and the inner surface of the shaft section fitting hole 22a of the hole portion 22 be set to be about 0.01 mm to 0.2 mm.

Note that, in the bearing device for a wheel illustrated in FIG. 21, the foreign-matter intrusion prevention means W1 and the foreign-matter intrusion prevention means W3 are provided. However, the foreign-matter intrusion prevention means W2 is not provided. Further, as illustrated in FIG. 21, when the shaft slip-off preventing structure M1 is not provided, the shaft extending portion 52 as the portion for centering of the shaft section 12 may be omitted.

Figure 23:
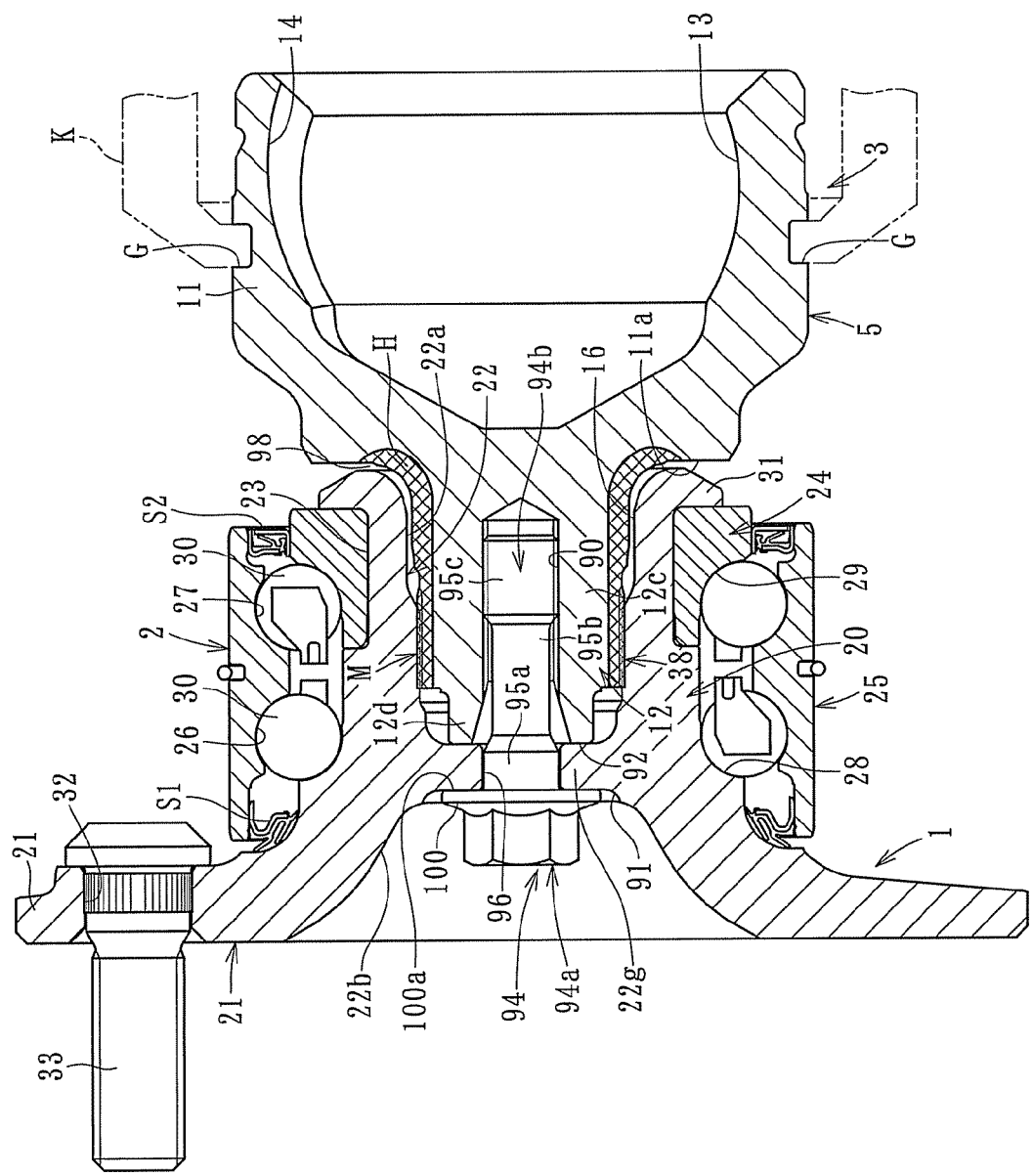
FIG. 23 A sectional view of a bearing device for a wheel according to a ninth embodiment of the present invention.
Figure 24:
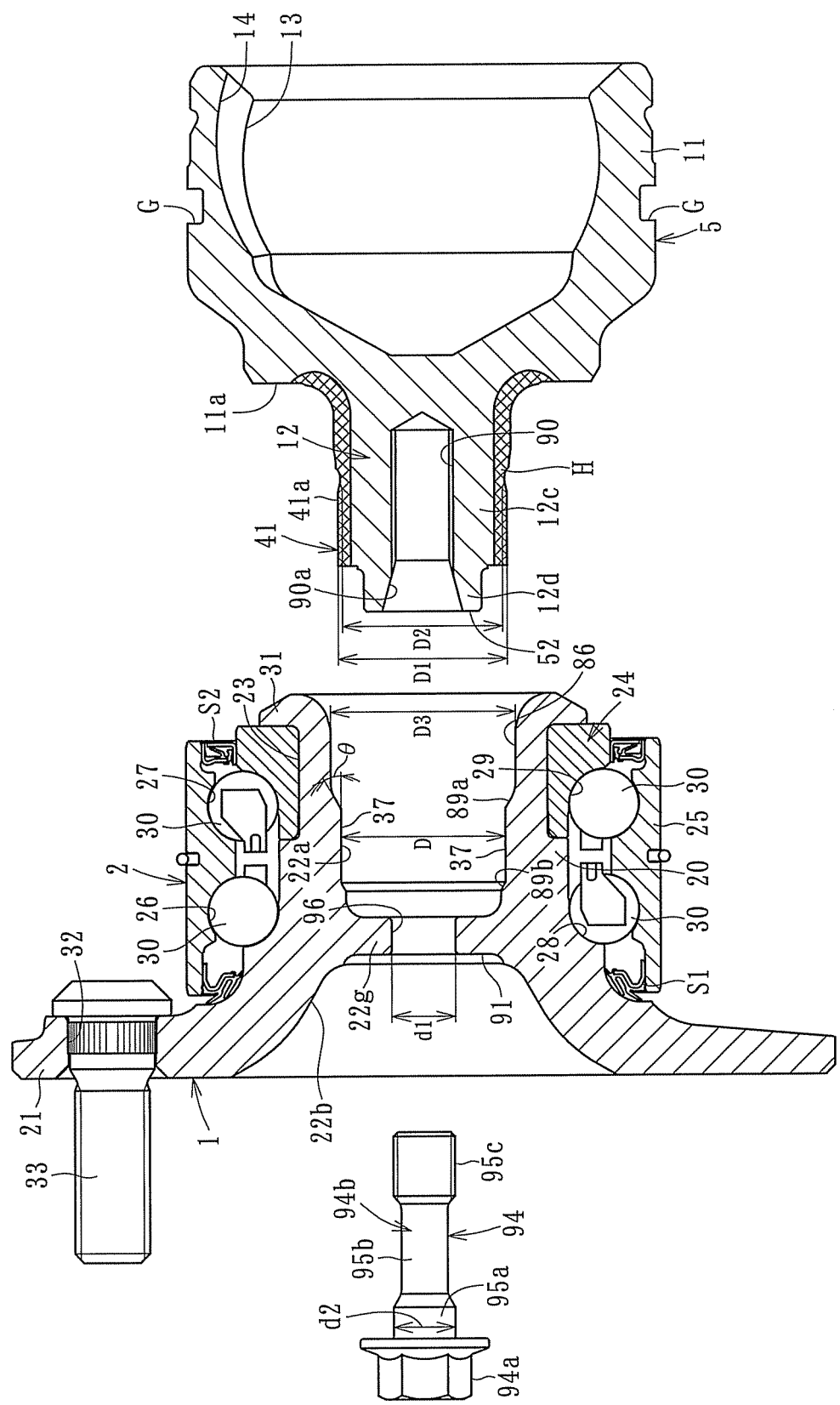
FIG. 24 A sectional view of the bearing device for a wheel illustrated in FIG. 23 prior to assembly.
Figure 25:
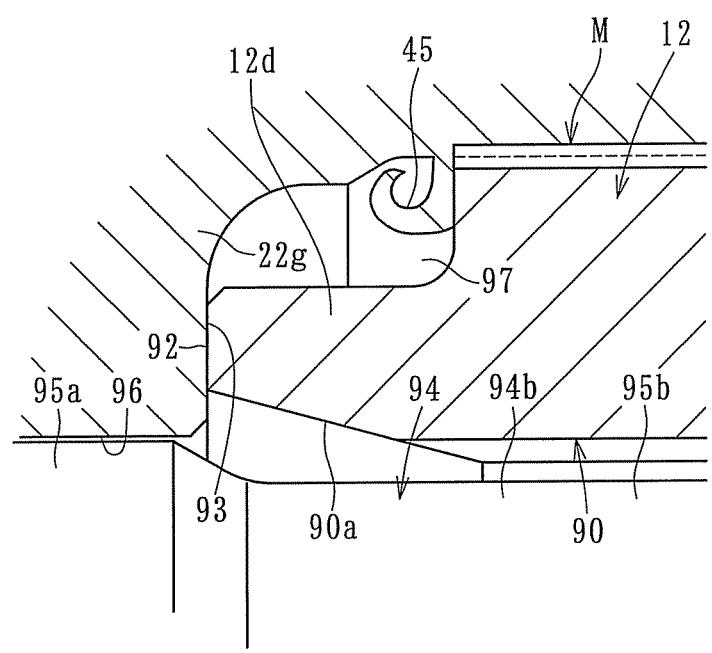
FIG. 25 An enlarged sectional view of a main part of the bearing device for a wheel illustrated in FIG. 23.

Next, FIG. 23 illustrates a bearing device for a wheel allowing the shaft section 12 to slip off from the hub wheel 1. Also in this case, as illustrated in FIGS. 23 and 24, the hub wheel 1 includes the cylindrical section 20, the flange 21 provided to the end portion on the outboard side of the cylindrical section 20. The hole portion 22 of the cylindrical section 20 includes the shaft section fitting hole 22a as the axial middle portion, the tapered hole 22b on the outboard side, and an inner wall 22g formed between the shaft section fitting hole 22a and the tapered hole 22b and projecting in a radially inner direction. That is, in the shaft section fitting hole 22a, through the recess-projection fitting structure M, the shaft section 12 of the outer race 5 of the constant velocity universal joint 3 and the hub wheel 1 are coupled with each other. Note that, a recessed portion 91 is provided in an end surface on an opposite shaft-section-fitting-hole-side of the inner wall 22g.

The hole portion 22 includes a larger diameter portion 86 on an opening side on an opposite inner-wall-side thereof with respect to the shaft section fitting hole 22a, and a smaller diameter portion 88 on an inner wall side with respect to the shaft section fitting hole 22a. A tapered portion (tapered hole) 89a is provided between the larger diameter portion 86 and the shaft section fitting hole 22a. The tapered portion 89a is reduced in diameter along the press-fitting direction at the time of coupling the hub wheel 1 and the shaft section 12 of the outer race 5. A taper angle θ of the tapered portion 89a is set to 15° to 75°, for example. Note that a tapered portion 89b is similarly provided between the shaft section fitting hole 22a and the smaller diameter portion 88.

In this case, by press-fitting the shaft section 12 into the hole portion 22 of the hub wheel 1, that is, into the shaft section fitting hole 22a, the projecting portions 35 of the shaft section 12 form, in the inner surface 37 of the shaft section fitting hole 22a, the recessed portions 36 in which the projecting portions 35 closely fit.

Further, after the press-fitting, a bolt member 94 is screwed into a threaded hole 90 of the shaft section 12 from the outboard side. The bolt member 94 includes a flanged head portion 94a and a screw shaft portion 94b. The screw shaft portion 94b includes a larger-diameter proximal portion 95a, a smaller-diameter body portion 95b, and a screw portion 95c on a distal end side. In this case, a through-hole 96 is provided in the inner wall 22g, and the screw shaft portion 94b of the bolt member 94 is inserted into the through-hole 96. With this, the screw portion 95c is screwed into the threaded hole 90 of the shaft section 12. As illustrated in FIG. 24, a hole diameter d1 of the through-hole 96 is set to be slightly larger than an outer diameter d2 of the larger-diameter proximal portion 95a of the screw shaft portion 94b. Specifically, the diameters are set within a range of 0.05 mm<d1−d2<0.5 mm. Note that, a maximum outer diameter of the screw portion 95c is equal to an outer diameter of the larger-diameter proximal portion 95a or slightly smaller than the outer diameter of the proximal portion 95a.

By screwing the bolt member 94 into the threaded hole 90 of the shaft section 12 as described above, a flange portion 100 of the head portion 94a of the bolt member 94 is fitted to the recessed portion 91 of the inner wall 22g. With this, the inner wall 22g is sandwiched between an end surface 92 on the outboard side of the shaft section 12 and the head portion 94a of the bolt member 94.

Further, a seal material (not shown) may be interposed also between a bearing surface 100a of the bolt member 94 and the inner wall 22g. In this case, for example, a seal material (seal agent) made of various kinds of resin that is hardened after application and can exert sealing performance between the bearing surface 100a and the bottom of the recessed portion 91 of the inner wall 22g only has to be applied to the bearing surface 100a of the bolt member 94. Note that, as the seal material, there is selected a material that is not deteriorated in an atmosphere in which the bearing device for a wheel is used.

Further, the inner wall 22g may not be sandwiched between the end surface 92 of the shaft section 12 and the bolt member 94a. In this case, the hub wheel 1 is sandwiched between the head portion 54a of the bolt member 54 and the recess-projection fitting structure M or between the head portion 54a of the bolt member 54 and the back surface 11a of the mouth section 11. That is, the forged portion 31 of the hub wheel and the back surface 11a of the mouth section 11 are brought into contact with each other (not shown). With this structure, bending rigidity in the shaft section direction is improved, the shaft section becomes robust against bending, and a high-quality product excellent in durability is obtained. Moreover, positioning during press-fitting can be realized by this contact. Consequently, dimension accuracy of the bearing device for a wheel is stabilized, and it is possible to secure stable length as axial length of the recess-projection fitting structure M disposed along the axial direction and to realize improvement of torque transmission performance. Further, a seal structure can be configured by this contact. It is possible to prevent intrusion of foreign matters into the recess-projection fitting structure M from the forged portion 31. The recess-projection fitting structure M can maintain a stable fitting state over a long period of time.

A seal material is interposed between the bearing surface 100a of the bolt member 94 for performing bolt fixation of the hub wheel 1 and the shaft section 12 of the outer race 5, and the inner wall 22g, and hence it is possible to prevent rainwater and foreign matters from intruding into the recess-projection fitting structure M from the bolt member 94. As a result, quality of the bearing device for a wheel can be improved.

Incidentally, when the bolt member 94 is detached by being screwed backward from the state illustrated in FIG. 23, the outer race 5 can be pulled out from the hub wheel 1. That is, a fitting force of the recess-projection fitting structure M is set to an extent that the hub wheel 1 can be pulled out by applying a pulling-out force larger than a predetermined force to the outer race 5.

Figure 26:
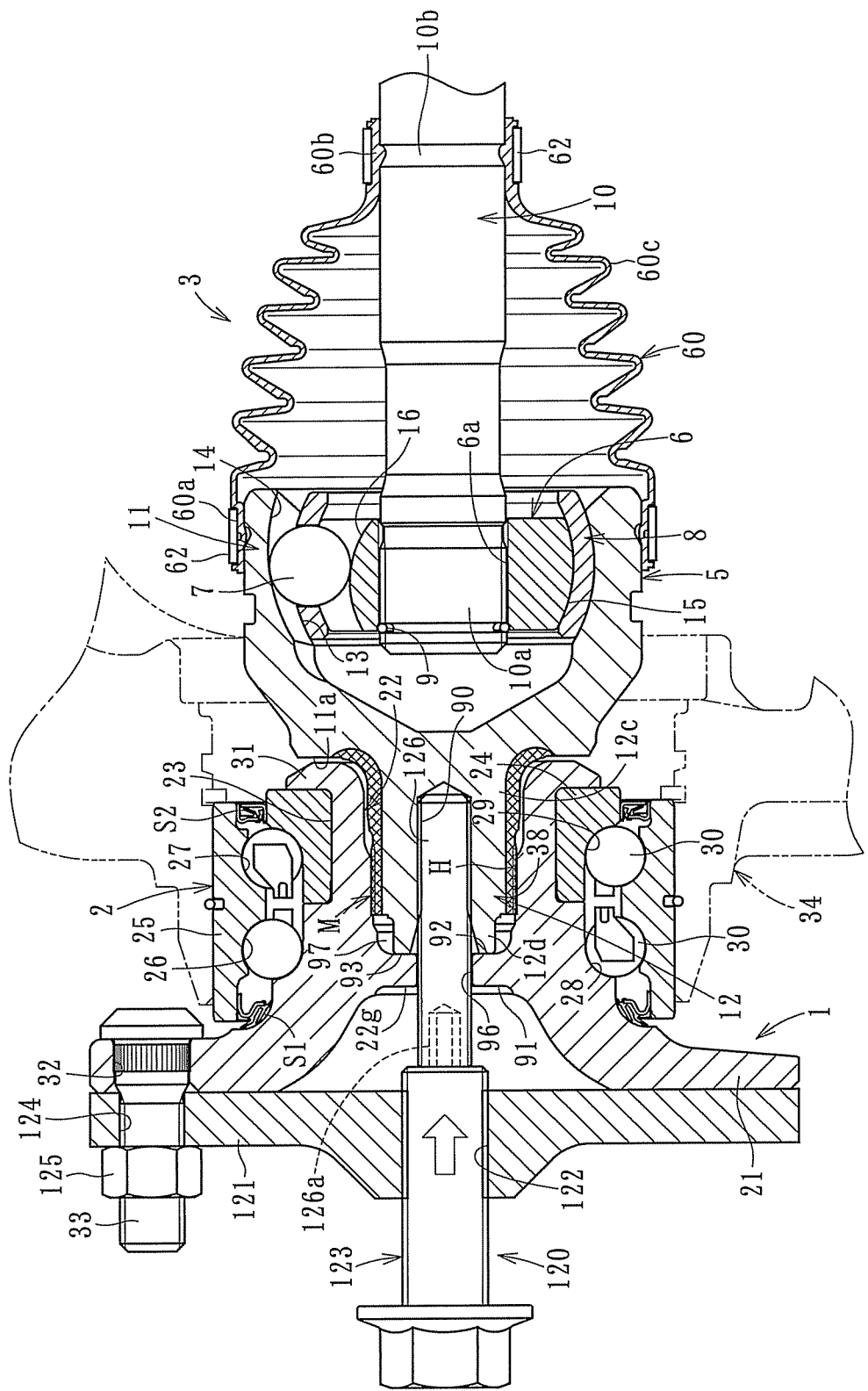
FIG. 26 A sectional view illustrating a separation method for a recess-projection fitting structure of the bearing device for a wheel illustrated in FIG. 23.

For example, the hub wheel 1 and the constant velocity universal joint 3 are separated from each other with a jig 120 illustrated in FIG. 26. The jig 120 includes a base 121, a pressing bolt member 123 threadedly engaged with a threaded hole 122 of the base 121 so as to be screwed forward/backward, and a screw shaft 76 threadedly engaged with the threaded hole 90 of the shaft section 12. A through-hole 124 is provided in the base 121, and a bolt 123 of the hub wheel 1 is inserted into the through-hole 124 so that a nut member 125 is threadedly engaged with the bolt 123. In this case, the base 121 and the flange 21 of the hub wheel 1 are superimposed on each other, and the base 121 is attached to the hub wheel 1.

After the attachment of the base 121 to the hub wheel 1 in this manner, the screw shaft 126 is threadedly engaged with the threaded hole 90 of the shaft section 12 so as to project a proximal portion 126a from the inner wall 22g to the outboard side. A projecting amount of the proximal portion 126a is set to be larger than the axial length of the recess-projection fitting structure M. Further, the screw shaft 126 and the pressing bolt member 123 are disposed coaxially with each other (coaxially with the bearing device for a wheel).

After that, as illustrated in FIG. 26, the pressing bolt member 123 is screwed into the threaded hole 122 of the base 121 from the outboard side, and in this state, is screwed forward to the screw shaft 126 side as indicated by the arrow. In this case, the screw shaft 126 and the pressing bolt member 123 are disposed coaxially with each other (coaxially with the bearing device for a wheel), and hence the pressing bolt member 123 presses the screw shaft 126 in the arrow direction as a result of the forward screwing. With this, the outer race 5 is moved in the arrow direction with respect to the hub wheel 1, and the outer race 5 is detached from the hub wheel 1.

Figure 27:
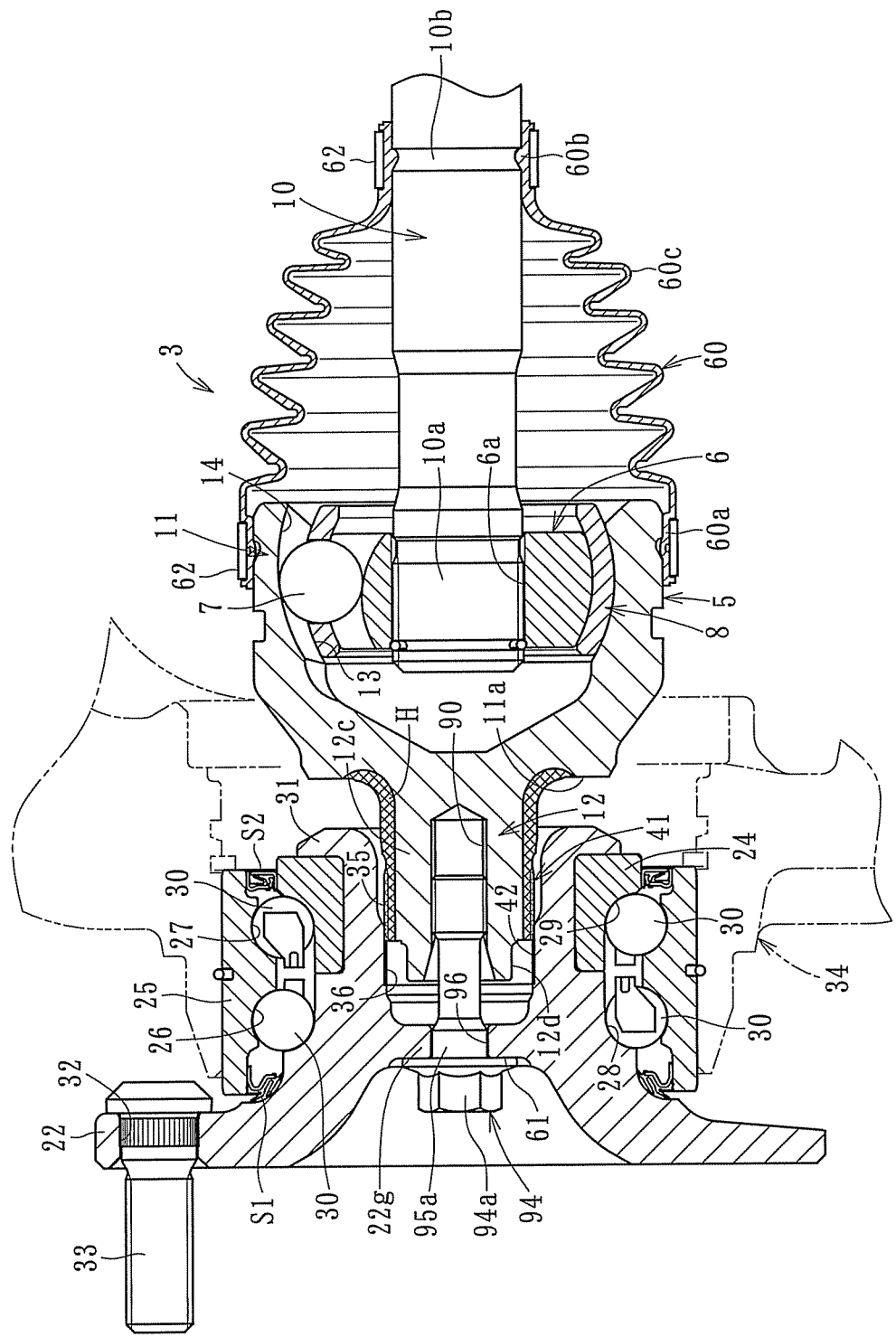
FIG. 27 A sectional view illustrating a re-press-fitting method for the bearing device for a wheel illustrated in FIG. 23.

Further, in the state in which the outer race 5 is detached from the hub wheel 1, the hub wheel 1 and the outer race 5 can be re-coupled with each other with use of, for example, the bolt member 94. That is, in the state in which the base 121 is detached from the hub wheel 1 and the screw shaft 76 is disengaged from the shaft section 12, as illustrated in FIG. 27, the bolt member 94 is threadedly engaged with the threaded hole 90 of the shaft section 12 through the through-hole 96. In this state, the male spline 41 on the shaft section 12 side and a female spline 42 of the hub wheel 1 are aligned in phase with each other, the female spline 42 being formed by previous press-fitting.

In this state, the bolt member 94 is screwed forward with respect to the threaded hole 90. With this, the shaft section 12 is gradually fitted into the hub wheel 1. In this case, the hole portion 22 becomes slightly larger in diameter so as to allow the shaft section 12 to move in the axial direction. When the movement thereof in the axial direction is stopped, the hole portion 22 is reduced in diameter by restoring the original diameter. With this, similarly to the previous press-fitting, it is possible to reliably form the recess-projection fitting structure M in which the entire of the recessed-portion fitting regions of the projecting portions 35 is held in close contact with the recessed portions 36 corresponding thereto.

In particular, when the bolt member 94 is screwed forward with respect to the threaded hole 90, the proximal portion 95a of the bolt member 94 corresponds to the through-hole 96 as illustrated in FIG. 27. In addition, the hole diameter d1 of the through-hole 96 is set to be slightly larger than the outer diameter d2 of the larger-diameter proximal portion 95a of the shaft portion 94b. (Specifically, the diameters are set within a range of 0.05 mm<d1−d2<0.5 mm.) Thus, with use of the outer diameter of the proximal portion 95a of the bolt member 54 and the inner diameter of the through-hole 96, it is possible to form a guide along which the bolt member 94 is screwed forward into the threaded hole 90, and hence possible to press-fit the shaft section 12 into the hole portion 22 of the hub wheel 1 without causing decentering. Note that, when the axial length of the through-hole 96 is excessively short, stable guiding cannot be effected, and in contrast, when the axial length of the through-hole 96 is excessively long, the axial length of the recess-projection fitting structure M cannot be secured and the weight of the hub wheel 1 is increased due to an increase in thickness dimension of the inner wall 22g. Thus, various modifications may be made in consideration of those factors.

Note that, the opening portion of the threaded hole 90 of the shaft section 12 is formed as a tapered portion 90a opening in an enlarged manner toward the opening. Thus, there is an advantage that the screw shaft 126 and the bolt member 94 are easily and threadedly engaged with the threaded hole 90.

Incidentally, at the time of first press-fitting (press-fitting for molding the recessed portions 36 in the inner surface 37 of the hole portion 22), press-fitting load is relatively large. Thus, it is necessary to use press machines or the like for the press-fitting. In contrast, at the time of the re-press-fitting, press-fitting load is smaller than the press-fitting load at the time of the first press-fitting. Thus, without use of the press machines or the like, it is possible to stably and accurately press-fit the shaft section 12 into the hole portion 22 of the hub wheel 1. Thus, the outer race 5 and the hub wheel 1 can be separated from and coupled with each other on site.

Figure 2B:
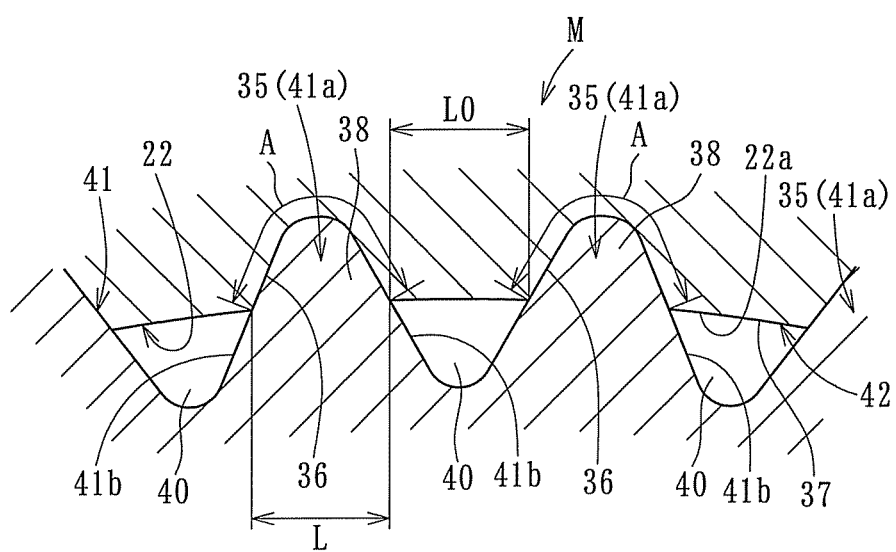
FIG. 2B An enlarged view of the X section of FIG. 2A.

In the spline 41 illustrated in FIG. 2, a pitch of the projecting portions 41a and a pitch of the recessed portions 41b are set to be equal to each other. Thus, as described above in the above-mentioned embodiment, as illustrated in FIG. 2B, a circumferential thickness L of the middle portions in the projecting direction of the projecting portions 35, and a circumferential dimension L0 in a position corresponding to the middle portions between the projecting portions 35 adjacent to each other in the circumferential direction are substantially equal to each other.

Figure 28A:
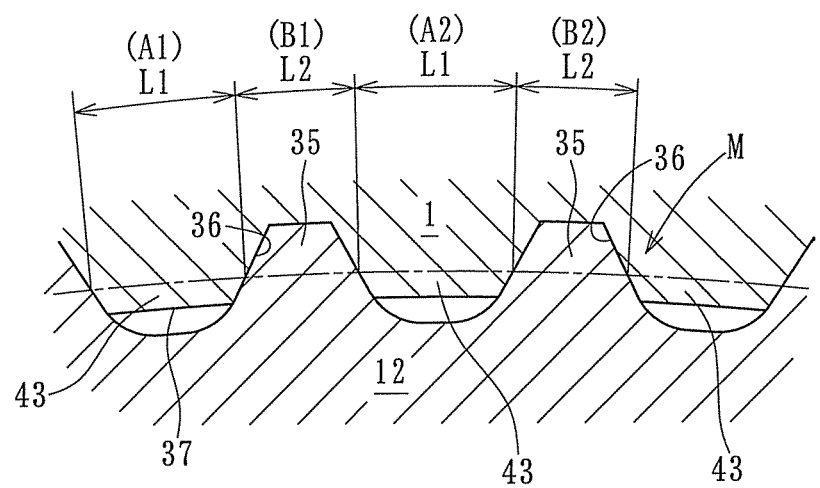
FIG. 28A An enlarged sectional view of a first modification of the recess-projection fitting structure.

Meanwhile, as illustrated in FIG. 28A, a circumferential thickness L2 of the middle portions in the projecting direction of the projecting portions 35 may be smaller than a circumferential dimension L1 in a position corresponding to the middle portions between projecting portions 43 adjacent to each other in the circumferential direction. That is, in the spline 41 formed on the shaft section 12, the circumferential thickness (tooth thickness) L2 of the middle portions in the projecting direction of the projecting portions 35 is set to be smaller than the circumferential thickness (tooth thickness) L1 of middle portions in the projecting direction of the projecting portions 43 on the hub wheel 1 side, the projecting portions 43 fitting in between the projecting portions 35.

Therefore, a sum $\Sigma(B1+B2+B3+\ldots)$ of tooth thicknesses of the projecting portions 35 in the entire circumference on the shaft section 12 side is set to be smaller than a sum $\Sigma(A1+A2+A3+\ldots)$ of tooth thicknesses of the projecting portions 43 (projecting teeth) on the hub wheel 1 side. With this, it is possible to increase a shearing area of the projecting portions 43 on the hub wheel 1 side and to secure torsion strength. In addition, the tooth thickness of each of the projecting portions 35 is small, and hence it is possible to reduce press-fitting load and to achieve improvement of a press-fitting property. When a sum of circumferential thicknesses of the projecting portions 35 is set to be smaller than a sum of circumferential thicknesses of the projecting portions 43 on the counterpart side, it is unnecessary to set the circumferential thickness L2 of all the projecting portions 35 to be smaller than the circumferential dimension L1 between the projecting portions 35 adjacent to each other in the circumferential direction. That is, even when a circumferential thickness of arbitrary projecting portions 35 among the plurality of projecting portions 35 is equal to or larger than a dimension in the circumferential direction between the projecting portions adjacent to each other in the circumferential direction, a sum of circumferential thicknesses only has to be smaller than a sum of dimensions in the circumferential direction.

Figure 28B:
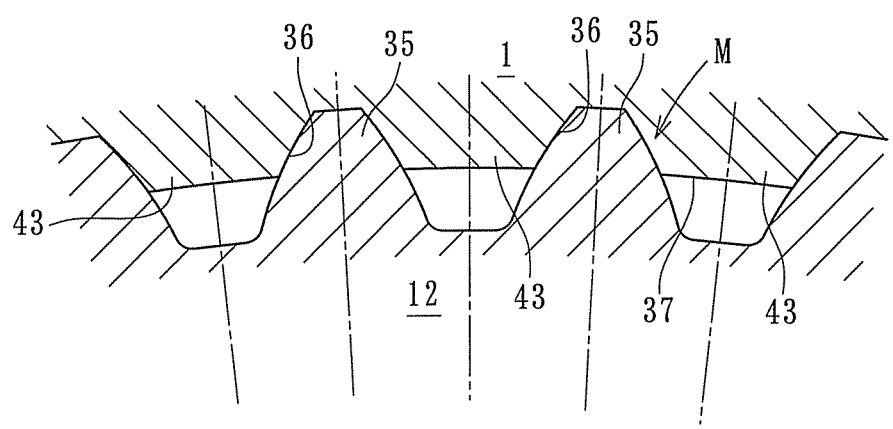
FIG. 28B An enlarged sectional view of a second modification of the recess-projection fitting structure.

The projecting portions 35 illustrated in FIG. 28A have a trapezoidal shape in cross-section. However, a shape of the projecting portions 35 may be an involute tooth shape as illustrated in FIG. 28B.

Figure 29A:
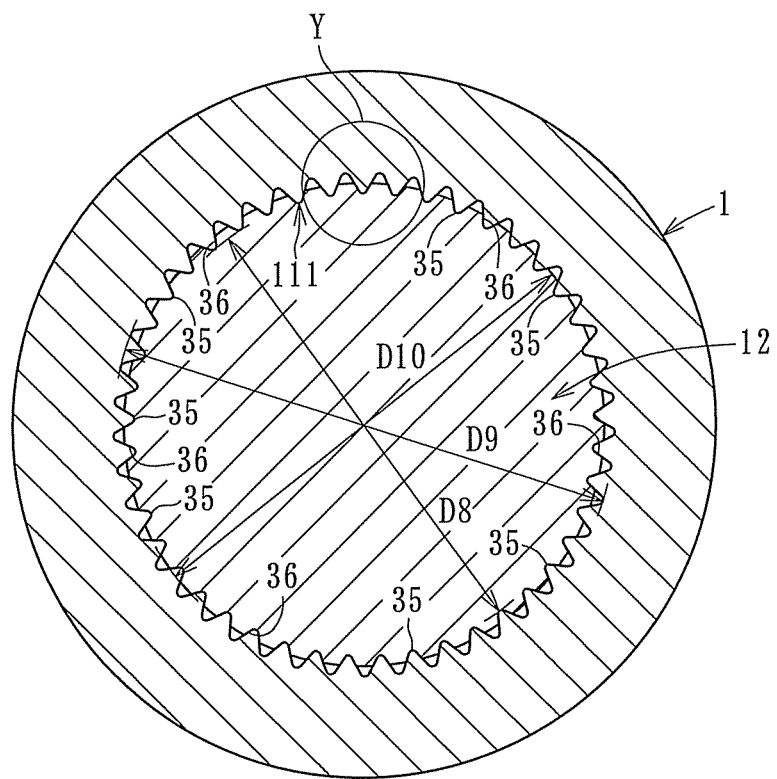
FIG. 29A A lateral sectional view of the bearing device for a wheel according to the ninth embodiment of the present invention.

Incidentally, in each of the embodiments, the spline 41 constituting the projecting portions 35 is formed on the shaft section 12 side. Hardening treatment is performed on the spline 41 of the shaft section 12 and the inner surface of the hub wheel 1 is not hardened (raw material). Meanwhile, as illustrated in FIG. 29, a spline 111 (including projected streaks 111a and recessed streaks 111b) subjected to hardening treatment may be formed on the inner surface of the hole portion 22 of the hub wheel 1, and hardening treatment may not be performed on the shaft section 12. Note that, the spline 111 can also be formed by various machining methods such as broaching, cutting, pressing, and drawing, which are publicly known and used as conventional means. Further, as the thermosetting treatment, various kinds of heat treatment such as induction quenching or carburizing and quenching can be adopted.

In this case, the middle portions in the projecting direction of the projecting portions 35 correspond to the position of the recessed-portion forming surface (outer surface of the shaft section 12) before recess formation. That is, a diameter dimension (minimum diameter dimension of the projecting portions 35) D8 of a circle connecting vertexes of the projecting portions 35 as the projecting portions 111a of the spline 111 is set to be smaller than an outer diameter dimension D10 of the outer surface of the shaft section 12. A diameter dimension (inner diameter dimension of the inner surface of the fitting holes between the projecting portions) D9 of a circle connecting bottoms of the recessed portions 111b of the spline 111 is set to be larger than the outer diameter dimension D10 of the shaft section 12. Thus, the dimensions are set in a relation of D8<D10<D9. Therefore, of the projecting portions 35 of the shaft section 12, at least portions ranging from the vertexes to the middle portions in the projecting direction are press-fitted to the outer surface of the shaft section 12.

When the shaft section 12 is press-fitted into the hole portion 22 of the hub wheel 1, by the projecting portions 35 on the hub wheel 1 side, the recessed portions 36, in which the projecting portions 35 fit, can be formed in the outer peripheral surface of the shaft section 12. Thus, the entire fitting contact regions 38 between the projecting portions 35 and the recessed portions that fit on the projecting portions 35 are brought into close contact with each other.

Figure 29B:
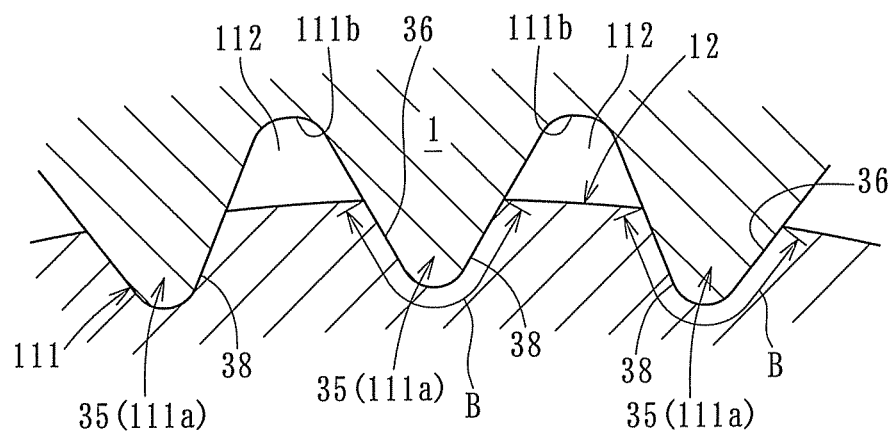
FIG. 29B An enlarged view of the Y section of FIG. 29A.
Figure 30:
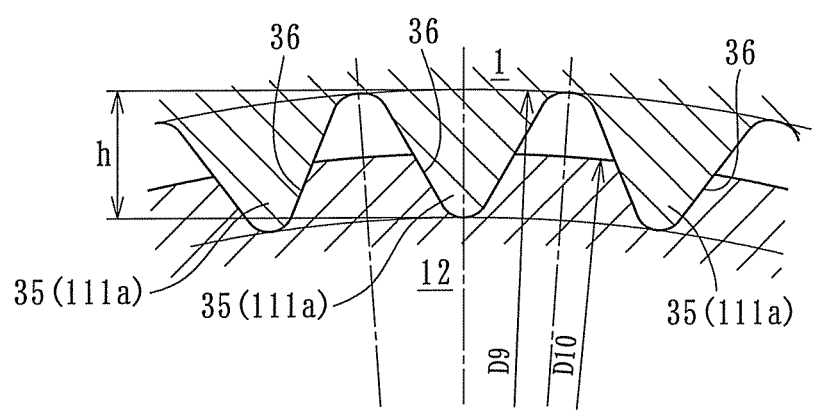
FIG. 30 An enlarged sectional view of a main part of the recess-projection fitting structure of the bearing device for a wheel illustrated in FIG. 29A.

Here, each of the fitting contact regions 38 is illustrated as a range B in FIG. 29B, the range extending from a middle-slope portion to a summit of the ridge shape in cross-section of each of the projecting portions 35. Further, between the projecting portions 35 adjacent to each other in the circumferential direction, gaps 112 are formed on the radially outer side with respect to the outer peripheral surface of the shaft section 12.

Even in this case, the extruded portion 45 is formed by press-fitting. Therefore, it is preferred to provide a housing portion 97 that houses the extruded portion 45. The extruded portion 45 is formed on the mouth side of the shaft section 12, and hence the housing portion is provided on the hub wheel 1 side.

As described above, in the bearing device for a wheel in which the projecting portions 35 of the recess-projection fitting structure M are provided on the inner surface of the hole portion 22 of the hub wheel 1 to perform press-fitting, it is unnecessary to perform hardness treatment (heat treatment) on the shaft section side, and hence there is an advantage that the outer race 5 of the constant velocity universal joint 3 is excellent in productivity.

Figure 31:
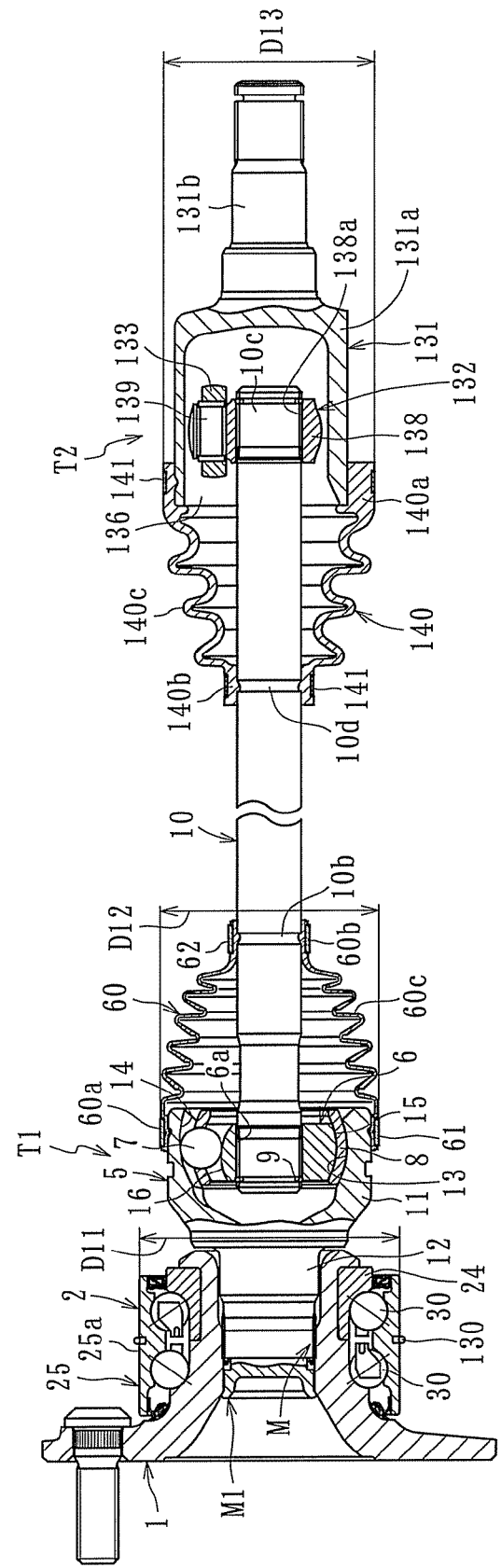
FIG. 31 A longitudinal sectional view of an axle module of the present invention.

Incidentally, as illustrated in FIG. 31, each of the bearing devices for a wheel is used in the axle module. The axle module includes an outboard side constant velocity universal joint T1, an inboard side constant velocity universal joint T2, and the shaft 10 coupled to the constant velocity universal joints T1 and T2. In this case, on the outboard side, the hub wheel 1, the double-row roller bearing (bearing structure section) 2, and the constant velocity universal joint T1 (3) are integrated together, to thereby configure the bearing device for a wheel. As such bearing device for a wheel, each of the above-mentioned bearing devices for a wheel is used. Note that, in the example in FIG. 31, there is illustrated the bearing device for a wheel of a type in which the tapered locking piece 65 and the pocket portion 50 are provided on the end surface of the shaft section 12 of the outer race 5 of the constant velocity universal joint T1 similarly to the one illustrated in FIG. 15. The configuration of the bearing device for a wheel illustrated in FIG. 31 is similar to that of the bearing device for a wheel illustrated in FIG. 15. Therefore, detailed description of the bearing device for a wheel of FIG. 31 is omitted.

Figure 34:
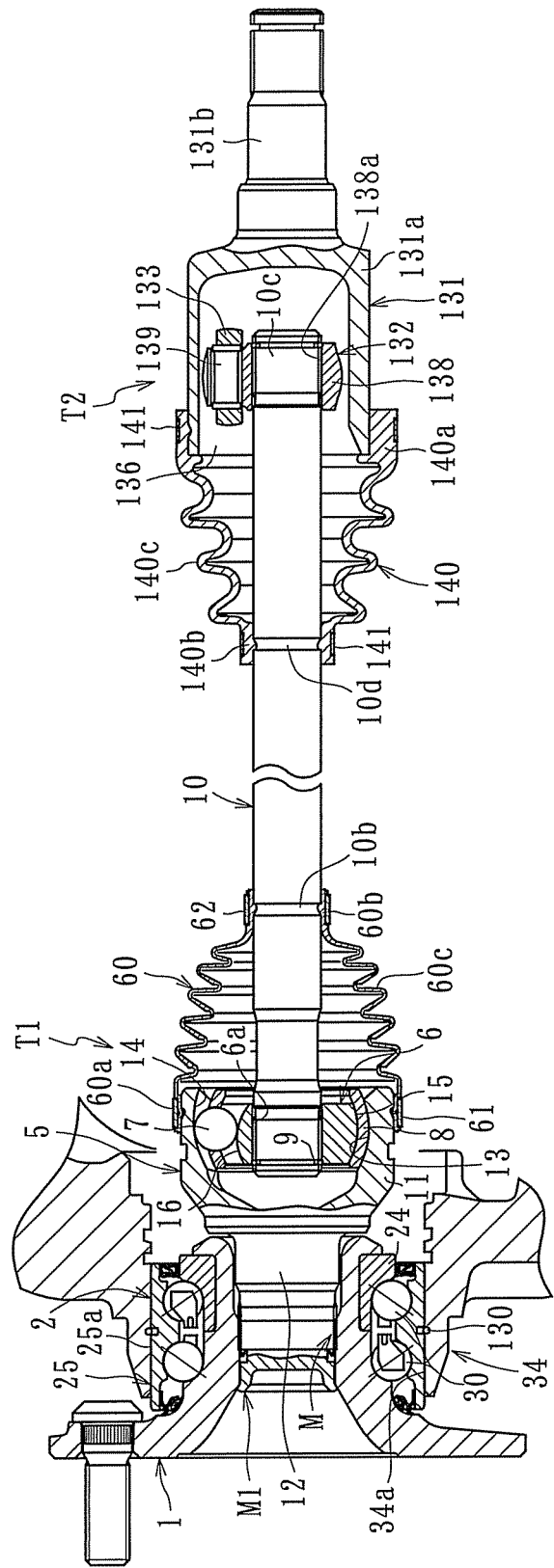
FIG. 34 A view illustrating the step of incorporating the axle module into a vehicle.

In the assembled axle module of the present invention, as illustrated in FIG. 34, an outer surface 25a of the outer member 25 of the bearing 2 is fitted and built in a knuckle 34 on a vehicle body side. The fitting and building-in means that the outer member 25 is completed to be built in the knuckle 34 by fitting the outer member 25 in the knuckle 34. The outer member 25 can be built in the knuckle 34 by press-fitting, for example, the outer surface 25a of a cylindrical surface shape of the outer member 25 into a cylindrical inner peripheral surface 34a of the knuckle 34.

The outer surface 25a of the outer member 25 serves as a press-fitting surface (knuckle fitting surface) in this manner, and the outer member 25 is press-fitted to the inner peripheral surface (outer member fitting hole portion) 34a of the knuckle 34. In this case, a maximum outer diameter dimension D12 of the constant velocity universal joint T1 is set to be smaller than an outer diameter D11 of the knuckle fitting surface of the outer member 25, that is, an inner diameter of the outer member fitting hole portion of the knuckle 34. Here, the maximum outer diameter dimension D12 of the constant velocity universal joint T1 means the maximum outer diameter dimension of the constant velocity universal joint T1 provided with accessories such as a boot 60 and a boot band 61.

In this case, it is preferred to interpose a lock ring 130 between the outer surface 25a of the outer member 25 and the inner peripheral surface 34a of the knuckle 34. With use of the lock ring 130, slip-off preventing effects of the outer member 25 and the knuckle 34 are enhanced. That is, an engagement groove 129 (see FIG. 15) is formed in the outer surface 25a of the outer member 25, and an engagement groove (not shown) is formed in the inner peripheral surface 34a of the knuckle 34. Thus, the lock ring 130 is engaged in the engagement groove 129 of the outer surface 25a of the outer member 25 and the engagement groove of the inner peripheral surface 34a of the knuckle 34.

Further, as illustrated in FIG. 31, a maximum outer diameter dimension D13 of the inboard side constant velocity universal joint T2 is set to be smaller than the outer diameter D11 of the knuckle fitting surface of the outer member 25, that is, the inner diameter of the outer member fitting hole portion of the knuckle 34. Similarly to the case of the outboard side constant velocity universal joint T1, the maximum outer diameter dimension D13 of the inboard side constant velocity universal joint T2 means the maximum outer diameter dimension of the inboard side constant velocity universal joint T2 provided with accessories such as a boot 140 and a boot band 141. Note that, the inner diameter dimension of the knuckle 34 is set to be substantially equal to the outer diameter D11 of the outer surface 25a of the outer member 25.

Figure 32:
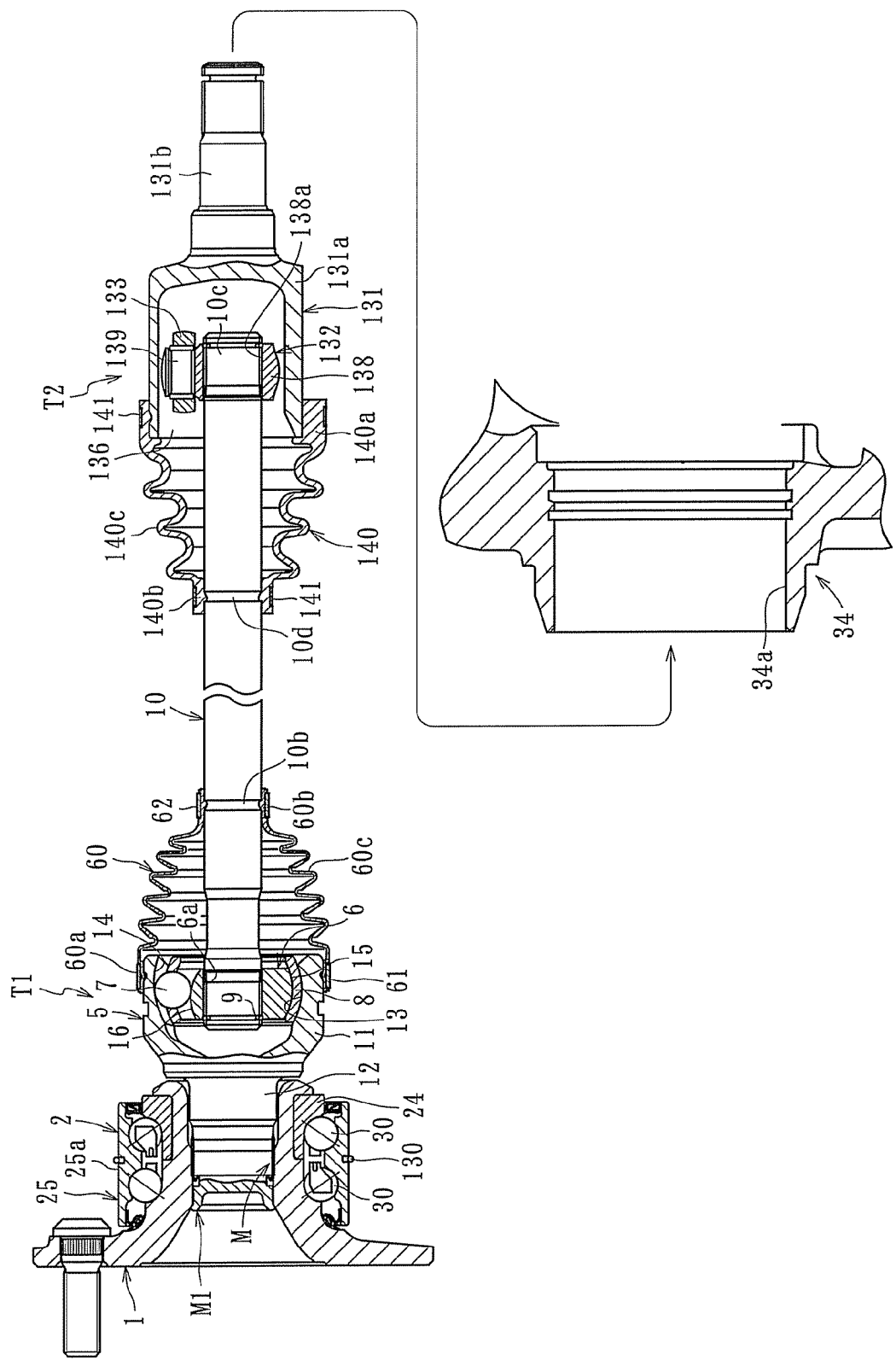
FIG. 32 A view illustrating a step of incorporating the axle module into a vehicle.
Figure 33:
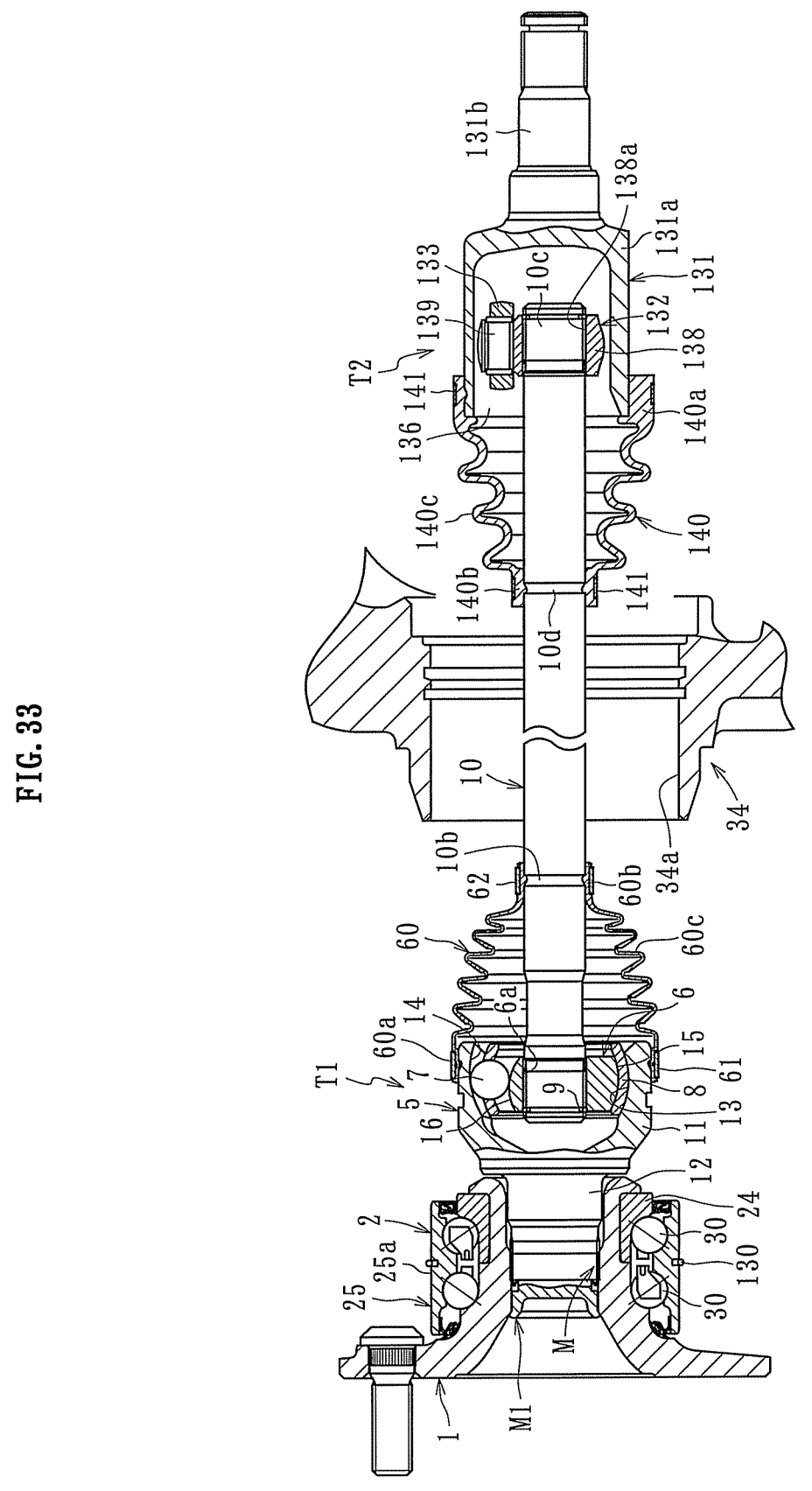

In order to incorporate the axle module assembled in this manner into the vehicle, as illustrated in FIGS. 32 and 33, the axle module is inserted through the knuckle 34 from the plunging type constant velocity universal joint T2 on the inboard side, and as illustrated in FIG. 34, the outer member 25 on the outboard side of the bearing device for a wheel is press-fitted to the inner peripheral surface 34a of the knuckle 34. Consequently, as illustrated in FIG. 34, in a state in which the outer member 25 is press-fitted to the knuckle 34, the lock ring 130 is engaged in the engagement groove 129 of the outer surface 25a of the outer member 25 and the engagement groove of the inner peripheral surface 34a of the knuckle 34.

The axle module of the present invention can be incorporated into the vehicle in the assembled state. Thus, it is possible to achieve a reduction in man-hours on the assembly site and to enhance workability. In this case, it is unnecessary to turn the knuckle 34 unlike in a conventional process, and hence a working space can be minimized. In addition, damages of components during disassembly, assembly, etc. is prevented, and thus quality of the bearing device for a wheel can be stabilized.

Therefore, even in a type illustrated in FIG. 1, a type illustrated in FIG. 8, a type illustrated in FIG. 11, a type illustrated in FIG. 18, a type illustrated in FIG. 19, a type illustrated in FIG. 20, a type illustrated in FIG. 21, a type illustrated in FIG. 23, or the like, it is preferred that the maximum outer diameter dimension D12 of the constant velocity universal joint T1 be set to be smaller than the outer diameter D11 of the outer member 25, that is, the inner diameter of the outer member fitting hole portion of the knuckle 34.

Incidentally, in each of the embodiments, the outer member 25 of the bearing 2 is of a type having no vehicle body attachment flange. However, as illustrated in FIG. 35, the outer member 25 may have a vehicle body attachment flange 117.

Figure 35:
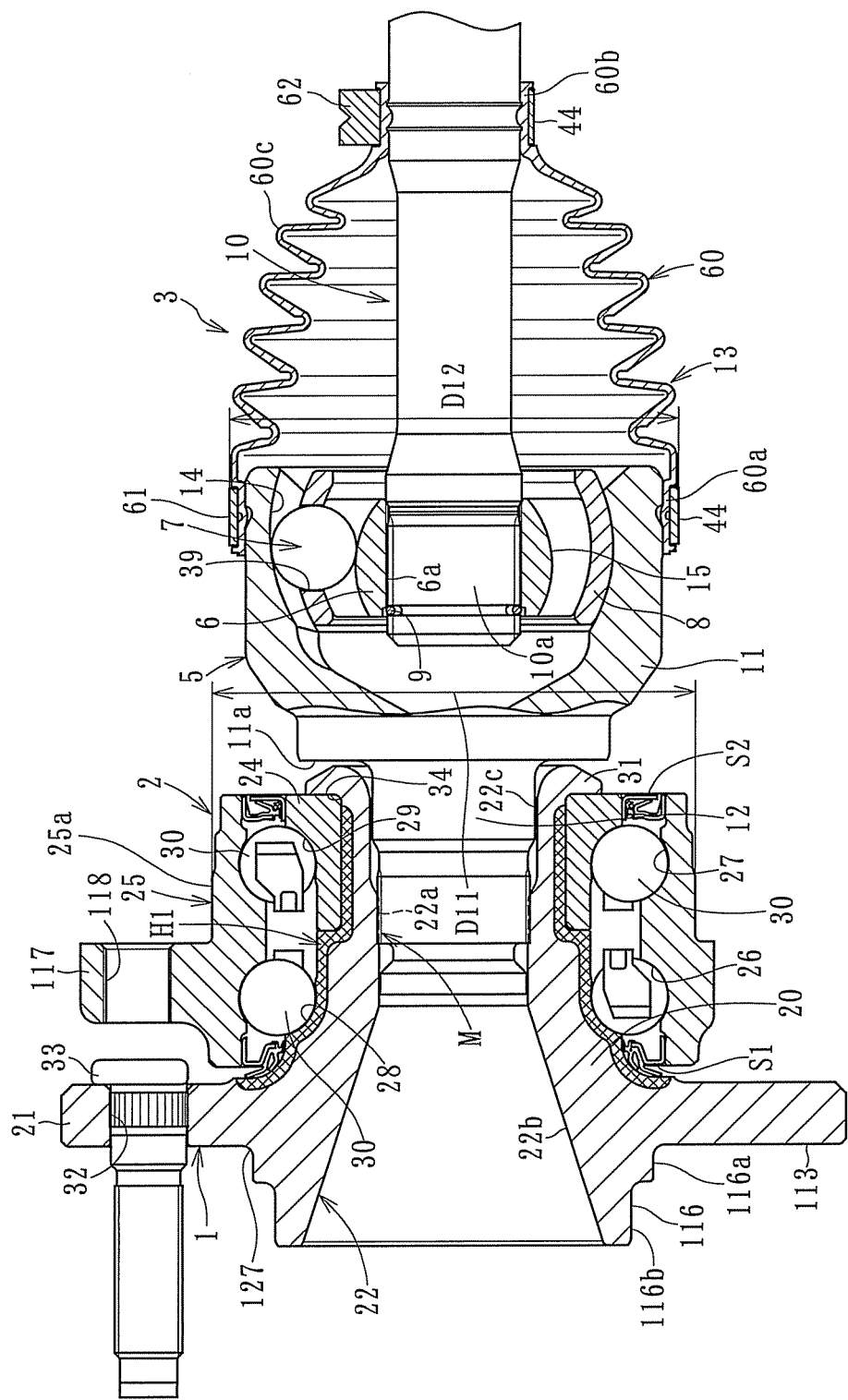
FIG. 35 A lateral sectional view of a bearing device for a wheel according to a tenth embodiment of the present invention.
Figure 36:
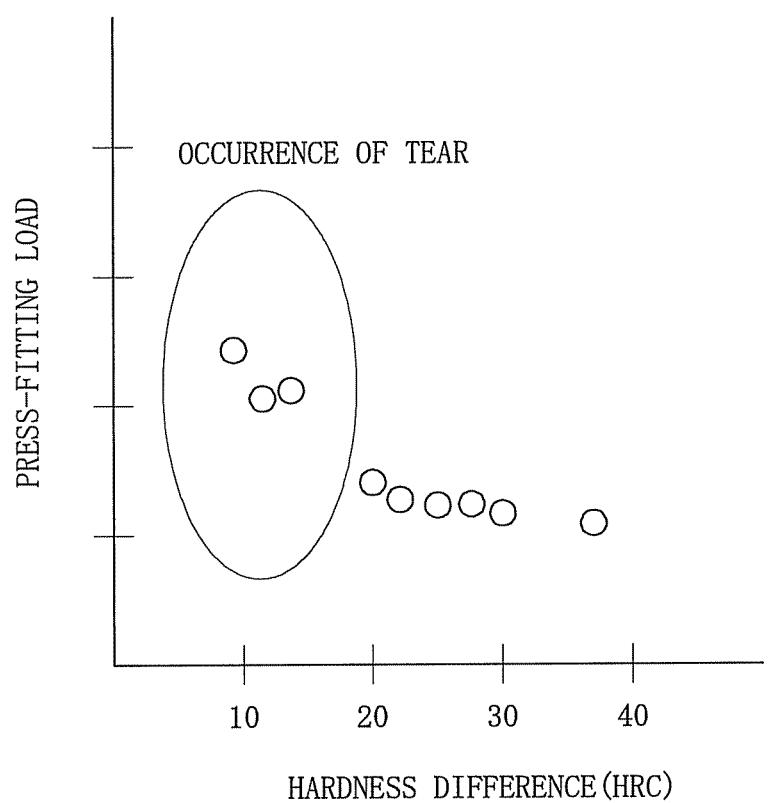
FIG. 36 A graph illustrating a change in press-fitting load.
Figure 37:
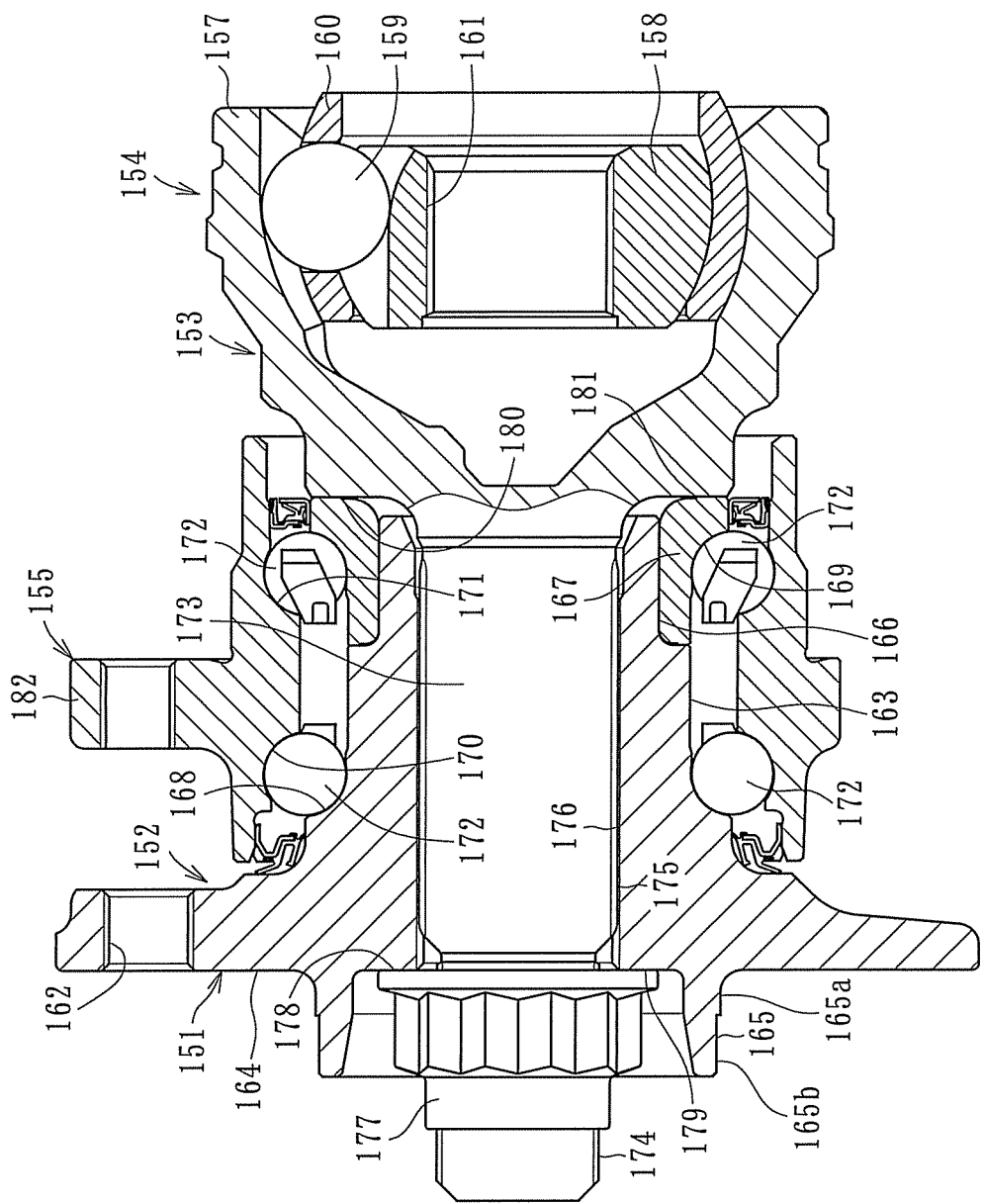
FIG. 37 A sectional view of a conventional bearing device for a wheel.

In a type illustrated in FIG. 35, in the outer member 25, the outer surface 25a on the inboard side with respect to the vehicle body attachment flange 117 serves as the knuckle fitting surface onto which the knuckle 34 is mounted. Thus, the maximum outer diameter dimension D12 of the constant velocity universal joint T1 is set to be smaller than the outer diameter D11 of the knuckle fitting surface. Also in this case, the maximum outer diameter dimension D12 of the constant velocity universal joint T1 means the maximum outer diameter dimension of the constant velocity universal joint T1 provided with accessories such as the boot 60 and the boot band 61.

In the bearing device for a wheel illustrated in FIG. 35, a short-cylindrical pilot portion 126, on which a wheel and a brake rotor (not shown) are mounted, is protrudingly provided on the end surface on the outboard side of the hub wheel 1. Note that, the pilot portion 116 includes a large-diameter first portion 126a and a small-diameter second portion 126b. The brake rotor is externally fitted onto the first portion 126a and the wheel is externally fitted onto the second portion 126b.

Further, the surface hardness of the base portion 127 on the outboard side of the wheel attachment flange 21 can be set to be equal to or smaller than 35 points in HRC. That is, the surface hardness of the base portion 127 on the outboard side after performing the thermal refining treatment is set to be equal to or smaller than 35 points in HRC. When the surface hardness is set to exceed 35 points in HRC, processability in cutting or the like is reduced, and a degree of deformation caused by heat treatment is increased. Accordingly, accuracy in surface deflection of a brake rotor attachment surface 63 of the wheel attachment flange 21 is deteriorated, and a cutting property is reduced due to the increase in hardness. In contrast, when the surface hardness of the base portion 127 on the outboard side is set to be equal to or smaller than 35 points in HRC, processability in cutting or the like is improved, and it is possible to prevent the deformation caused by heat treatment, and to prevent the deterioration of accuracy in surface deflection of the brake rotor attachment surface 113 of the wheel attachment flange 21 due to the deformation caused by heat treatment. Further, the surface hardness of the bolt inserting hole 32, into which the hub bolt 33 is press-fitted, can be approximated to the surface hardness of the hub bolt 33, and hence it is possible to prevent a reduction in fixation force caused by crush of serrations of the hub bolt 33.

The embodiments of the present invention have been described. However, the present invention is not limited to the embodiments and various modifications of the embodiments are possible. For example, the shape of the projecting portions 35 of the recess-projection fitting structure M is triangular in cross-section in the embodiment illustrated in FIG. 2 and is trapezoidal in cross-section in the embodiment illustrated in FIG. 28A. Besides, projecting portions of various shapes such as a semicircular shape, a semi-elliptical shape, and a rectangular shape can be adopted. An area, the number, and a circumferential direction disposing pitch, and the like of the projecting portions 35 can also be arbitrarily changed. In other words, it is unnecessary to form the spline 41 or 111 and form the projecting portions (projecting teeth) 41a or 111a of the spline 41 or 111 as the projecting portions 35 of the recess-projection fitting structure M. The projecting portions 35 may be something like keys or may form wavy mating surfaces of a curved line shape. In short, it is sufficient that the projecting portions 35 disposed along the axial direction are press-fitted into the counterpart side, the recessed portions 36 closely fitting in the projecting portions 35 can be formed on the counterpart side by the projecting portions 35, the entire fitting contact regions 38 of the projecting portions 35 and the recessed portions that fit in the projecting portions 35 are held in close contact with each other, and rotation torque can be transmitted between the hub wheel 1 and the constant velocity universal joint 3.

Further, the hole portion 22 of the hub wheel 1 may be a deformed-shape hole such as a polygonal hole other than a circular hole. A sectional shape of the end portion of the shaft section 12 fitted and inserted into the hole portion 22 may be a deformed-shape section such as a polygon other than a circular section. Further, when the shaft section 12 is press-fitted into the hub wheel 1, only press-fitting start end portions of the projecting portions 35 have hardness higher than that of the regions where the recessed portions 36 are formed. Therefore, it is unnecessary to set the hardness of the entire projecting portions 35 high. In FIG. 2 and the like, the gaps 40 are formed. However, the projecting portions 35 may bite in the inner surface 37 of the hub wheel 1 up to the recessed portions among the projecting portions 35.

Further, it is also possible to provide small recessed portions arranged at predetermined circumferential pitches in the inner surface 37 of the hole portion 22 of the hub wheel 1. It is necessary for the small recessed portions to have a volume smaller than that of the recessed portions 36. By thus providing the small recessed portions, it is possible to improve the press-fitting property of the projecting portions 35. That is, by thus providing the small recessed portions, it is possible to reduce the capacity of the extruded portion 45 formed during press-fitting of the projecting portions 35, and hence it is possible to reduce the press-fitting resistance. Further, because the extruded portion 45 can be made smaller, it is possible to reduce the volume of the pocket portion 50, making it possible to improve the processability of the pocket portion 50 and the strength of the shaft section 12. Note that, the small recessed portions may be of various shapes such as a triangular, a semi-elliptical, or a rectangular shape, and the number of small recessed portion can also be set arbitrarily.

While welding is adopted as the coupling means illustrated in FIG. 20, it is also possible to adopt adhesive instead of welding. Further, it is also possible to use rollers as the rolling elements 30 of the bearing 2. Further, while in the above-mentioned embodiments the third generation bearing device for a wheel is described, it is also possible to adopt the first, second, or fourth generation bearing device for a wheel. Note that, when press-fitting the projecting portions 35, it is possible to move the member on which the projecting portions 35 are formed, with the member in which the recessed portions 36 are formed being stationary. Conversely, it is also possible to move the member in which the recessed portions 36 are formed, with the member on which the projecting portions 35 are formed being stationary. Further, it is also possible to move both of them. Note that, in the constant velocity universal joint 3, the inner race 6 and the shaft 10 may be integrated with each other through the recess-projection fitting structure M as described with reference to each of the above-mentioned embodiments.

Note that, when, for example, the lock ring 85 illustrated in FIG. 19 is used in the shaft slip-off preventing structure M1, without providing the lock ring 85 on the end portion of the shaft section 12, it is possible to provide the lock ring 85 on the base portion side (mouth side), etc. of the shaft section 12.

In the embodiment illustrated in FIG. 1 or the like, the inboard side foreign-matter intrusion prevention means W1, the outboard side foreign-matter intrusion prevention means W2, and the foreign-matter intrusion prevention means W3 located between the fitting contact regions 38 are provided. However, the foreign-matter intrusion prevention means may not be provided on three points in this manner, and may be provided on at least one point. That is, any one or two of the foreign-matter intrusion prevention means W1, W2, and W3 may be provided. Therefore, in the bearing device for a wheel illustrated in FIG. 21, the foreign-matter intrusion prevention means W2 is not provided, but only the foreign-matter intrusion prevention means W1 and W3 are provided. Even in this case, anyone of the foreign-matter intrusion prevention means W1 and W3 may be omitted.

EXAMPLE

A relation between the press-fitting load and the hardness difference between the projecting portions 35 and the recessed-portion forming region was examined. Examination results are illustrated in FIG. 31. In this case, a male spline having 59 teeth with a module of 0.48 was molded in the shaft section 12, and the male spline was press-fitted into the hole portion 22 of the hub wheel 1. Further, when a diameter difference between the outer diameter dimension of the shaft section 12 and the inner diameter dimension of the hole portion 22 of the hub wheel 1 is represented as $\Delta d$, the height of the projecting portions is represented as h, and a ratio of the diameter difference and the height is represented as $\Delta d/2h$, a relation among the diameter difference, the height, and the ratio is $0.3 < \Delta d/2h < 0.86$.

As illustrated in FIG. 31, when the hardness difference was smaller than 20 points in HRC, the press-fitting load was large, and so-called tear occurred.

INDUSTRIAL APPLICABILITY

The present invention can be applied to bearing devices for a wheel of the first generation having the structure in which double-row roller bearings are independently used, the second generation in which a vehicle body attachment flange is integrally provided in an outer member, the third generation in which an inner raceway surface on one side of the double-row roller bearings is integrally formed with an outer circumference of a hub wheel integrally having a wheel attachment flange, and the fourth generation in which a constant velocity universal joint is integrated with the hub wheel and an inner raceway surface of the other side of the double-row roller bearings is integrally formed with an outer circumference of an outer joint member constituting the constant velocity universal joint.

DESCRIPTION OF SYMBOLS 1 hub wheel
2 bearing
3 constant velocity universal joint
11 mouth section
11a back surface
12 shaft section
22 hole portion
22g inner wall
23 smaller-diameter step section
24 inner race
26 outer raceway surface (outer raceway)
27 outer raceway surface (outer raceway)
28 inner raceway surface (inner raceway)
29 inner raceway surface (inner raceway)
30 rolling element
31 forged portion
35 projecting portion
36 recessed portion
37 inner surface
38 fitting contact region
45 extruded portion
50 pocket portion
51 circumferential groove
52 collar section
90 threaded hole
94 bolt member
94a head portion
98 gap
100a bearing surface
M recess-projection fitting structure
M1 shaft slip-off preventing structure
H1 hardened layer T1 outboard side constant velocity universal joint
T2 inboard side constant velocity universal joint
W foreign-matter intrusion prevention means
W1 foreign-matter intrusion prevention means
W2 foreign-matter intrusion prevention means
W3 foreign-matter intrusion prevention means

The invention claimed is:

1. A bearing device for a wheel, comprising:
an outer member having double-row outer raceways, an inner member having double-row inner raceways, an outer joint member having a shaft section formed therein, and an extruded portion,
the inner member has a hub wheel having a hole portion and a flange for attachment to a wheel,
the shaft section of the outer joint member being inserted in a fitting manner into the hole portion of the hub wheel is coupled to the hub wheel,
wherein an axially extending projection provided on an outer surface of the shaft section of the outer joint member is press-fitted along an axial direction into a small recessed portion provided on an inner surface of the hole portion of the hub wheel, a recess is formed in the hole portion of the hub wheel by the press-fitting of the projection, and the extruded portion is generated by the forming of the recess, to thereby form a recess-projection fitting structure in which the projection and the recess are held in close contact with each other over an entire region of fitting contact regions therebetween,
wherein a surface of the recess is a cut face formed by cutting the small recessed portion by the press-fitting of the projection, and
wherein hardness of at least a press-fitting start end portion of the projection is set to be higher than hardness of a region of the hub wheel in which the recess is formed, and a hardness difference therebetween is set to be equal to or larger than 20 points in HRC.

2. A bearing device for a wheel according to claim 1, wherein a press-fitting start end surface of the projection is a surface extending in a direction perpendicular to the axial direction.

3. A bearing device for a wheel according to claim 1, wherein the shaft section includes a spline, the projection is a plurality of projections at the spline, and the spline has a module equal to or smaller than 0.5 mm.

4. A bearing device for a wheel according to claim 1, wherein the recess-projection fitting structure allows separation by application of a pulling-out force in the axial direction, and
wherein the hub wheel and the shaft section of the outer joint member are subjected to bolt fixation with a bolt member threadedly engaged with a threaded hole formed at a shaft center portion of the shaft section of the outer joint member along the axial direction.

5. A bearing device for a wheel according to claim 1, wherein the extruded portion includes a portion that has a surface of the small recessed portion.

6. A bearing device for a wheel, comprising:
an outer member having double-row outer raceways, an inner member having double-row inner raceways, an outer joint member having a shaft section formed therein, and an extruded portion,
the inner member has a hub wheel having a hole portion and a flange for attachment to a wheel,
the shaft section of the outer joint member being inserted in a fitting manner into the hole portion of the hub wheel is coupled to the hub wheel,
wherein an axially extending projection provided on an outer surface of the shaft section of the outer joint member is press-fitted along an axial direction into a small recessed portion provided on an inner surface of the hole portion of the hub wheel, a recess is formed in the hole portion of the hub wheel by the press-fitting of the projection, and the extruded portion is generated by the forming of the recess, to thereby form a recess-projection fitting structure in which the projection and the recess are held in close contact with each other over an entire region of fitting contact regions therebetween,
wherein a surface of the recess is a cut face formed by cutting the small recessed portion by the press-fitting of the projection, and
wherein a foreign-matter intrusion prevention means which prevents foreign matter from intruding into the recess-projection fitting structure is provided.

7. A bearing device for a wheel according to claim 6, wherein a press-fitting start end surface of the projection is a surface extending in a direction perpendicular to the axial direction.

8. A bearing device for a wheel according to claim 6, wherein the shaft section includes a spline, the projection is a plurality of projections at the spline, and the spline has a module equal to or smaller than 0.5 mm.

9. A bearing device for a wheel according to claim 6, wherein the recess-projection fitting structure allows separation by application of a pulling-out force in the axial direction, and
wherein the hub wheel and the shaft section of the outer joint member are subjected to bolt fixation with a bolt member threadedly engaged with a threaded hole formed at a shaft center portion of the shaft section of the outer joint member along the axial direction.

10. A bearing device for a wheel according to claim 6, wherein the extruded portion includes a portion that has a surface of the small recessed portion.

11. A bearing device for a wheel, comprising:
an outer member having double-row outer raceways, an inner member having double-row inner raceways, an outer joint member having a shaft section formed therein, and an extruded portion,
the inner member has a hub wheel having a hole portion and a flange for attachment to a wheel,
the shaft section of the outer joint member being inserted in a fitting manner into the hole portion of the hub wheel is coupled to the hub wheel,
wherein an axially extending projection provided on an outer surface of the shaft section of the outer joint member is press-fitted along an axial direction into a small recessed portion provided on an inner surface of the hole portion of the hub wheel, a recess is formed in the hole portion of the hub wheel by the press-fitting of the projection, and the extruded portion is generated by the forming of the recess, to thereby form a recess-projection fitting structure in which the projection and the recess are held in close contact with each other over an entire region of fitting contact regions therebetween,
wherein an opening portion of an annular space formed between the outer member and the inner member is sealed with a seal member, one of the inner raceways on an outboard side of the inner member is formed in an outer surface of the hub wheel, another of the inner raceways on an inboard side of the inner member is formed in an outer surface of an inner race fitted onto a smaller-diameter step section provided on the inboard side of the hub wheel, wherein a surface of the recess is a cut face formed by cutting the small recessed portion by the press-fitting of the projection, and wherein the hub wheel is subjected to thermal refining treatment, and a hardened layer is provided in a region ranging from a seal land on the outboard side with respect to the one of the inner raceways on the outboard side via the one of the inner raceways on the outboard side to a surface corresponding to the smaller-diameter step section on which the inner race is externally fitted.

12. A bearing device for a wheel according to claim 11, wherein a press-fitting start end surface of the projection is a surface extending in a direction perpendicular to the axial direction.

13. A bearing device for a wheel according to claim 11, wherein the shaft section includes a spline, the projection is a plurality of projections at the spline, and the spline has a module equal to or smaller than 0.5 mm.

14. A bearing device for a wheel according to claim 11, wherein the recess-projection fitting structure allows separation by application of a pulling-out force in the axial direction, and wherein the hub wheel and the shaft section of the outer joint member are subjected to bolt fixation with a bolt member threadedly engaged with a threaded hole formed at a shaft center portion of the shaft section of the outer joint member along the axial direction.

15. A bearing device for a wheel according to claim 11, wherein the extruded portion includes a portion that has a surface of the small recessed portion.

\* \* \* \* \*